(12) United States Patent
Kashikar

(10) Patent No.: US 10,780,507 B2
(45) Date of Patent: Sep. 22, 2020

(54) EMBEDDING FIDUCIAL MARKS INTO ARTICLES OF MANUFACTURE WITH NON-TRIVIAL DIMENSIONAL VARIATIONS

(71) Applicant: Arevo, Inc., Milpitas, CA (US)

(72) Inventor: Archana Kashikar, Mountain View, CA (US)

(73) Assignee: Arevo, Inc., Milpitas, CA (US)

( * ) Notice: Subject to any disclaimer, the term of this patent is extended or adjusted under 35 U.S.C. 154(b) by 10 days.

(21) Appl. No.: 16/014,741

(22) Filed: Jun. 21, 2018

(65) Prior Publication Data

US 2019/0381578 A1 Dec. 19, 2019

Related U.S. Application Data

(60) Provisional application No. 62/686,076, filed on Jun. 17, 2018.

(51) Int. Cl.
*B23B 35/00* (2006.01)
*B23B 39/00* (2006.01)
(Continued)

(52) U.S. Cl.
CPC .............. *B23B 39/00* (2013.01); *B23B 41/00* (2013.01); *B23B 41/06* (2013.01); *B23B 51/0081* (2013.01); *B23B 51/107* (2013.01); *B25J 9/1694* (2013.01); *G06K 9/3241* (2013.01); *G06T 7/73* (2017.01); *B23B 2215/00* (2013.01);
(Continued)

(58) Field of Classification Search
CPC ....... B23B 39/00; B23B 41/06; B23B 51/107; B23B 41/00; B23B 51/0081; B23B 2226/27; B23B 2215/00; G06K 9/3241; G06K 2009/3225
See application file for complete search history.

(56) References Cited

U.S. PATENT DOCUMENTS 2,221,938 A 11/1940 Barry
2,269,946 A * 1/1942 Lange .................... B23Q 1/488
269/71
(Continued)

FOREIGN PATENT DOCUMENTS

CN 105887617 A 8/2016
FR 2468389 A1 5/1981
(Continued)

OTHER PUBLICATIONS

Jamie, D, Get Bowled Over by These 3D-Printed Bowling Balls, Oct. 26, 2017, https://www.3dnatives.com/en/3d-printed-bowling-balls-041020174/.*

(Continued)

*Primary Examiner* — Sunil K Singh
*Assistant Examiner* — Paul M Janeski
(74) *Attorney, Agent, or Firm* — McGeary Cukor LLC; Jason Paul DeMont; Kenneth Ottesen

(57) ABSTRACT

The illustrative embodiment of the present invention uses a tangible three-dimensional structure as a fiducial mark, which structure is, at least partially, tolerant of dimensional variations in the article. The illustrative embodiment uses three such tangible three-dimensional structures: (1) a portion of a tangible conical surface, (2) a portion of a tangible spheroidal surface, and (3) a portion of a tangible pyramidal surface.

24 Claims, 37 Drawing Sheets

(51) Int. Cl.
  *B23B 51/00* (2006.01)
  *B23B 41/00* (2006.01)
  *B23B 51/10* (2006.01)
  *G06T 7/73* (2017.01)
  *B25J 9/16* (2006.01)
  *G06K 9/32* (2006.01)
  *B23B 41/06* (2006.01)

(52) U.S. Cl.
  CPC .. *B23B 2226/27* (2013.01); *G06K 2009/3225* (2013.01); *G06T 2207/30204* (2013.01)

(56) References Cited

U.S. PATENT DOCUMENTS

| | | | |
|---|---|---|---|
| 2,453,036 A | | 11/1948 | Reitsma |
| 2,588,472 A | | 3/1952 | Beeson |
| 2,703,934 A | | 3/1955 | Jast et al. |
| 2,719,360 A | | 10/1955 | Cohan |
| 2,879,679 A | * | 3/1959 | Neff .............. B23Q 1/5412 269/71 |
| 3,329,429 A | | 7/1967 | Kopperud |
| 3,349,647 A | * | 10/1967 | Stan .............. B23Q 1/52 409/132 |
| 3,521,506 A | * | 7/1970 | Di Nardo .............. B23B 39/14 409/85 |
| 3,696,514 A | | 10/1972 | McIntyre et al. |
| 3,841,780 A | * | 10/1974 | Mengeringhausen .. B23B 39/14 408/1 R |
| 4,523,450 A | | 6/1985 | Herzog |
| 4,612,930 A | | 9/1986 | Bremer |
| 5,036,989 A | | 8/1991 | Carilli |
| 5,179,788 A | | 1/1993 | Jadach |
| 5,313,410 A | | 5/1994 | Watts |
| 5,397,329 A | | 3/1995 | Allen |
| 5,427,478 A | * | 6/1995 | Boucher .............. B23B 41/00 269/71 |
| 5,562,552 A | | 10/1996 | Thurman |
| 5,595,193 A | | 1/1997 | Walus et al. |
| 6,162,136 A | | 12/2000 | Aoyama |
| 7,016,456 B2 | | 3/2006 | Basu et al. |
| 7,243,441 B2 | | 7/2007 | Watanabe et al. |
| 7,697,738 B2 | | 4/2010 | Da et al. |
| 7,905,031 B1 | | 3/2011 | Paulino |
| 7,939,906 B2 | | 5/2011 | Luo et al. |
| 8,416,370 B2 | | 4/2013 | Yokogawa |
| 8,666,133 B2 | | 4/2014 | Vermandel et al. |
| 9,239,238 B2 | | 1/2016 | Bridges |
| 9,368,321 B1 | | 6/2016 | Randolph et al. |
| 9,600,728 B2 | | 3/2017 | Graumann et al. |
| 9,627,176 B2 | | 4/2017 | Bouchet-Marquis et al. |
| 9,690,017 B2 | | 6/2017 | Tohme et al. |
| 9,844,324 B2 | | 12/2017 | Merritt et al. |
| 9,861,450 B2 | | 1/2018 | Bolan et al. |
| 9,867,669 B2 | | 1/2018 | Zhao et al. |
| 10,022,104 B2 | | 7/2018 | Sell et al. |
| 10,252,350 B1 | | 4/2019 | Kashikar |
| 2001/0034948 A1 | | 11/2001 | Matsumiya et al. |
| 2003/0131852 A1 | | 7/2003 | Shafer et al. |
| 2004/0030237 A1 | | 2/2004 | Lee et al. |
| 2004/0167391 A1 | | 8/2004 | Solar et al. |
| 2004/0167393 A1 | | 8/2004 | Solar et al. |
| 2010/0063388 A1 | | 3/2010 | Solar et al. |
| 2011/0098722 A1 | | 4/2011 | Ulfarsson et al. |
| 2017/0000581 A1 | | 1/2017 | Tokuda et al. |
| 2017/0060115 A1 | | 3/2017 | Battles et al. |
| 2017/0249786 A1 | | 8/2017 | Gallop et al. |
| 2018/0209781 A1 | | 7/2018 | Kottilingam et al. |
| 2018/0209782 A1 | | 7/2018 | Hovis et al. |
| 2018/0231428 A1 | | 8/2018 | Hovis et al. |
| 2018/0238755 A1 | | 8/2018 | Hovis et al. |

FOREIGN PATENT DOCUMENTS

| | | |
|---|---|---|
| GB | 2197370 A | 5/1988 |
| WO | 95/15714 A1 | 6/1995 |
| WO | 2004075768 A2 | 10/2004 |
| WO | 2017003453 A1 | 1/2017 |
| WO | 2017050761 A1 | 3/2017 |

OTHER PUBLICATIONS

Notice of Allowance and Fee(s) Due, U.S. Appl. No. 16/014,736, dated Jan. 29, 2019.
Corrected Notice of Allowability, U.S. Appl. No. 16/014,736, dated Feb. 14, 2019.
Office Action, USPTO, U.S. Appl. No. 16/014,736, dated Sep. 28, 2018.
Officer Sibylle Schubert-Püshel, Written Opinion of ISA, International Application No. PCT/US2019/025480, dated Jul. 18, 2019.
Officer Sibylle Schubert-Püshel, International Search Report, International Application No. PCT/US2019/025480, dated Jul. 18, 2019.
Notice of Allowance and Fee(s) Due, U.S. Appl. No. 16/014,726, dated Jan. 16, 2020.
Kaptein, Bart L., et al. "A comparison of calibration methods for stereo fluroscopic imaging systems." Journal of biomechanics 44.13 (2011): 2511-2515.
Marais, D., et al. "Sample positioning in neutron diffraction experiments using a multi-material fiducial marker." Nuclear Instruments and Methods in Physics Research Section A: Accelerators, Spectrometers, Detectors and Associated Equipment 841 (2017): 12-16.
Cox, David D., et al. "High-resolution three-dimensional microelectrode brain mapping using stereo microfocal X-ray imaging." Journal of neurophysiology 100.5 (2008): 2966-2976.
Office action, U.S. Appl. No. 16/014,746, dated May 5, 2020.
Notice of allowance and fee(s) due, U.S. Appl. No. 16/014,746, dated May 20, 2020.

* cited by examiner

Conic Drill Bit 251
(Orthographic Bottom View)

Conic Drill Bit 251
(Orthographic Side View)

Conic Drill Bit 251
(Orthographic Front View)

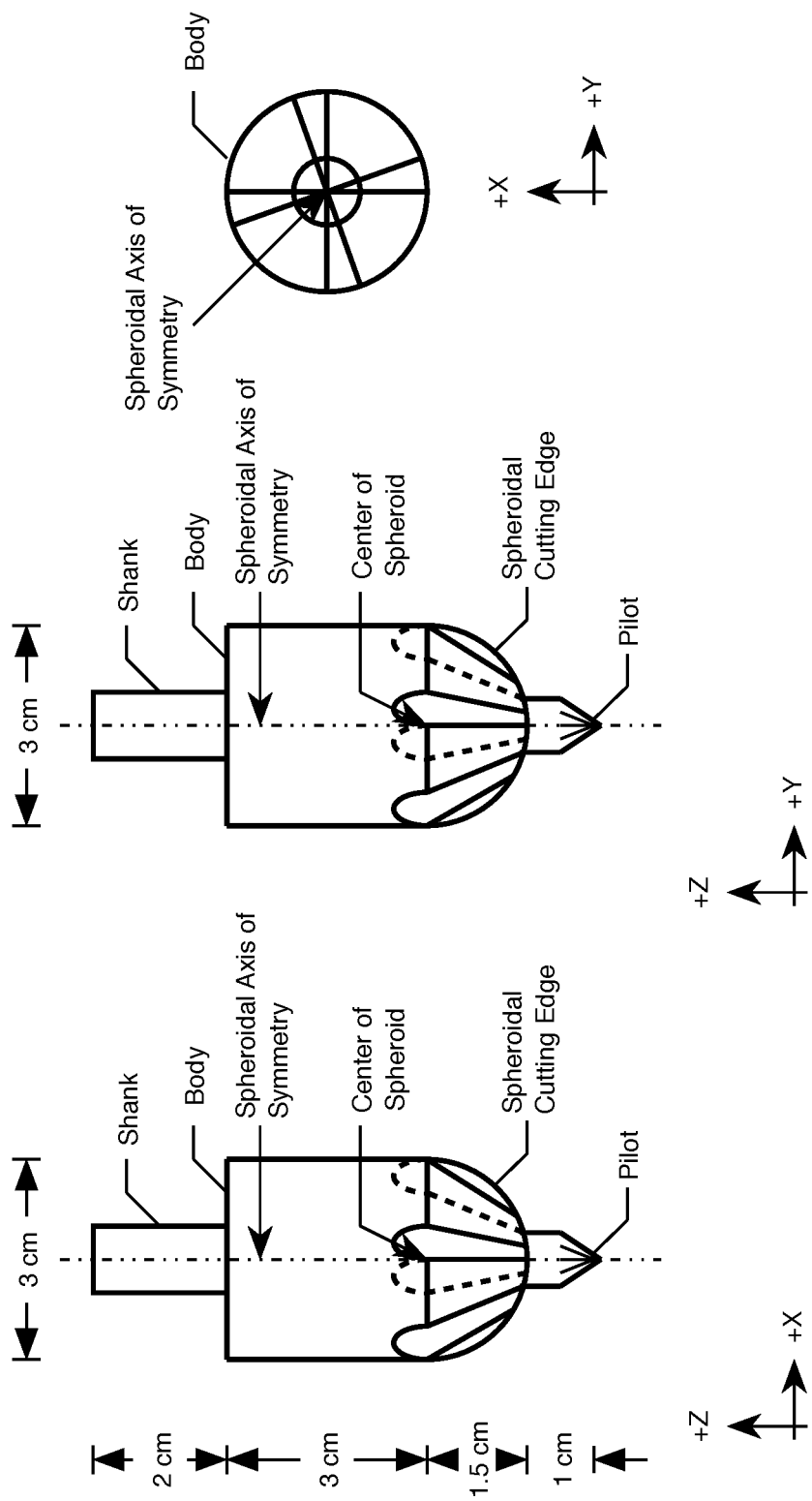

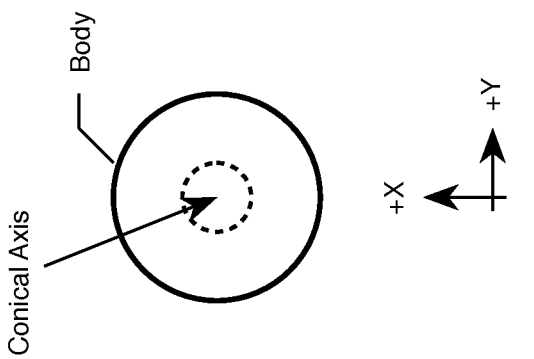
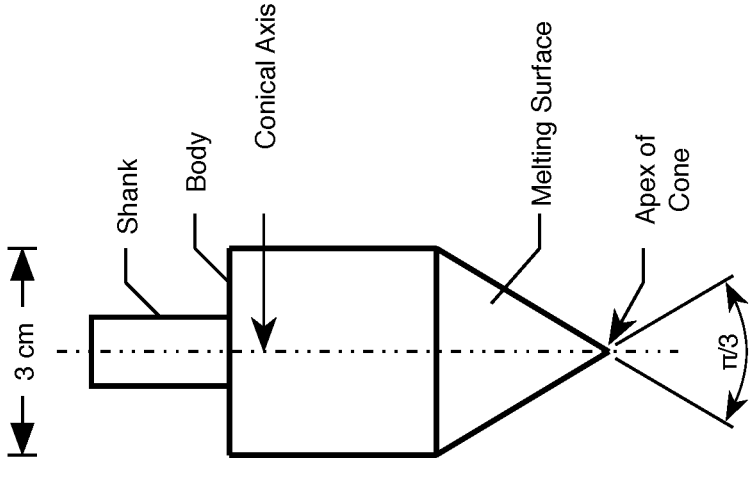
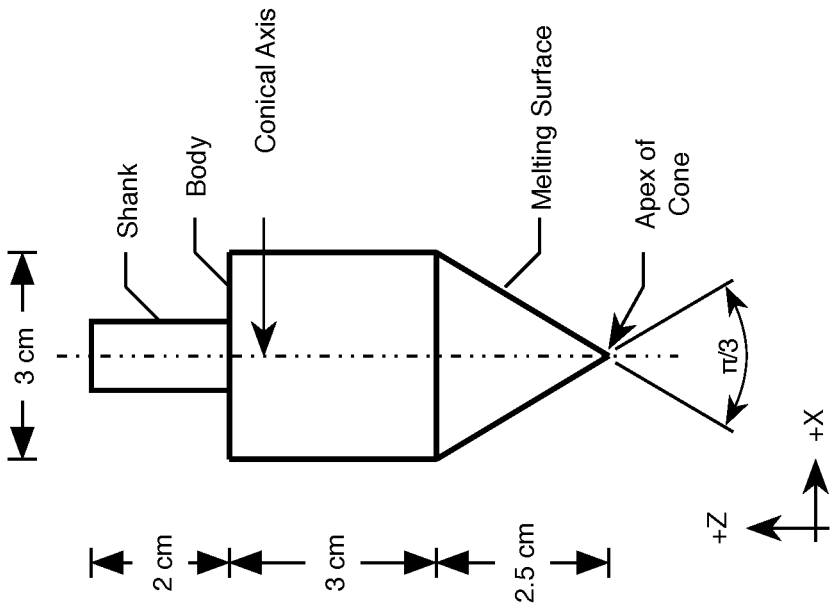

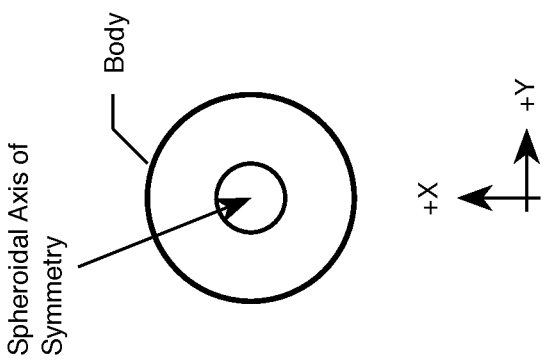
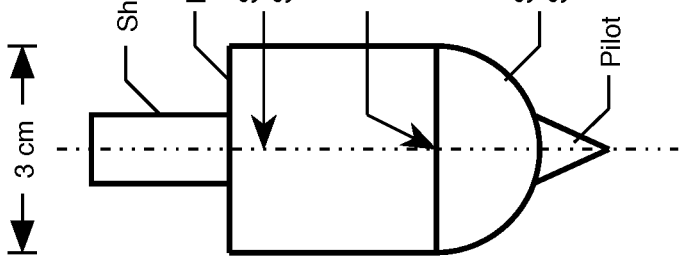
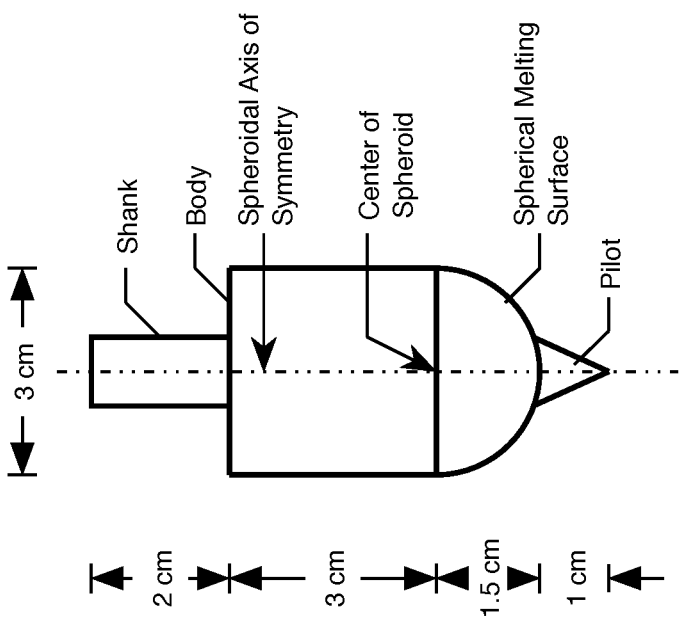

Pyramidal Melting Tip 255
(Orthographic Front View)

Pyramidal Melting Tip 255
(Orthographic Side View)

Pyramidal Melting Tip 255
(Orthographic Bottom View)

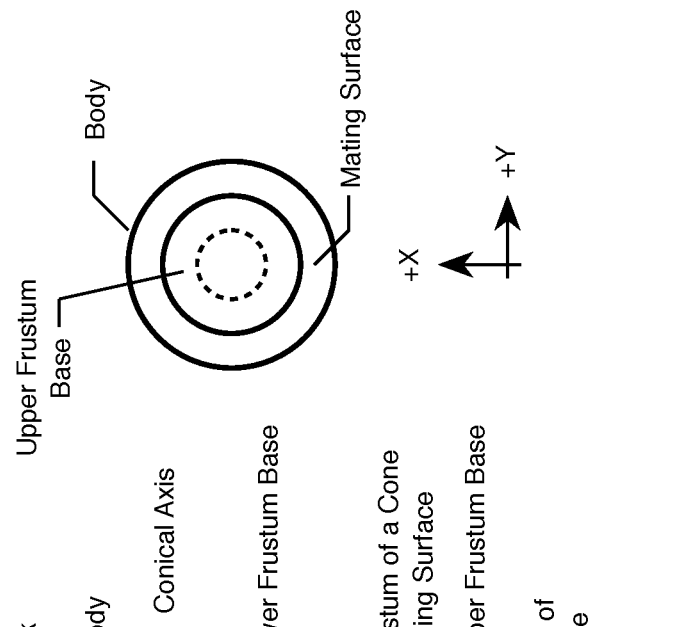
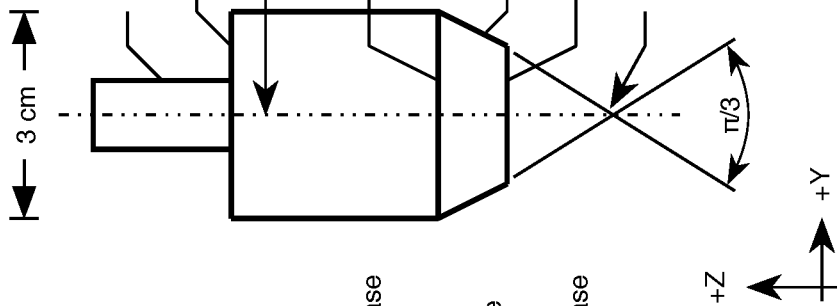
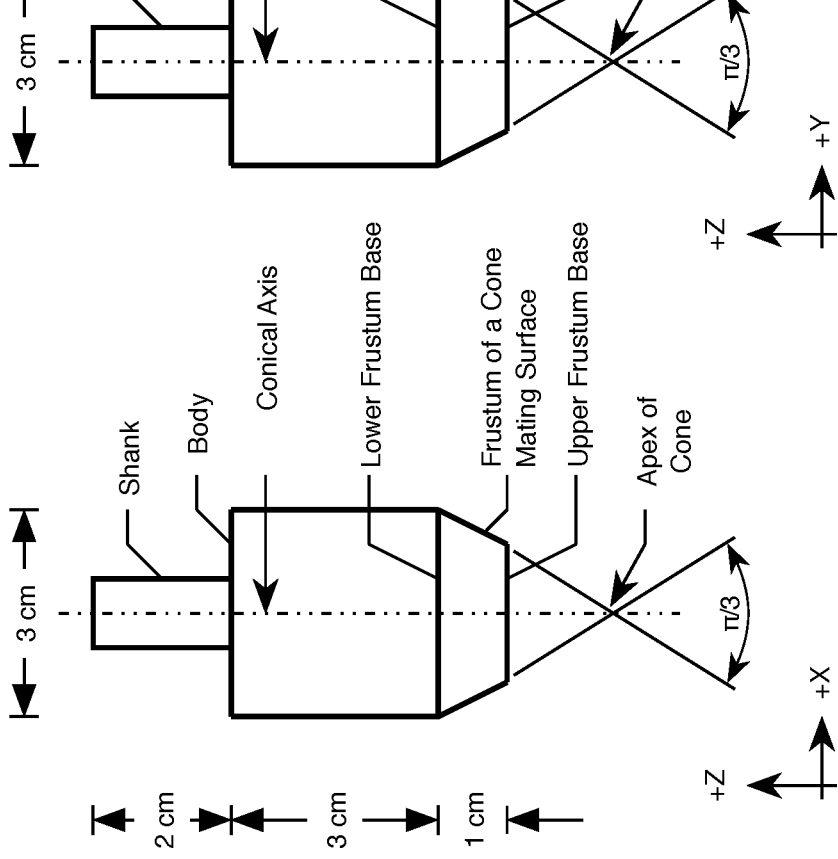

Spheroidal Probe 257
(Orthographic Bottom View)

Spheroidal Probe 257
(Orthographic Side View)

Spheroidal Probe 257
(Orthographic Front View)

Pyramidal Probe 258
(Orthographic Bottom View)

Pyramidal Probe 258
(Orthographic Side View)

Pyramidal Probe 258
(Orthographic Front View)

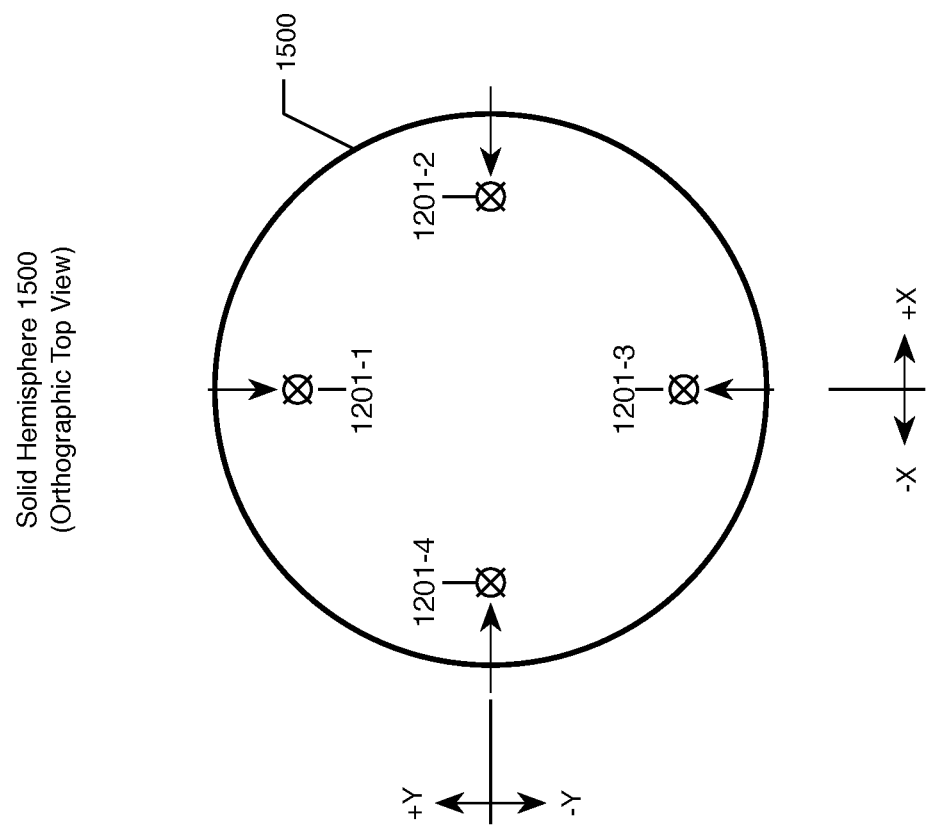

Conical Blind Hole 1800
(Orthographic Front View
Along Cross-Section AA-AA)

Conical Blind Hole 1800
(Orthographic Side View
Along Cross-Section BB-BB)

Conical Blind Hole 1800
(Orthographic Top View)

Conical Through Hole 1900
(Orthographic Front View Along Cross-Section AA-AA)

Conical Through Hole 1900
(Orthographic Side View Along Cross-Section BB-BB)

Conical Through Hole 1900
(Orthographic Top View)

Spheroidal Blind Hole 2000
(Orthographic Top View)

Spheroidal Blind Hole 2000
(Orthographic Side View
Along Cross-Section BB-BB)

Spheroidal Blind Hole 2000
(Orthographic Front View
Along Cross-Section AA-AA)

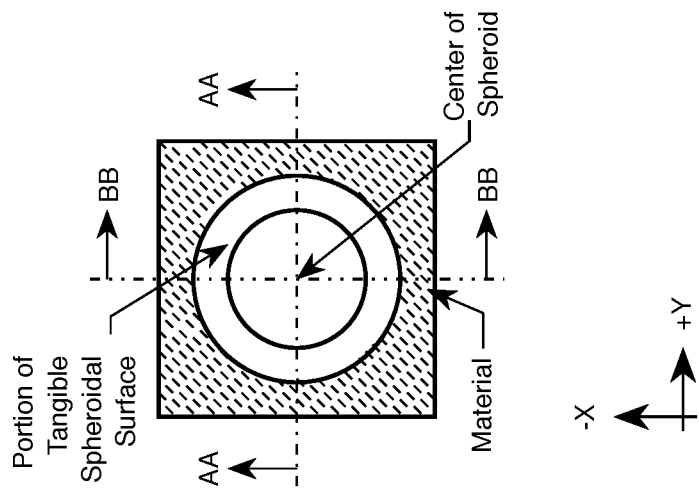
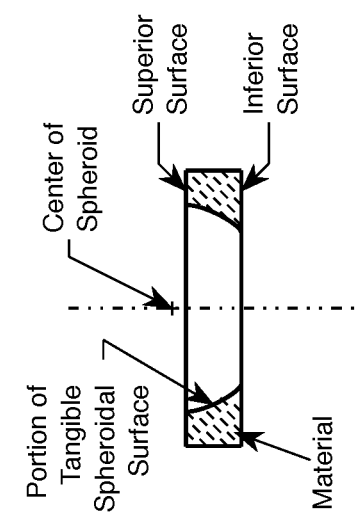
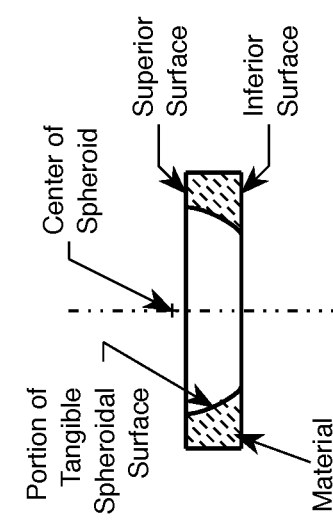

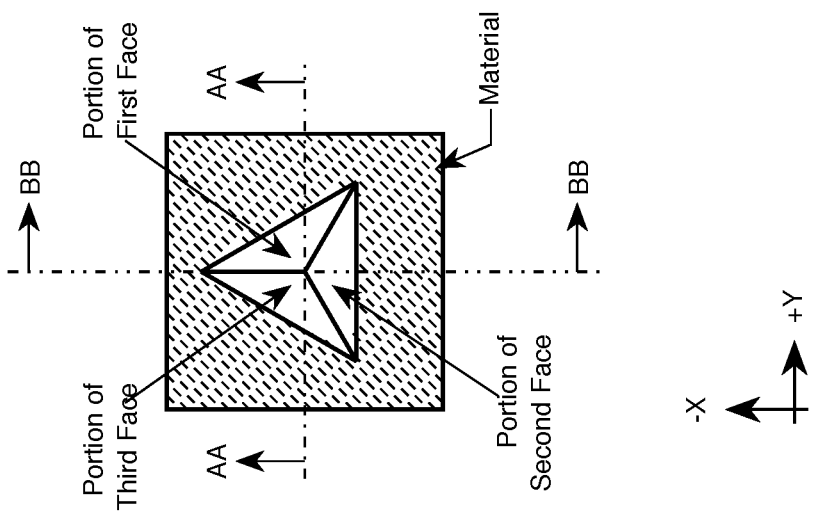
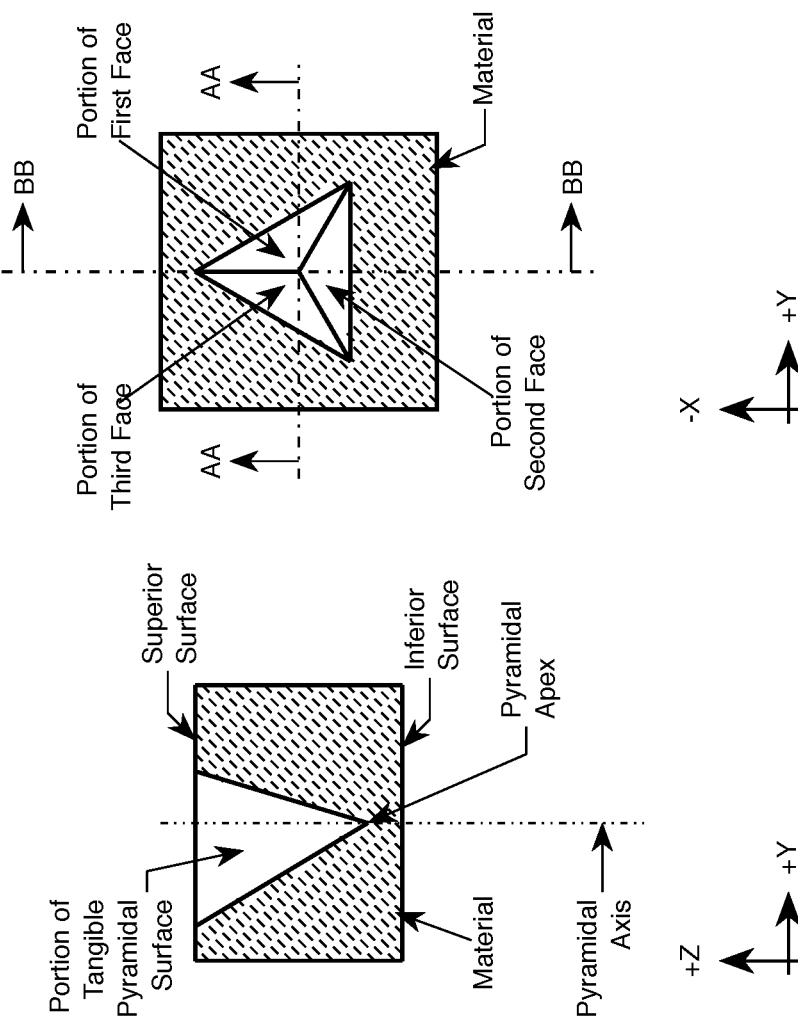
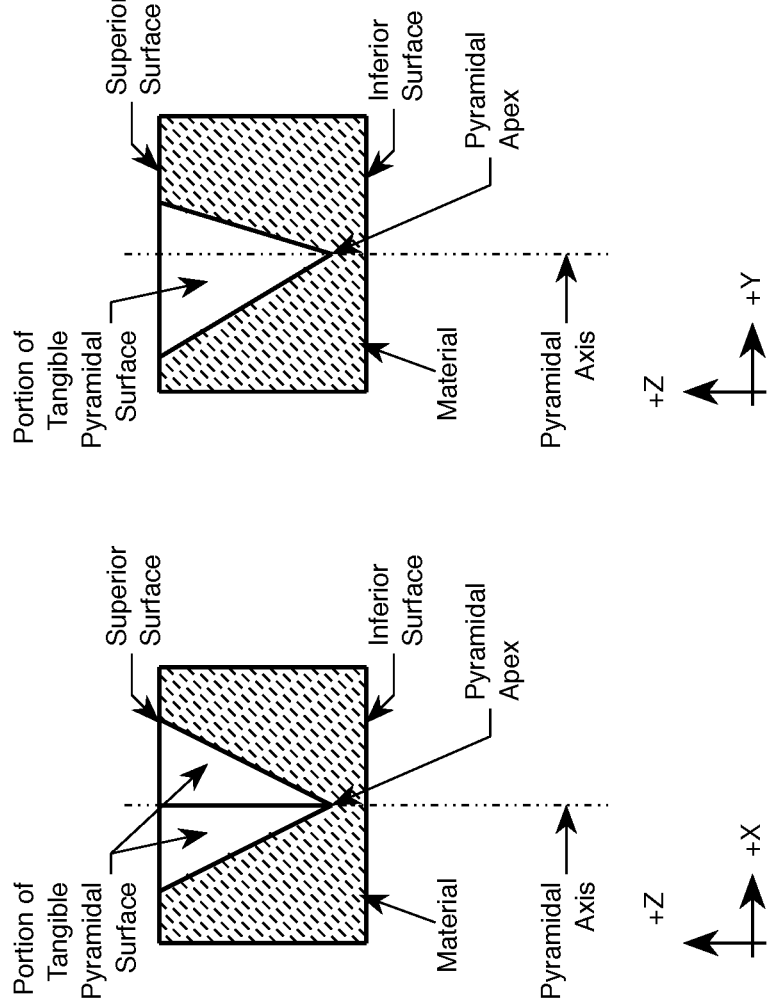

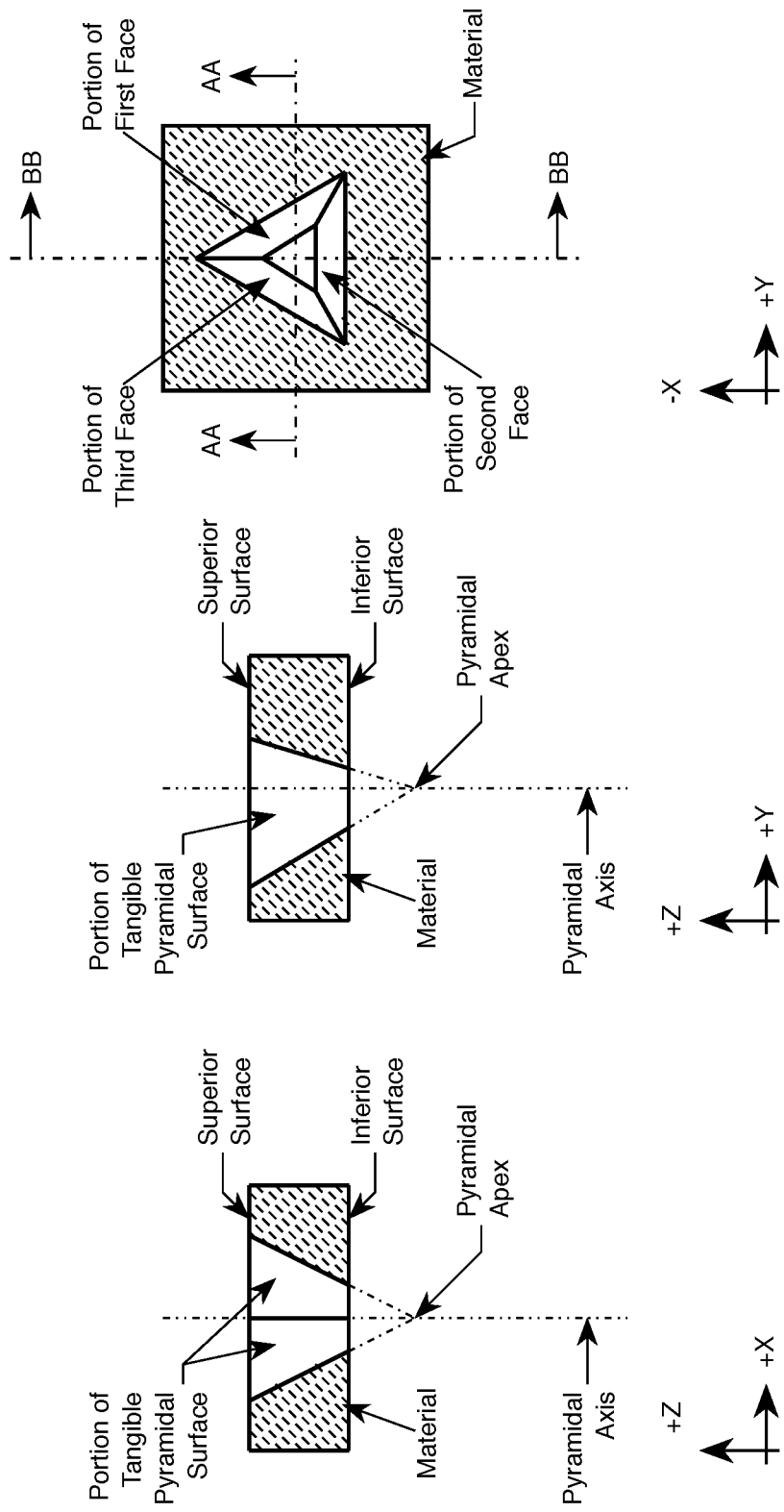

EMBEDDING FIDUCIAL MARKS INTO ARTICLES OF MANUFACTURE WITH NON-TRIVIAL DIMENSIONAL VARIATIONS

CROSS-REFERENCE TO RELATED APPLICATIONS

This application claims the benefit of U.S. provisional Patent Application Ser. No. 62/686,076, which is incorporated by reference for all purposes, but particularly for evincing possession of the claimed inventions.

This application is related to applications:
U.S. patent application Ser. No. 16/014,736, entitled "Fiducial Marks for Articles of Manufacture with Non-Trivial Dimensional Variations"; and
U.S. patent application Ser. No. 16/014,746, entitled "Registration of Articles of Manufacture with Dimensional Variations"; and
U.S. patent application Ser. No. 16/014,726, entitled "Systems of Articles of Manufacture with Corresponding Fiducial Marks and Dimensional Variations".

FIELD OF THE INVENTION

The present invention relates to fiducial marks in general, and, in particular, to fiducial marks for articles of manufacture that have similar, but not identical, shapes.

BACKGROUND OF THE INVENTION

Fiducial marks are widely using in manufacturing to enable an article of manufacture to be located or "registered." For example, it is well known in the prior art that the registration of a rigid article of manufacture can be accomplished by establishing three non-collinear fiducial reference points in the coordinate system of the article. Each fiducial reference point is merely a mathematical abstraction, and, therefore, a tangible representation of each fiducial reference point must be affixed to the article of manufacture. The tangible representation of a fiducial reference point is a fiducial mark.

After the fiducial marks are affixed to the article, the lateral location and angular orientation of the article can be determined by locating the fiducial reference marks. There are, however, disadvantages with fiducial marks in the prior art.

BRIEF SUMMARY OF THE INVENTION

Some embodiments of the present invention enable an article of manufacture to be registered without some of the costs and disadvantages for doing so in the prior art. For example, when articles of manufacture have non-trivial dimensional variations, the use of prior art fiducial marks is often problematic. In particular, the dimensional variations can cause a fiducial mark to be affixed to the article at a location other than where it is intended to be. If a fiducial mark is not affixed where it is intended to be, then the fiducial mark misrepresents the location of its associated fiducial reference point. This, of course, hinders the proper registration of the article.

The illustrative embodiment of the present invention uses a tangible three-dimensional structure as a fiducial mark, which structure is, at least partially, tolerant of dimensional variations in the article. The illustrative embodiment uses three such tangible three-dimensional structures:

(1) a portion of a tangible conical surface,
(2) a portion of a tangible spheroidal surface, and
(3) a portion of a tangible pyramidal surface.

When the tangible representation of a fiducial reference point is a portion of a tangible conical surface, the location of the fiducial reference point is represented by the location of the apex of an (intangible) cone. Although there are an infinite number of cones with the same apex, the spatial parameters of one (intangible) cone are determined. After the spatial parameters of the one (intangible) cone are determined, a hole is created in the material composing the article of manufacture, which hole is defined, at least in part, by a portion of a tangible conical surface. The spatial parameters of the tangible conical surface correspond to the spatial parameters of the one (intangible) cone. The hole can be created, for example, by drilling into the material with a drill bit that has, at least in part, a conical cutting surface.

Thereafter, the location of the fiducial reference point (i.e., the apex of the cone) can be determined by probing the portion of the tangible conical surface to determine its spatial parameters. After the spatial parameters of the portion of the tangible conical surface are determined, it is well known to those skilled in the art how to determine the spatial parameters of the associated (intangible) cone. After the spatial parameters of the (intangible) cone are determined, it is well known to those skilled in the art how to determine the location of the apex of the cone (i.e., the fiducial reference point).

Although variations in the dimensions of the article of manufacture can affect the conical-surface area and conical-surface volume of the tangible conical surface, the variations do not affect the spatial parameters of the associated (intangible) cone. Therefore, variations in the dimensions of the article do not affect the ability of the fiducial mark to accurately represent the location of the fiducial reference point.

When the tangible representation of a fiducial reference point is a portion of a tangible spheroidal surface, the location of the fiducial reference point is represented by the location of the center of a (intangible) spheroid. Although there are an infinite number of spheroids with the same center, the spatial parameters of one (intangible) spheroid are determined. After the spatial parameters of the one (intangible) spheroid are determined, a hole is created in the material composing the article of manufacture, which hole is defined, at least in part, by a portion of a tangible spheroidal surface. The spatial parameters of the tangible spheroidal surface correspond to the spatial parameters of the one (intangible) spheroid. The hole can be created, for example, by drilling into the material with a drill bit that has, at least in part, a spheroidal cutting surface.

Thereafter, the location of the fiducial reference point (i.e., the center of the spheroid) can be determined by probing the portion of the tangible spheroidal surface to determine its spatial parameters. After the spatial parameters of the portion of the tangible spheroidal surface are determined, it is well known to those skilled in the art how to determine the spatial parameters of the associated (intangible) spheroid. After the spatial parameters of the (intangible) spheroid are determined, it is well known to those skilled in the art how to determine the location of the center of the spheroid (i.e., the fiducial reference point).

Although variations in the dimensions of the article of manufacture can affect the spheroidal-surface area and spheroidal-surface volume of the tangible spheroidal surface, the variations do not affect the spatial parameters of the associated (intangible) spheroid. Therefore, variations in the dimensions of the article do not affect the ability of the fiducial mark to accurately represent the location of the fiducial reference point.

When the tangible representation of a fiducial reference point is a portion of a tangible pyramidal surface, the location of the fiducial reference point is represented by the location of the apex of an (intangible) pyramid. Although there are an infinite number of pyramids with the same apex, the spatial parameters of one (intangible) pyramid are determined. After the spatial parameters of the one (intangible) pyramid are determined, a hole is created in the material composing the article of manufacture, which hole is defined, at least in part, by a portion of a tangible pyramidal surface. The spatial parameters of the tangible pyramidal surface correspond to the spatial parameters of the one (intangible) pyramid. The hole can be created, for example, by melting the material with a melting tip that has, at least in part, a pyramidal melting surface.

Thereafter, the location of the fiducial reference point (i.e., the apex of the pyramid) can be determined by probing the portion of the tangible pyramidal surface to determine its spatial parameters. After the spatial parameters of the portion of the tangible pyramidal surface are determined, it is well known to those skilled in the art how to determine the spatial parameters of the associated (intangible) pyramid. After the spatial parameters of the (intangible) pyramid are determined, it is well known to those skilled in the art how to determine the location of the apex of the pyramid (i.e., the fiducial reference point).

Although variations in the dimensions of the article of manufacture can affect the pyramidal-surface area and pyramidal-surface volume of the tangible pyramidal surface, the variations do not affect the spatial parameters of the associated (intangible) pyramid. Therefore, variations in the dimensions of the article do not affect the ability of the fiducial mark to accurately represent the location of the fiducial reference point.

The illustrative embodiment comprises:
fabricating an article of manufacture with an additive manufacturing technology;
establishing a first fiducial reference point with the article of manufacture by removing a first portion of a material composing the article of manufacture to create a first hole in a first portion of a material composing the article of manufacture, wherein the first hole in the first portion of the material is defined, at least in part, by a first portion of a first tangible conical surface, wherein the first tangible conical surface establishes (i) a first conical apex, and (ii) a first conical-surface volume;
establishing a second fiducial reference point with the article of manufacture by removing a second portion of the material composing the article of manufacture to create a second hole in a second portion of the material composing the article of manufacture, wherein the second hole in the second portion of the material is defined, at least in part, by a second portion of a second tangible conical surface, wherein the second tangible conical surface establishes (i) a second conical apex, and (ii) a second conical-surface volume; and
establishing a third fiducial reference point with the article of manufacture by removing a third portion of the material composing the article of manufacture to create a third hole in a third portion of the material composing the article of manufacture, wherein the third hole in the third portion of the material is defined, at least in part, by a third portion of a third tangible conical surface, wherein the third tangible conical surface establishes (i) a third conical apex, and (ii) a third conical-surface volume;
wherein the first conical apex, the second conical apex, and the third conical apex are non-collinear; and
wherein the first conical-surface volume does not equal the second conical-surface volume.

BRIEF DESCRIPTION OF THE DRAWINGS

FIG. 4a depicts an orthogonal front view of spheroidal drill bit 252 in accordance with the illustrative embodiment of the present invention.

FIG. 4b depicts an orthogonal side view of spheroidal drill bit 252 in accordance with the illustrative embodiment of the present invention.

FIG. 4c depicts an orthogonal bottom view of spheroidal drill bit 252 in accordance with the illustrative embodiment of the present invention.

FIG. 5a depicts an orthogonal front view of conic melting tip 253 in accordance with the illustrative embodiment of the present invention.

FIG. 5b depicts an orthogonal side view of conic melting tip 253 in accordance with the illustrative embodiment of the present invention.

FIG. 5c depicts an orthogonal bottom view of conic melting tip 253 in accordance with the illustrative embodiment of the present invention.

FIG. 6a depicts an orthogonal front view of spheroidal melting tip 254 in accordance with the illustrative embodiment of the present invention.

FIG. 6b depicts an orthogonal side view of spheroidal melting tip 254 in accordance with the illustrative embodiment of the present invention.

FIG. 6c depicts an orthogonal bottom view of spheroidal melting tip 254 in accordance with the illustrative embodiment of the present invention.

FIG. 8a depicts an orthogonal front view of conic probe 256 in accordance with the illustrative embodiment of the present invention.

FIG. 8b depicts an orthogonal side view of conic probe 256 in accordance with the illustrative embodiment of the present invention.

FIG. 8c depicts an orthogonal bottom view of conic probe 256 in accordance with the illustrative embodiment of the present invention.

FIG. 15c depicts the orthogonal top view of solid hemisphere 1500, which was fabricated in accordance with the engineering specifications depicted in FIGS. 12a, 12b, and 12c.

FIG. 21a depicts an orthogonal front view of spheroidal through hole 2100 in thermoplastic in accordance with the illustrative embodiment of the present invention.

FIG. 21b depicts an orthogonal side view of spheroidal through hole 2100 in thermoplastic in accordance with the illustrative embodiment of the present invention.

FIG. 21c depicts an orthogonal bottom view of spheroidal through hole 2100 in thermoplastic in accordance with the illustrative embodiment of the present invention.

FIG. 22a depicts an orthogonal front view of pyramidal blind hole 2200 in thermoplastic in accordance with the illustrative embodiment of the present invention.

FIG. 22b depicts an orthogonal side view of pyramidal blind hole 2200 in thermoplastic in accordance with the illustrative embodiment of the present invention.

FIG. 22c depicts an orthogonal bottom view of pyramidal blind hole 2200 in thermoplastic in accordance with the illustrative embodiment of the present invention.

FIG. 23a depicts an orthogonal front view of pyramidal through hole 2300 in thermoplastic in accordance with the illustrative embodiment of the present invention.

FIG. 23b depicts an orthogonal side view of pyramidal through hole 2300 in thermoplastic in accordance with the illustrative embodiment of the present invention.

FIG. 23c depicts an orthogonal bottom view of pyramidal through hole 2300 in thermoplastic in accordance with the illustrative embodiment of the present invention.

DETAILED DESCRIPTION

Figure 1:
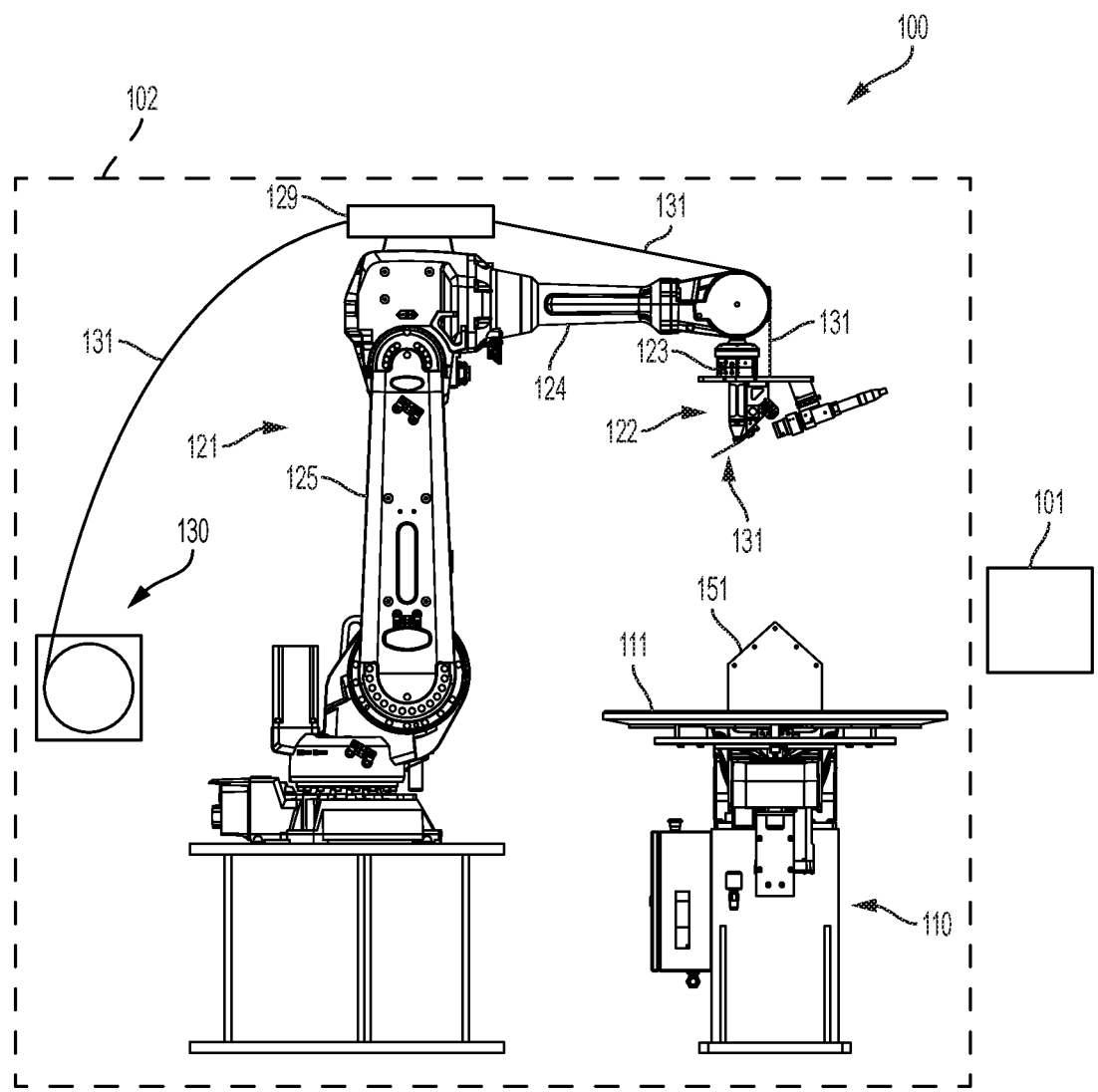
FIG. 1 depicts an illustration of the salient components of additive manufacturing system 100 in accordance with the illustrative embodiments of the present invention.

Axis of a Pyramid—For the purposes of this specification, the term "axis of a pyramid" is defined as a straight line that intersects the apex of the pyramid and that has a congruent angle between it and each lateral edge of the pyramid.

Bilateral Shape Similarity—For the purposes of this specification, the term "bilateral shape similarity" of volume a with respect to volume b equals the harmonic mean of a#b and b#a. The bilateral shape similarity of volume a with respect to volume b is notated as aΔb.

Blind Hole—For the purposes of this specification, the term "blind hole" is defined as hole in a material composing an article of manufacture that is created to a specified depth without breaking through to the other side of the material.

Conical Apex—For the purposes of this specification, the term "conical apex" is defined as a synonym of "the apex of a cone."

Conical Fiducial Mark—For the purposes of this specification, the term "conical fiducial mark" is defined as hole in a material composing an article of manufacture, which hole is defined, at least in part, by a portion of a tangible conical surface.

Conical-Surface Area—For the purposes of this specification, the term "conical-surface area" is defined as the area of the portion of the tangible conical surface in the hole. Note that the area of the base of the cone is not included in the conical-surface area because the base of the cone is not represented by a tangible surface.

Conical-Surface Volume—For the purposes of this specification, the term "conical-surface volume" is defined as the volume of three-dimensional space that is surrounded by the portion of the tangible conical surface in the hole.

Fiducial Reference Point—For the purposes of this specification, the term "fiducial reference point" is defined a point in three-dimensional space.

Frustum of a Cone—For the purposes of this specification, the term "frustum of a cone" is defined as a portion of a cone cut off by a plane.

Frustum of a Pyramid—For the purposes of this specification, the term "frustum of a pyramid" is defined as a portion of a pyramid cut off by a plane.

Inferior Surface—For the purposes of this specification, the term "inferior surface" is defined as the surface of a material composing an article of manufacture through which the tool that creates a representative fiducial mark exits the material.

Pyramid—For the purposes of this specification, the term "pyramid" and its inflected form is defined as three or more triangular planar faces that intersect at a single point, which point is the pyramidal apex.

Pyramidal Apex—For the purposes of this specification, the term "pyramidal apex" is defined as a the point at which three or more triangular faces of a pyramid intersect. A "pyramidal apex" is a synonym of "the apex of a pyramid."

Pyramidal Axis—For the purposes of this specification, the term "pyramidal axis" is a synonym of "axis of a pyramid."

Pyramidal Fiducial Mark—For the purposes of this specification, the term "pyramidal fiducial mark" is defined as hole in a material composing an article of manufacture, which hole is defined, at least in part, by a portion of a tangible pyramidal surface.

Pyramidal-Surface Area—For the purposes of this specification, the term "pyramidal-surface area" is defined as the area of the portion of the tangible pyramidal surface in the hole. Note that the area of the base of the pyramid is not included in the conical-surface area because the base of the pyramid is not represented by a tangible surface.

Pyramidal-Surface Volume—For the purposes of this specification, the term "pyramidal-surface volume" is defined as the volume of three-dimensional space that is surrounded by the portion of the tangible pyramidal surface in the hole.

Representative Fiducial Mark—For the purposes of this specification, the term "representative fiducial mark" is defined as a three-dimensional structure that memorializes and establishes the location of a fiducial reference point in three-dimensional space. In accordance with the illustrative embodiment, there are three kinds of representative fiducial marks: (1) a tangible conical surface, (2) a tangible spheroidal surface, and (3) a tangible pyramidal surface.

Spherical Cap—For the purposes of this specification, the term "spherical cap" is defined as a portion of a sphere cut off by a plane.

Spherical Segment—For the purposes of this specification, the term "spherical segment" is defined as a portion of a sphere that is cut off by two parallel planes.

Spheroidal Cap—For the purposes of this specification, the term "spheroidal cap" is defined as a portion of a spheroid cut off by a plane.

Spheroidal Fiducial Mark—For the purposes of this specification, the term "spheroidal fiducial mark" is defined as hole in a material composing an article of manufacture, which hole is defined, at least in part, by a portion of a tangible spheroidal surface.

Spheroidal Segment—For the purposes of this specification, the term "spheroidal segment" is defined as a spheroid that is cut off by two parallel planes.

Spheroidal-Surface Area—For the purposes of this specification, the term "spheroidal-surface area" is defined as the area of the portion of the tangible spheroidal surface in the hole.

Spheroidal-Surface Volume—For the purposes of this specification, the term "spheroidal-surface volume" is defined as the volume of three-dimensional space that is surrounded by the portion of the tangible conical spheroidal in the hole.

Superior Surface—For the purposes of this specification, the term "superior surface" is defined as the surface of a material composing an article of manufacture into which the tool that creates a representative fiducial mark enters the material.

Tangible Conical Surface—For the purposes of this specification, the term "tangible conical surface" is defined as a three-dimensional tangible surface that establishes the spatial parameters of (i) a cone, (ii) conical apex, (iii) a conical axis, (iv) a conical-surface area, and (v) a conical-surface volume.

Tangible Pyramidal Surface—For the purposes of this specification, the term "tangible pyramidal surface" is defined as a three-dimensional tangible surface that establishes the spatial parameters of (i) a pyramid, (ii) a pyramidal apex, (iii) a pyramidal axis, (iv) a pyramidal-surface area, and (v) a pyramidal-surface volume.

Tangible Spheroidal Surface—For the purposes of this specification, the term "tangible spheroidal surface" is defined as a three-dimensional tangible surface that establishes the spatial parameters of (i) a spheroid, (ii) a center of the spheroid, (iii) a spheroidal axis of symmetry (for prolate spheroids and oblate spheroids), (iv) a spheroidal-surface area, and (v) a spheroidal-surface volume.

Through Hole—For the purposes of this specification, the term "through hole" is defined as a hole in an article of manufacture that penetrates both a superior surface and an inferior surface of the material composing the article of manufacture.

Unilateral Shape Similarity—For the purposes of this specification, the term "unilateral shape similarity" of volume a with respect to volume b is defined as the maximum percentage of volume a that can be superimposed, without deformation, within volume b. The unilateral shape similarity of volume a with respect to volume b is notated as a#b.

FIG. 1 depicts an illustration of the salient components of additive manufacturing system 100 in accordance with the illustrative embodiments of the present invention. Additive manufacturing system 100 comprises: controller 101, build chamber 102, turntable 110, deposition build plate 111, robot 121, deposition head 122, filament conditioning unit 129, filament source 130, and thermoplastic filament 131. The purpose of manufacturing system 100 is to fabricate article of manufacture 151 (hereinafter "article 151").

Controller 101 comprises the hardware and software necessary to direct build chamber 102, robot 121, deposition head 122, and turntable 110, in order to fabricate article 151. It will be clear to those skilled in the art how to make and use controller 101.

Build chamber 102 is a thermally-insulated, temperature-controlled environment in which article 151 is fabricated. It will be clear to those skilled in art how to make and use build chamber 102.

Turntable 110 comprises a stepper motor—under the control of controller 101—that is capable of rotating build plate 111 (and, consequently article 151) around the Z-axis (i.e., orthogonal to the build plate). In particular, turntable 110 is capable of:
  i. rotating build plate 111 clockwise around the Z-axis from any angle to any angle, and
  ii. rotating build plate 111 counter-clockwise around the Z-axis from any angle to any angle, and
  iii. rotating build plate 111 at any rate, and
  iv. maintaining (statically) the position of build plate 111 at any angle.

It will be clear to those skilled in the art how to make and use turntable 110.

Build plate 111 is a platform comprising hardware on which article 151 is fabricated. Build plate 111 is configured to receive heated filament deposited by deposition head 122. It will be clear to those skilled in the art how to make and use build plate 111.

Robot 121 is capable of depositing a segment of fiber-reinforced thermoplastic filament from any three-dimensional coordinate in build chamber 102 to any other three-dimensional coordinate in build chamber 102 with deposition head 122 at any approach angle. To this end, robot 121 comprises a multi-axis (e.g., six-axis, seven-axis, etc.), mechanical arm that is under the control of controller 101. The mechanical arm comprises first arm segment 123, second arm segment 124, and third arm segment 125. The joints between adjoining arm segments are under the control of controller 101. A non-limiting example of robot 121 is the IRB 4600 robot offered by ABB. It will be clear to those skilled in the art how to make and use robot 121.

The mechanical arm of robot 121 can move deposition head 122 in:
  i. the +X direction,
  ii. the −X direction,
  iii. the +Y direction,
  iv. the −Y direction,
  v. the +Z direction,
  vi. the −Z direction, and
  vii. any combination of i, ii, iii, iv, v, and vi,
while rotating the approach angle of deposition head 122 around any point or temporal series of points. It will be clear to those skilled in the art how to make and use robot 121.

Deposition head 122 comprises hardware that is under the control of controller 101 and that deposits fiber-reinforced thermoplastic filament 131. Deposition head 122 is described in detail in United States patent applications:
  (i) Ser. No. 15/827,721, entitled "Filament Guide," filed on Nov. 30, 2017;
  (ii) Ser. No. 15/827,711, entitled "Filament Heating in 3D Printing Systems," filed on Nov. 30, 2017;
  (iii) Ser. No. 15/854,673, entitled "Alleviating Torsional Forces on Fiber-Reinforced Thermoplastic Filament," filed on Dec. 26, 2017;
  (iv) Ser. No. 15/854,676, entitled "Depositing Arced Portions of Fiber-Reinforced Thermoplastic Filament," filed Dec. 26, 2017;
all of which are incorporated by reference for the purpose of describing additive manufacturing system 100 in general, and deposition head 122 in particular.

Filament conditioning unit 129 comprises hardware that pre-heats filament 131 prior to deposition. It will be clear to those skilled in the art how to make and use filament conditioning unit 129.

Filament 131 comprises a tow of reinforcing fibers that is substantially parallel to its longitudinal axis. In accordance with the illustrative embodiments, filament 131 comprises a cylindrical towpreg of contiguous 12K carbon fiber that is impregnated with thermoplastic resin. Thermoplastic filament 131 comprises contiguous carbon fiber, but it will be clear to those skilled in the art, after reading this disclosure, how to make and use alternative embodiments of the present invention in which thermoplastic filament 131 has a different fiber composition.

It will be clear to those skilled in the art, after reading this disclosure, how to make and use alternative embodiments of the present invention in which filament 131 comprises a different number of fibers (e.g., 1K, 3K, 6K, 24K, etc.). It will be clear to those skilled in the art, after reading this disclosure, how to make and use alternative embodiments of the present invention in which the fibers in filament 131 are made of a different material (e.g., fiberglass, aramid, carbon nanotubes, etc.).

In accordance with the illustrative embodiments, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK). As those who are skilled in the art will appreciate after reading this specification, the disclosed annealing process, as it pertains to a semi-crystalline polymer in general, takes place at a temperature that is above the glass transition temperature Tg.

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC). As those who are skilled in the art will appreciate after reading this specification, the disclosed annealing process, as it pertains to a blend of an amorphous polymer with a semi-crystalline polymer, takes place generally at a lower temperature than a semi-crystalline polymer with the same glass transition temperature; in some cases, the annealing process can take place at a temperature slightly below the glass transition temperature.

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed article.

In some alternative embodiment of the present invention, the filament comprises a metal. For example, and without limitation, the filament can be a wire comprising stainless steel, Inconel® (nickel/chrome), titanium, aluminum, cobalt chrome, copper, bronze, iron, precious metals (e.g., platinum, gold, silver, etc.).

Figure 2:
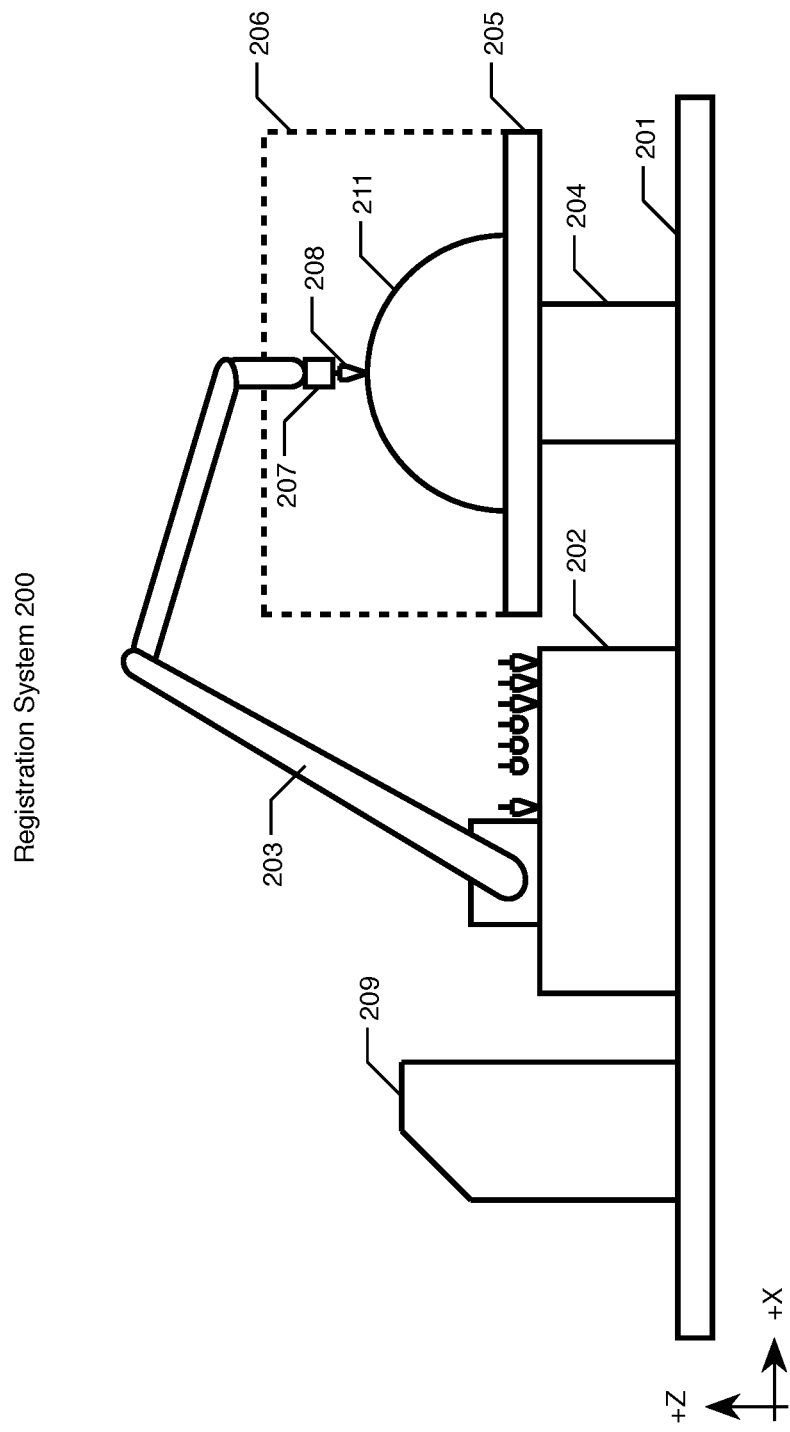
FIG. 2 depicts an illustration of registration system 200 in accordance with the illustrative embodiment of the present invention.

FIG. 2 depicts an illustration of registration system 200 in accordance with the illustrative embodiment of the present invention. Registration system 200 comprises: platform 201, robot mount and end-effector holder 202, articulated robot arm 203, build-plate support 204, build plate 205, end-effector chuck 207, end effector 208, and control station 209. Also shown in FIG. 2, but not a part of registration system 200, is registration volume 206 and article of manufacture 211.

Platform 201 is a rigid structure that ensures that the relative spatial relationship of robot mount and end-effector holder 202, articulated robot arm 203, end-effector chuck 207, and end effector 208 are maintained and knowable with respect to build-plate support 204, build plate 205, and article of manufacture 211. It will be clear to those skilled in the art how to make and use platform 201.

Robot mount and end-effector holder 202 is a rigid and stable support for articulated robot arm 203 and is readily-accessible storage for the end-effectors (e.g., conic drill bit 251, spheroidal drill bit 252, conic melting tip 253, spheroidal melting tip 254, pyramidal melting tip 255, conical probe 256, spheroidal probe 257, pyramidal probe 258, etc., which are described in detail below and in the accompanying figures) that are not currently in end-effector chuck 208. It will be clear to those skilled in the art how to make and use robot mount and end-effector holder 202.

Articulated robot arm 203 is a six-axis robotic arm that comprises the actuators (e.g., motors, etc.), sensors, and electronics capable of placing the tip of end effector 208—under the command of control station 209—at any location within registration volume 206 and from any approach angle. It will be clear to those skilled in the art how to make articulated robot arm 203.

Build plate support 204 is a rigid and stable support for build plate 205 and article of manufacture 211. Furthermore, build-plate support 204 is capable of rotating build plate 205 (and with it article of manufacture 211) around the Z-axis from any angular position to any angular position under the command of control station 209. The fact that build-plate support 204 can rotate increases the number of options that articulated robot arm 203 has for placing the tip of end effector 208 at any location within registration volume 206 and from any approach angle. It will be clear to those skilled in the art how to make build-plate support 204.

Build plate 205 is a rigid support onto which article of manufacture 211 is affixed so that it cannot move or rotate. It will be clear to those skilled in the art how to make and use build plate 205.

Registration volume 206 is the region in three-dimensional space in which articulated robot arm 203 is capable of placing the tip of end effector 208. Article of manufacture 211 exists completely within registration volume 206.

End-effector chuck 207 comprises the hardware to:
 (i) pick up any end effector in end-effector storage 202, and
 (ii) incorporate a fiducial reference point at any location in registration volume 206 by removing a portion of article of manufacture 211 by drilling a hole into article of manufacture 211 at any location from any approach angle with an end-effector drill bit (e.g., conic drill bit 251, spheroidal drill bit 252, etc.), and
 (iii) incorporate a fiducial reference point at any location in registration volume 206 by removing a portion of article of manufacture 211 by melting a hole into article of manufacture 211 at any location from any approach angle with an end-effector melting tip (e.g., conic melting tip 253, spheroidal melting tip 254, pyramidal melting tip 255, etc.), and
 (iv) probe a hole at any location from any approach angle in article of manufacture 211 to locate a fiducial reference point with an end-effector probe (e.g., conic probe 256, spheroidal probe 257, pyramidal probe 258, etc.), and
 (v) store any end effector into end-effector storage 202.

It will be clear to those skilled in the art how to make and use end-effector chuck 207.

End effector 208 is an article of manufacture that is capable of either incorporating a fiducial reference point at a specific location in article of manufacture 211 or of locating a fiducial reference point in article of manufacture 211. In accordance with the illustrative embodiment, there are eight end effectors—five for incorporating a fiducial reference point and three for locating a fiducial reference point. The five end effectors for incorporating fiducial reference points are:

(i) conic drill bit 251, and
(ii) spheroidal drill bit 252, and
(iii) conic melting tip 253, and
(iv) spheroidal melting tip 254, and
(v) pyramidal melting tip 255.

Each of these is described below and in the accompanying figures. The three end effectors for locating fiducial reference points are:

(i) conical probe 256, and
(ii) spheroidal probe 257, and
(iii) pyramidal probe 258.

Each of these eight end effectors is described below and in the accompanying figures.

Control station 209 comprises the hardware and software necessary to operate registration system 200. It will be clear to those skilled in the art, after reading this disclosure, how to make and use control station 209.

Figure 3C:
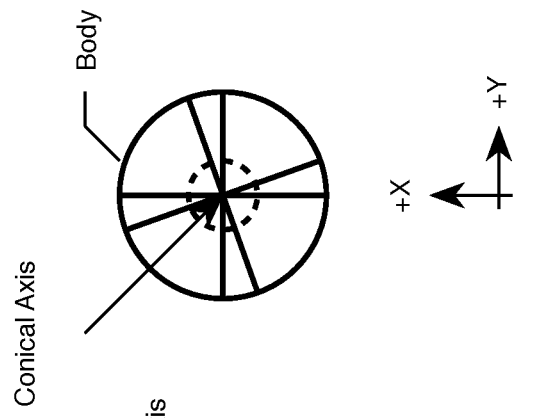
FIG. 3c depicts an orthogonal bottom view of conic drill bit 251 in accordance with the illustrative embodiment of the present invention.
Figure 3B:
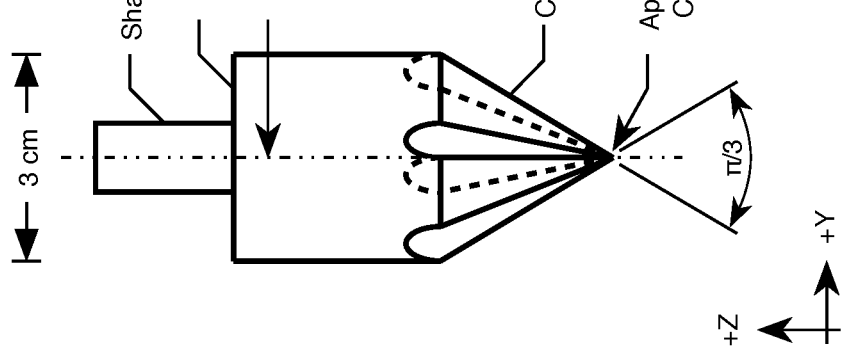
FIG. 3b depicts an orthogonal side view of conic drill bit 251 in accordance with the illustrative embodiment of the present invention.
Figure 3A:
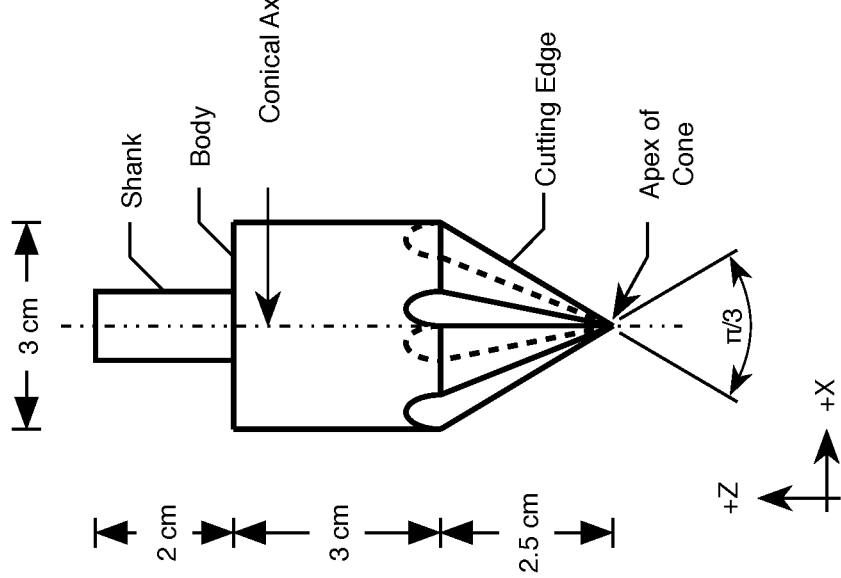
FIG. 3a depicts an orthogonal front view of conic drill bit 251 in accordance with the illustrative embodiment of the present invention.

FIGS. 3a, 3b, and 3c depict the orthogonal front, side, and bottom views, respectively, of conic drill bit 251 in accordance with the illustrative embodiment of the present invention.

Conic drill bit 251 is used by the illustrative embodiment to establish a fiducial reference point at a location in the coordinate system of an article of manufacture. In accordance with the illustrative embodiment, the fiducial reference point can be:

(i) on the surface of the material composing the article of manufacture, or
(ii) within (i.e., buried) the material composing the article of manufacture (when using a frustum of a conic drill bit), or
(iii) outside the material composing the article of manufacture with no tangible connection to the article of manufacture.

When conic drill bit 251 is used to establish a fiducial reference point, the fiducial reference point is represented by the apex of a cone (also herein called a "conical apex"). It is well known to those skilled in the art that a conical apex—like a fiducial reference point—is a geometric point.

In accordance with the illustrative embodiment, conic drill bit 251 establishes a fiducial reference point (i.e., the conical apex) at a location in the coordinate system of the article of manufacture by drilling a hole into the material that composes the article of manufacture, wherein the hole is defined, at least in part, by a portion of a tangible conical surface.

Thereafter, the location of the apex of the cone (i.e., the fiducial reference point) can be determined by probing the portion of the tangible conical surface to determine its spatial parameters. After the spatial parameters of the portion of the tangible conical surface are determined, it is well known to those skilled in the art how to determine the spatial parameters of the associated cone. After the spatial parameters of the cone are determined, it is well known to those skilled in the art how to determine the location of the apex of the cone (i.e., the fiducial reference point). A probe that is specifically designed for probing the portion of the tangible conical surface and determining its spatial parameters is described below and in the accompanying figures.

Referring again to FIGS. 3a, 3b, and 3c, conic drill bit 251 comprises a shank, a body, and a cutting surface.

In accordance with the illustrative embodiment, conic drill bit 251 is fabricated out of tungsten carbide, but it will be clear to those skilled in the art how to make and use alternative embodiments of the present invention in which a conic drill bit is fabricated out of another material or materials.

In accordance with the illustrative embodiment, the shank of conic drill bit 251 has a length of 2 cm and a diameter of 1 cm It will be clear to those skilled in the art how to make and use alternative embodiments of the present invention in which the shank has different dimensions.

In accordance with the illustrative embodiment, the body of conic drill bit 251 has a length of 3 cm and a diameter of 3 cm. It will be clear to those skilled in the art how to make and use alternative embodiments of the present invention in which the body has different dimensions.

In accordance with the illustrative embodiment, the cutting surface of conic drill bit 251 is a right-circular cone with an drill point angle (i.e., apex angle) of $\pi/3$ radians (i.e., 60°). The axis of the right-circular cone of the cutting surface is collinear with the axis of rotation of conic drill bit 251. In addition, the cutting surface of conic drill bit 251 comprises four equally-spaced flutes. It will be clear to those skilled in the art, after reading this disclosure, how to make and use alternative embodiments of the present invention in which the cutting surface of a conic drill bit has any "apex angle" or "drill point angle (e.g., $\pi/6$ radians, $\pi/4$ radians, etc.) and any number of flutes.

It will also be clear to those skilled in the art, after reading this disclosure, how to make and use alternative embodiments of the present invention in which the cutting surface of a conic drill bit comprises only the frustum of a cone, with or without a pilot like used with spheroidal drill bit 252. When, for example, a frustum-of-a-cone drill bit is used to drill a blind hole into the material composing an article of manufacture, the apex of the cone can be buried within the material or, alternatively, outside the inferior surface.

Figure 18A:
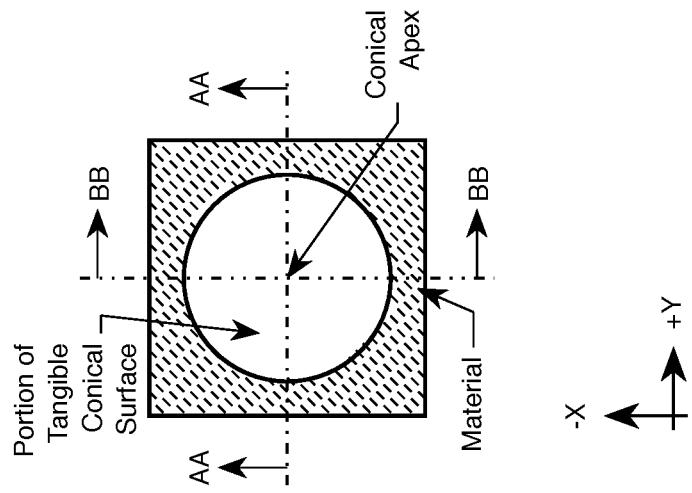
FIG. 18a depicts an orthogonal front view of conical blind hole 1800 in thermoplastic in accordance with the illustrative embodiment of the present invention.
Figure 18B:
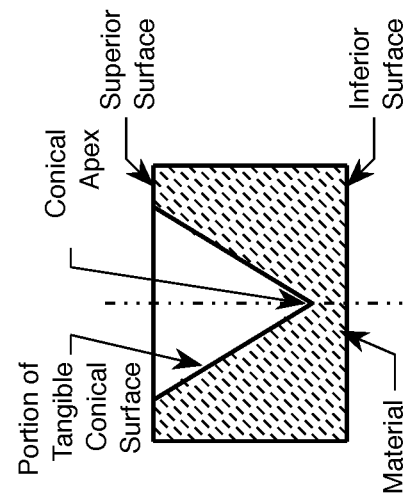
FIG. 18b depicts an orthogonal side view of conical blind hole 1800 in thermoplastic in accordance with the illustrative embodiment of the present invention.
Figure 18C:
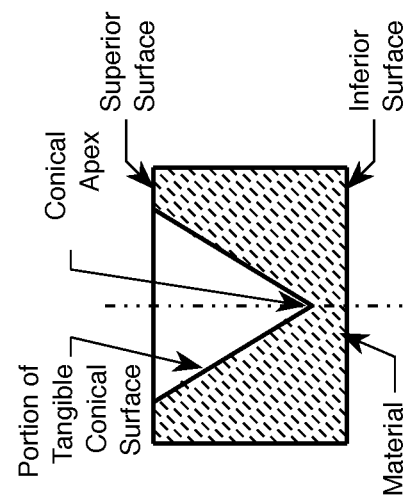
FIG. 18c depicts an orthogonal bottom view of conical blind hole 1800 in thermoplastic in accordance with the illustrative embodiment of the present invention.

Conic drill bit 251 is capable of drilling a "blind" hole into the material (e.g., thermoplastic, fiber-reinforced thermoplastic, thermoset, fiber-reinforced thermoset, metal, glass, ceramic, composite, etc.) composing the article of manufacture such that the blind hole is defined, at least in part, by a portion of a tangible conical surface. FIGS. 18a, 18b, and 18c depict a blind hole—conic blind hole 1800—that is defined by a portion of a tangible conical surface.

Figure 19A:
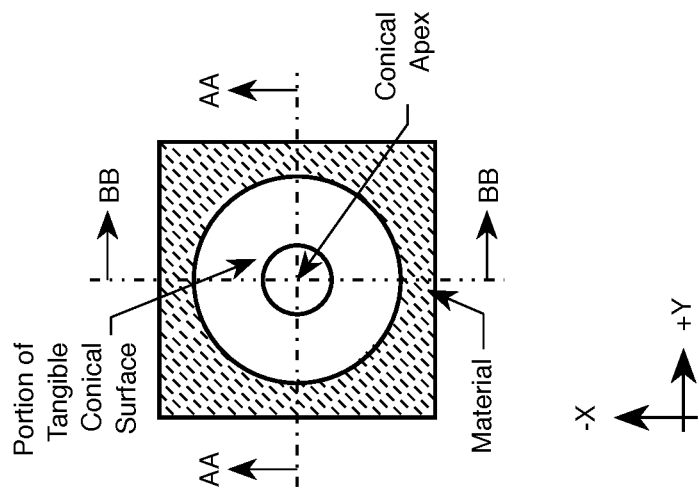
FIG. 19a depicts an orthogonal front view of conical through hole 1900 in thermoplastic in accordance with the illustrative embodiment of the present invention.
Figure 19B:
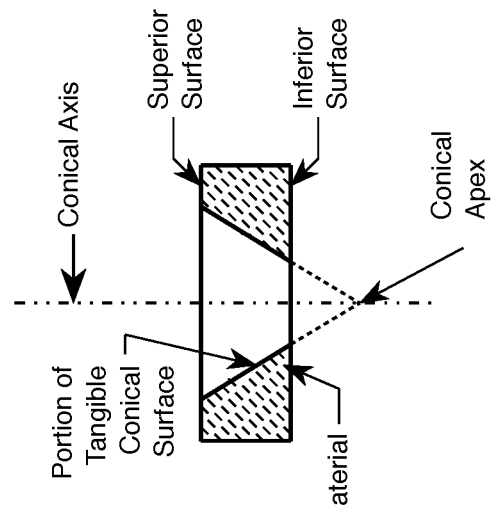
FIG. 19b depicts an orthogonal side view of conical through hole 1900 in thermoplastic in accordance with the illustrative embodiment of the present invention.
Figure 19C:
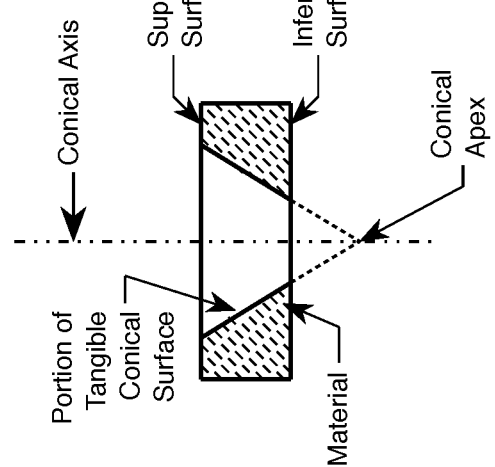
FIG. 19c depicts an orthogonal bottom view of conical through hole 1900 in thermoplastic in accordance with the illustrative embodiment of the present invention.

Conic drill bit 251 is also capable of drilling a "through" hole into the material (e.g., thermoplastic, fiber-reinforced thermoplastic, thermoset, fiber-reinforced thermoset, metal, glass, ceramic, composite, etc.) composing the article of manufacture such that the through hole is defined, at least in part, by a portion of a tangible conical surface. FIGS. 19a, 19b, and 19c depict a through hole—conic through hole 1900—that is defined by a portion of a tangible conical surface.

In accordance with the illustrative embodiment—although it is not possible in every instance—the portion of the tangible conical surface is advantageously embedded so that the conical axis passes through the fiducial reference point and is normal to the superior surface. It will be clear to those skilled in the art, after reading this disclosure, how to make and use alternative embodiments of the present invention in which the conical axis has any relationship to the superior surface (and inferior surface, if any).

In accordance with the illustrative embodiment, each conic blind hole and each conic through hole is characterized by two metrics:
  (i) the "conical-surface area," and
  (ii) the "conical-surface volume."

The conical-surface area and the conical-surface volume can be, but are not necessarily, related to:
  (i) the amount of material removed to create the hole, or
  (ii) the contour of the superior surface before or after the hole is created, or
  (iii) the contour of the inferior surface (if any) before or after the hole is created.

For the purposes of this specification, the term "conical-surface area" is defined as the area of the portion of the tangible conical surface in the hole. For example, when the superior surface is planar and the conical axis is normal to the superior surface, the conical-surface area S of the conic blind hole equals:

$$S = \pi R(R + \sqrt{h^2 + R^2}) \quad \text{(Eq. 1)}$$

where R is the radius of the cone at the superior surface and h is the distance from the apex to the plane containing the superior surface. As another example, when the superior and inferior surfaces are planar and parallel and the conical axis is normal to the superior surface, the conical-surface area S of the conic through hole equals:

$$S = \pi(R+r)\sqrt{(R+r)^2 + h^2} \quad \text{(Eq. 2)}$$

where R is the radius of the cone at the superior surface, r is the radius of the cone at the inferior surface, and h is the normal distance from the plane containing the inferior surface to the plane containing the superior surface. It will be clear to those skilled in the art how to calculate (analytically or numerically) and measure empirically the conical-surface area of any conic blind hole and any conic through hole.

For the purposes of this specification, the term "conical-surface volume" is defined as the volume of three-dimensional space that is surrounded by the portion of the tangible conical surface in the hole. For example, when the superior surface is planar and the conical axis is normal to the superior surface, the conical-surface volume V of the conic blind hole equals:

$$V = \frac{\pi h R^2}{3} \quad \text{(Eq. 3)}$$

where R is the radius of the cone at the superior surface and h is the distance from the apex to the plane containing the superior surface. As another example, when the superior and inferior surfaces are planar and parallel and the conical axis is normal to the superior surface, the conical-surface volume V of the conic through hole equals:

$$V = \frac{\pi h}{3}(R^2 + r^2 + R*r) \quad \text{(Eq. 4)}$$

where R is the radius of the cone at the superior surface, r is the radius of the cone at the inferior surface, and h is the normal distance from the plane containing the inferior surface to the plane containing the superior surface. It will be clear to those skilled in the art how to calculate (analytically or numerically) and measure empirically the volume of any conic blind hole and any conic through hole.

In accordance with the illustrative embodiment it is expected that variations in manufacturing will cause variations in the mass, volume, and dimensions of fabricated articles of manufacture that, in turn, will lead to:
  (i) variations in the conical-surface volumes of the conical holes (blind and through) in a single article of manufacture, and
  (ii) variations in the conical-surface volumes of corresponding conical holes (blind and through) in corresponding articles of manufacture, and
  (iii) variations in the conical-surface areas of the conical holes (blind and through) in a single article of manufacture, and
  (ii) variations in the conical-surface areas of corresponding conical holes (blind and through) in corresponding articles of manufacture.

In accordance with the illustrative embodiment, the material composing an article of manufacture comprises:
  (i) one, two, three, four, or more conic blind holes, or
  (ii) one, two, three, four, or more conic through holes, or
  (iii) any combination of i and ii.

It will be clear to those skilled in the art, after reading this disclosure, how to make and use conic drill bit 251.

FIGS. 4*a*, 4*b*, and 4*c* depict the orthogonal front, side, and bottom views, respectively, of spheroidal drill bit 252 in accordance with the illustrative embodiment of the present invention.

Spheroidal drill bit 252 is used by the illustrative embodiment to establish a fiducial reference point at a location in the coordinate system of an article of manufacture. In accordance with the illustrative embodiment, the fiducial reference point can be:
  (i) on the surface of the material composing the article of manufacture, or
  (ii) within (i.e., buried) the material composing the article of manufacture (when using a frustum of a spheroidal drill bit), or
  (iii) outside the material composing the article of manufacture with no tangible connection to the article of manufacture.

When spheroidal drill bit 252 is used to establish a fiducial reference point, the fiducial reference point is represented by the center of a spheroid. It is well known to those skilled in the art that the center of a spheroid—like a fiducial reference point—is a geometric point.

In accordance with the illustrative embodiment, spheroidal drill bit 252 establishes a fiducial reference point (i.e., the center of a spheroid) at a location in the coordinate system of the article of manufacture by drilling a hole into the material that composes the article of manufacture, wherein the hole is defined, at least in part, by a portion of a tangible spheroidal surface.

Thereafter, the location of the center of the spheroid (i.e., the fiducial reference point) can be determined by probing the portion of the tangible spheroidal surface to determine its spatial parameters. After the spatial parameters of the portion of the tangible spheroidal surface are determined, it is well known to those skilled in the art how to determine the spatial parameters of the associated spheroid. After the spatial parameters of the spheroid are determined, it is well known to those skilled in the art how to determine the location of the center of the spheroid (i.e., the fiducial reference point). A probe that is specifically designed for probing the portion of the tangible spheroidal surface and determining its spatial parameters is described below and in the accompanying figures.

Referring again to FIGS. 4a, 4b, and 4c, spheroidal drill bit 252 comprises a shank, a body, a cutting surface, and a pilot.

In accordance with the illustrative embodiment, spheroidal drill bit 252 is fabricated out of tungsten carbide, but it will be clear to those skilled in the art how to make and use alternative embodiments of the present invention in which a spheroidal drill bit is fabricated out of another material or materials.

In accordance with the illustrative embodiment, the shank of spheroidal drill bit 252 has a length of 2 cm and a diameter of 1 cm It will be clear to those skilled in the art how to make and use alternative embodiments of the present invention in which the shank has different dimensions.

In accordance with the illustrative embodiment, the body of spheroidal drill bit 252 has a length of 3 cm and a diameter of 3 cm. It will be clear to those skilled in the art how to make and use alternative embodiments of the present invention in which the body has different dimensions.

In accordance with the illustrative embodiment, the cutting surface of spheroidal drill bit 252 is a hemisphere (i.e., one half of a sphere) with a radius of 1.5 cm. It will be clear to those skilled in the art, however, after reading this disclosure, how to make and use alternative embodiments of the present invention in which a spheroidal drill bit has a cutting surface that cuts a portion of any tangible spheroidal surface (e.g., a prolate spheroid, an oblate spheroid, a sphere). The axis of rotation of spheroidal drill bit 252 is collinear with the axis of symmetry of the spheroid and intersects the center of the sphere. In addition, the cutting surface of spheroidal drill bit 252 comprises four equally-spaced flutes. It will be clear to those skilled in the art, after reading this disclosure, how to make and use alternative embodiments of the present invention in which the cutting surface of a spheroidal drill bit has any spheroidal size and shape and any number of flutes.

In accordance with the illustrative embodiment, spheroidal drill bit 252 comprises a 1 cm pilot drill bit that assists in drilling. It will be clear to those skilled in the art, after reading this disclosure, how to make and use alternative spheroidal drill bits that do not comprise a pilot.

It will also be clear to those skilled in the art, after reading this disclosure, how to make and use alternative embodiments of the present invention in which the cutting surface of a spheroidal drill bit comprises only the frustum of a spheroid (with or without a pilot).

Figure 20C:
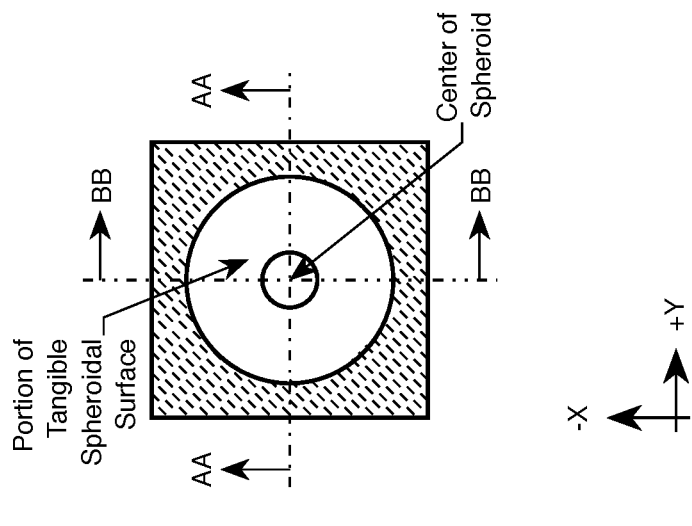
FIG. 20c depicts an orthogonal bottom view of spheroidal blind hole 2000 in thermoplastic in accordance with the illustrative embodiment of the present invention.
Figure 20B:
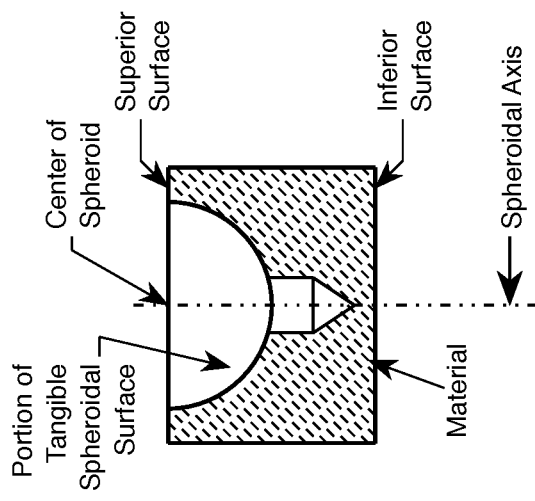
FIG. 20b depicts an orthogonal side view of spheroidal blind hole 2000 in thermoplastic in accordance with the illustrative embodiment of the present invention.
Figure 20A:
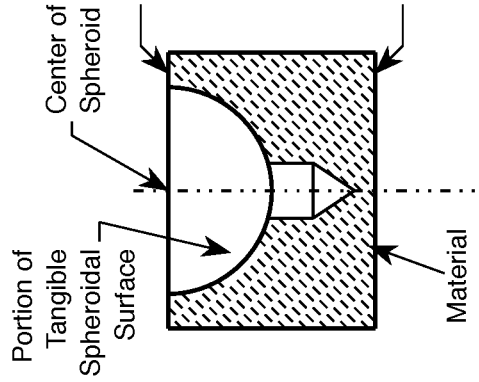
FIG. 20a depicts an orthogonal front view of spheroidal blind hole 2000 in thermoplastic in accordance with the illustrative embodiment of the present invention.

Spheroidal drill bit 252 is capable of drilling a "blind" hole into the material (e.g., thermoplastic, fiber-reinforced thermoplastic, thermoset, fiber-reinforced thermoset, metal, glass, ceramic, composite, etc.) composing the article of manufacture such that the blind hole is defined, at least in part, by a portion of a tangible spheroidal surface. FIGS. 20a, 20b, and 20c depict a blind hole—spheroidal blind hole 2000—that is defined by a portion of a tangible spheroidal surface.

Spheroidal drill bit 252 is also capable of drilling a "through" hole into the material (e.g., thermoplastic, fiber-reinforced thermoplastic, thermoset, fiber-reinforced thermoset, metal, glass, ceramic, composite, etc.) composing the article of manufacture such that the through hole is defined, at least in part, by a portion of a tangible spheroidal surface. FIGS. 21a, 22b, and 23c depict a through hole—spheroidal through hole 2100—that is defined by a portion of a tangible spheroidal surface.

In accordance with the illustrative embodiment—although it is not possible in every instance—the portion of the tangible spheroidal surface is advantageously embedded so that the spheroidal axis of symmetry passes through the fiducial reference point and is normal to the superior surface. It will be clear to those skilled in the art that a prolate spheroid and an oblate spheroid have exactly one spheroidal axis of symmetry and that a sphere has an infinite number of spheroidal axes of symmetry. Furthermore, it will be clear to those skilled in the art, after reading this disclosure, how to make and use alternative embodiments of the present invention in which the spheroidal axis of symmetry passes through the fiducial reference point and has any relationship to the superior surface (and inferior surface, if any).

In accordance with the illustrative embodiment, each spherical blind hole and each spherical through hole is characterized by two metrics:
  (i) the "spheroidal-surface area," and
  (ii) the "spheroidal-surface volume."
The spheroidal-surface area and the spheroidal-surface volume can be, but are not necessarily, related to:
  (i) the amount of material removed to create the hole, or
  (ii) the contour of the superior surface before or after the hole is created, or
  (iii) the contour of the inferior surface (if any) before or after the hole is created.

For the purposes of this specification, the term "spheroidal-surface area" is defined as the area of the portion of the tangible spheroidal surface in the hole. For example, when the superior surface is planar and the spheroidal axis of symmetry of the hole is normal to the superior surface, the spheroidal-surface area S of the spheroidal blind hole equals:

$$S = 2\pi R h \qquad \text{(Eq. 5)}$$

where R is the radius of the circle intersected by the superior surface and h is the radius R minus the distance from the apex to the plane containing the superior surface. As another example, when the superior and inferior surfaces are planar and parallel and the spheroidal axis of symmetry of the hole is normal to the superior surface, the spheroidal-surface area S of a spheroidal through hole equals:

$$S = 2\pi R c \qquad \text{(Eq. 6)}$$

where R is the radius of the circle intersected by the superior surface, and c is the normal distance from the plane containing the inferior surface to the plane containing the superior surface. It will be clear to those skilled in the art how to calculate (analytically or numerically) and measure empirically the spheroidal-surface area of any spheroidal blind hole and any spheroidal through hole.

For the purposes of this specification, the term "spheroidal-surface volume" is defined as the volume of three-dimensional space that is surrounded by the portion of the tangible spheroidal surface in the hole. For example, when the superior surface is planar and the spheroid is a sphere, the spheroidal-surface volume V of a spheroidal blind hole equals:

$$V = \frac{\pi h}{6}(3a^2 + h^2) \qquad \text{(Eq. 7)}$$

where a is the radius of the circle intersected by the superior surface and h equals the radius of the sphere r minus the distance from center of the sphere to the plane containing the superior surface. As another example, when the superior and inferior surfaces are planar and parallel and the spheroid is a sphere, the spheroidal-surface volume V of a spheroidal through hole equals:

$$V = \frac{\pi h}{6}(3a^2 + 3b^2 + h^2) \qquad \text{(Eq. 8)}$$

where a is the radius of the circle intersected by the superior surface, b is the radius of the circle intersected by the inferior surface, and h is the normal distance from the plane containing the inferior surface to the plane containing the superior surface. It will be clear to those skilled in the art how to calculate (analytically or numerically) and measure empirically the spheroidal-surface volume of any spheroidal blind hole and any spheroidal through hole.

In accordance with the illustrative embodiment it is expected that variations in manufacturing will cause variations in the mass, volume, and dimensions of fabricated articles of manufacture that, in turn, will lead to:

(i) variations in the spheroidal-surface volumes of the spheroidal holes (blind and through) in a single article of manufacture, and (ii) variations in the spheroidal-surface volumes of corresponding spheroidal holes (blind and through) in corresponding articles of manufacture, and (iii) variations in the spheroidal-surface areas of the spheroidal holes (blind and through) in a single article of manufacture, and (ii) variations in the spheroidal-surface areas of corresponding spheroidal holes (blind and through) in corresponding articles of manufacture.

In accordance with the illustrative embodiment, the material composing an article of manufacture comprises:

(i) one, two, three, four, or more spheroidal blind holes, or (ii) one, two, three, four, or more spheroidal through holes, or (iii) any combination of i and ii.

It will be clear to those skilled in the art, after reading this disclosure, how to make and use spheroidal drill bit 252.

FIGS. 5a, 5b, and 5c depict the orthogonal front, side, and bottom views, respectively, of conic melting tip 253 in accordance with the illustrative embodiment of the present invention.

Conic melting tip 253 is used by the illustrative embodiment to establish a fiducial reference point at a location in the coordinate system of an article of manufacture. In accordance with the illustrative embodiment, the fiducial reference point can be:

(i) on the surface of the material composing the article of manufacture, or (ii) within (i.e., buried) the material composing the article of manufacture (when using a frustum of a conic melting tip), or (iii) outside the material composing the article of manufacture with no tangible connection to the article of manufacture.

When conic melting tip 253 is used to establish a fiducial reference point, the fiducial reference point is represented by the apex of a cone (also herein called "a conical apex"). It is well known to those skilled in the art that a conical apex—like a fiducial reference point—is a geometric point.

In accordance with the illustrative embodiment, conic melting tip 253 establishes a fiducial reference point (i.e., the conical apex) at a location in the coordinate system of the article of manufacture by melting a hole into the material that composes the article of manufacture, wherein the hole is defined, at least in part, by a portion of a tangible conical surface.

Thereafter, the location of the apex of the cone (i.e., the fiducial reference point) can be determined by probing the portion of the tangible conical surface to determine its spatial parameters. After the spatial parameters of the portion of the tangible conical surface are determined, it is well known to those skilled in the art how to determine the spatial parameters of the associated cone. After the spatial parameters of the cone are determined, it is well known to those skilled in the art how to determine the location of the apex of the cone (i.e., the fiducial reference point). A probe that is specifically designed for probing the portion of the tangible conical surface and determining its spatial parameters is described below and in the accompanying figures.

Referring again to FIGS. 5a, 5b, and 5c, conic melting tip 253 comprises a shank, a body, and a melting surface.

In accordance with the illustrative embodiment, conic drill bit 251 is fabricated out of steel, but it will be clear to those skilled in the art how to make and use alternative embodiments of the present invention in which a conic drill bit is fabricated out of another material or materials.

In accordance with the illustrative embodiment, the shank of conic melting tip 253 has a length of 2 cm and a diameter of 1 cm It will be clear to those skilled in the art how to make and use alternative embodiments of the present invention in which the shank has different dimensions.

In accordance with the illustrative embodiment, the body of conic melting tip 253 has a length of 3 cm and a diameter of 3 cm. It will be clear to those skilled in the art how to make and use alternative embodiments of the present invention in which the body has different dimensions.

In accordance with the illustrative embodiment, the melting surface of conic melting tip 253 is a right-circular cone with an apex angle of $\pi/3$ radians (i.e., 60°). The axis of the right-circular cone of the melting surface is collinear with the axis of conic melting tip 253. It will be clear to those skilled in the art, after reading this disclosure, how to make and use alternative embodiments of the present invention in which the melting surface of a conic melt tip has any apex angle.

It will also be clear to those skilled in the art, after reading this disclosure, how to make and use alternative embodiments of the present invention in which the melting surface of a conic melting tip comprises only the frustum of a cone. When, for example, a frustum-of-a-cone melting tip is used to drill a blind hole into the material composing an article of manufacture, the apex of the cone can be buried within the material or, alternatively, outside the inferior surface.

Conic melting tip 253 is capable of drilling a "blind" hole into the material (e.g., thermoplastic, fiber-reinforced thermoplastic, thermoset, fiber-reinforced thermoset, metal, glass, ceramic, composite, etc.) composing the article of manufacture such that the blind hole is defined, at least in part, by a portion of a tangible conical surface. FIGS. 18a, 18b, and 18c depict a blind hole—conic blind hole 1800—that is defined by a portion of a tangible conical surface.

Conic melting tip 253 is also capable of drilling a "through" hole into the material (e.g., thermoplastic, fiber-reinforced thermoplastic, thermoset, fiber-reinforced thermoset, metal, glass, ceramic, composite, etc.) composing the article of manufacture such that the through hole is defined, at least in part, by a portion of a tangible conical surface. FIGS. 19a, 19b, and 19c depict a through hole—conic through hole 1900—that is defined by a portion of a tangible conical surface.

In accordance with the illustrative embodiment—although it is not possible in every instance—the portion of the tangible conical surface is advantageously embedded so that the conical axis passes through the fiducial reference point and is normal to the superior surface. It will be clear to those skilled in the art, after reading this disclosure, how to make and use alternative embodiments of the present invention in which the conical axis has any relationship to the superior surface (and inferior surface, if any).

It will be clear to those skilled in the art, after reading this disclosure, how to make and use melting tip 253.

FIGS. 6a, 6b, and 6c depict the orthogonal front, side, and bottom views, respectively, of spheroidal melting tip 254 in accordance with the illustrative embodiment of the present invention.

Spheroidal melting tip 254 is used by the illustrative embodiment to establish a fiducial reference point at a location in the coordinate system of an article of manufacture. In accordance with the illustrative embodiment, the fiducial reference point can be:
  (i) on the surface of the material composing the article of manufacture, or
  (ii) within (i.e., buried) the material composing the article of manufacture (when using a frustum of a spheroidal melting tip), or
  (iii) outside the material composing the article of manufacture with no tangible connection to the article of manufacture.

When spheroidal melting tip 254 is used to establish a fiducial reference point, the fiducial reference point is represented by the center of a spheroid. It is well known to those skilled in the art that the center of a spheroid—like a fiducial reference point—is a geometric point.

In accordance with the illustrative embodiment, spheroidal melting tip 254 establishes a fiducial reference point (i.e., the center of a spheroid) at a location in the coordinate system of the article of manufacture by melting a hole into the material that composes the article of manufacture, wherein the hole is defined, at least in part, by a portion of a tangible spheroidal surface.

Thereafter, the location of the center of the spheroid (i.e., the fiducial reference point) can be determined by probing the portion of the tangible spheroidal surface to determine its spatial parameters. After the spatial parameters of the portion of the tangible spheroidal surface are determined, it is well known to those skilled in the art how to determine the spatial parameters of the associated spheroid. After the spatial parameters of the spheroid are determined, it is well known to those skilled in the art how to determine the location of the center of the spheroid (i.e., the fiducial reference point). A probe that is specifically designed for probing the portion of the tangible spheroidal surface and determining its spatial parameters is described below and in the accompanying figures.

Referring again to FIGS. 6a, 6b, and 6c, spheroidal melting tip 254 comprises a shank, a body, a spheroidal melting surface, and a pilot.

In accordance with the illustrative embodiment, spheroidal melting tip 254 is fabricated out of steel, but it will be clear to those skilled in the art how to make and use alternative embodiments of the present invention in which a spheroidal melting tip is fabricated out of another material or materials.

In accordance with the illustrative embodiment, the shank of spheroidal melting tip 254 has a length of 2 cm and a diameter of 1 cm It will be clear to those skilled in the art how to make and use alternative embodiments of the present invention in which the shank has different dimensions.

In accordance with the illustrative embodiment, the body of spheroidal melting tip 254 has a length of 3 cm and a diameter of 3 cm. It will be clear to those skilled in the art how to make and use alternative embodiments of the present invention in which the body has different dimensions.

In accordance with the illustrative embodiment, the melting surface of spheroidal melting tip 254 hemisphere (i.e., one half of a sphere) with a radius of 1.5 cm. It will be clear to those skilled in the art, however, after reading this disclosure, how to make and use alternative embodiments of the present invention in which a spheroidal melting tip has a melting surface that is one-half of any spheroid (e.g., a prolate spheroid, an oblate spheroid, a sphere). The axis of the shank and body of spheroidal melting tip 254 intersects the center of the spheroid. It will be clear to those skilled in the art, after reading this disclosure, how to make and use alternative embodiments of the present invention in which the melting surface of a spheroidal melt tip has any radius.

In accordance with the illustrative embodiment, spheroidal melting tip 254 comprises a pilot melting tip that assists in melting. It will be clear to those skilled in the art, after reading this disclosure, how to make and use alternative spheroidal melting tips that do not comprise a pilot.

It will also be clear to those skilled in the art, after reading this disclosure, how to make and use alternative embodiments of the present invention in which the melting surface of a spheroidal melting tip comprises only the frustum of a sphere (with or without a pilot).

Spheroidal melting tip 254 is capable of melting a "blind" hole into the material (e.g., thermoplastic, fiber-reinforced thermoplastic, thermoset, fiber-reinforced thermoset, metal, glass, ceramic, composite, etc.) composing the article of manufacture such that the blind hole is defined, at least in part, by a portion of a tangible spheroidal surface. FIGS. 20a, 20b, and 20c depict a blind hole—spheroidal blind hole 2000—that is defined by a portion of a tangible spheroidal surface.

Spheroidal melting tip 254 is also capable of melting a "through" hole into the material (e.g., thermoplastic, fiber-reinforced thermoplastic, thermoset, fiber-reinforced thermoset, metal, glass, ceramic, composite, etc.) composing the article of manufacture such that the through hole is defined, at least in part, by a portion of a tangible spheroidal surface. FIGS. 21a, 22b, and 23c depict a through hole—spheroidal through hole 2100—that is defined by a portion of a tangible spheroidal surface.

In accordance with the illustrative embodiment—although it is not possible in every instance—the portion of the tangible spheroidal surface is advantageously embedded so that the spheroidal axis of symmetry passes through the fiducial reference point and is normal to the superior surface. It will be clear to those skilled in the art that a prolate spheroid and an oblate spheroid have exactly one spheroidal axis of symmetry and that a sphere has an infinite number of spheroidal axes of symmetry. Furthermore, it will be clear to those skilled in the art, after reading this disclosure, how to make and use alternative embodiments of the present invention in which the spheroidal axis of symmetry passes through the fiducial reference point and has any relationship to the superior surface (and inferior surface, if any).

It will be clear to those skilled in the art, after reading this disclosure, how to make and use spheroidal melting tip 254.

Figures 7A, 7B, 7C:
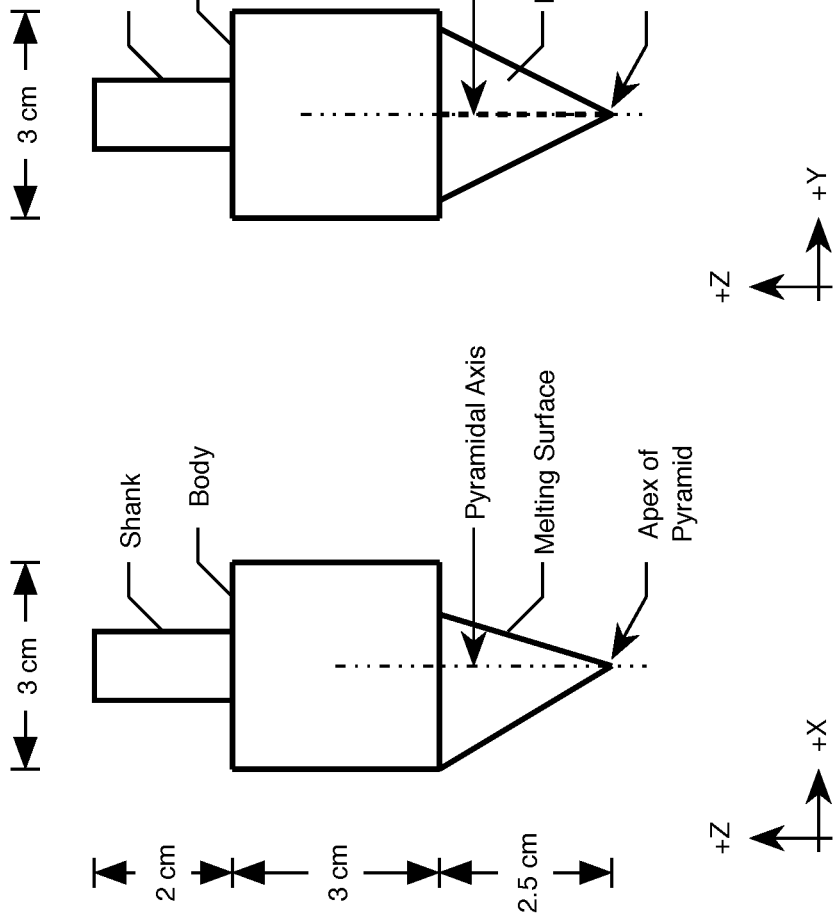
FIG. 7a depicts an orthogonal front view of pyramidal fiducial melting tip 255 in accordance with the illustrative embodiment of the present invention.
FIG. 7b depicts an orthogonal side view of pyramidal fiducial melting tip 255 in accordance with the illustrative embodiment of the present invention.
FIG. 7c depicts an orthogonal bottom view of pyramidal fiducial melting tip 255 in accordance with the illustrative embodiment of the present invention.

FIGS. 7a, 7b, and 7c depict the orthogonal front, side, and bottom views, respectively, of pyramidal melting tip 255 in accordance with the illustrative embodiment of the present invention.

Pyramidal melting tip 255 is used by the illustrative embodiment to establish a fiducial reference point at a location in the coordinate system of an article of manufacture. In accordance with the illustrative embodiment, the fiducial reference point can be:
  (i) on the surface of the material composing the article of manufacture, or
  (ii) within (i.e., buried) the material composing the article of manufacture (when using a frustum of a pyramidal melting tip), or
  (iii) outside the material composing the article of manufacture with no tangible connection to the article of manufacture.

When pyramidal melting tip 255 is used to establish a fiducial reference point, the fiducial reference point is represented by the apex of a pyramid. It is well known to those skilled in the art that the apex of a pyramid—like a fiducial reference point—is a geometric point.

In accordance with the illustrative embodiment, pyramidal melting tip 255 establishes a fiducial reference point (i.e., the apex of a pyramid) at a location in the coordinate system of the article of manufacture by melting a hole into the material that composes the article of manufacture, wherein the hole is defined, at least in part, by a portion of a tangible pyramidal surface.

Thereafter, the location of the apex of the pyramid (i.e., the fiducial reference point) can be determined by probing a portion of the tangible pyramidal surface to determine the spatial parameters of the pyramid. After the spatial parameters of the pyramid are determined, it is well known to those skilled in the art how to determine the apex of the pyramid (i.e., the fiducial reference point). A probe that is specifically designed for probing the portion of the tangible pyramidal surface and determining its spatial parameters is described below and in the accompanying figures.

Referring again to FIGS. 7a, 7b, and 7c, pyramidal melting tip 255 comprises a shank, a body, and a melting surface.

In accordance with the illustrative embodiment, pyramidal melting tip 255 is fabricated out of steel, but it will be clear to those skilled in the art how to make and use alternative embodiments of the present invention in which a pyramidal drill bit is fabricated out of another material or materials.

In accordance with the illustrative embodiment, the shank of pyramidal melting tip 255 has a length of 2 cm and a diameter of 1 cm It will be clear to those skilled in the art how to make and use alternative embodiments of the present invention in which the shank has different dimensions.

In accordance with the illustrative embodiment, the body of pyramidal melting tip 255 has a length of 3 cm and a diameter of 3 cm. It will be clear to those skilled in the art how to make and use alternative embodiments of the present invention in which the body has different dimensions.

In accordance with the illustrative embodiment, the melting surface of pyramidal melting tip 255 comprises the three faces of a regular triangular pyramid. The apex of the pyramid is collinear with the axis of the shank and body of pyramidal melting tip 255. In addition, the dihedral angle between each pair of faces equals $\cos^{-1}(\frac{1}{3}) \approx 70.52°$. It will be clear to those skilled in the art, after reading this disclosure, how to make and use alternative embodiments of the present invention in which the melting surface of a pyramidal melting tip comprises any pyramid (e.g., an irregular three-sided pyramid, a regular four-sided pyramid, an irregular four-sided pyramid, a regular five-sided pyramid, etc.).

It will also be clear to those skilled in the art, after reading this disclosure, how to make and use alternative embodiments of the present invention in which the melting surface of a pyramidal melting tip comprises only the frustum of a pyramid. When, for example, a frustum-of-a-pyramid melting tip is used to melt a blind hole into the material composing an article of manufacture, the apex of the pyramid can be buried within the material or, alternatively, outside the material on the inferior side of the material.

Pyramidal melting tip 255 is capable of melting a "blind" hole into the material (e.g., thermoplastic, fiber-reinforced thermoplastic, thermoset, fiber-reinforced thermoset, metal, glass, ceramic, composite, etc.) composing the article of manufacture such that the blind hole is defined, at least in part, by a portion of a tangible pyramidal surface. FIGS. 22a, 22b, and 22c depict a blind hole—pyramidal blind hole 2200—that is defined by a portion of a tangible pyramidal surface.

Pyramidal melting tip 255 is also capable of melting a "through" hole into the material (e.g., thermoplastic, fiber-reinforced thermoplastic, thermoset, fiber-reinforced thermoset, metal, glass, ceramic, composite, etc.) composing the article of manufacture such that the through hole is defined, at least in part, by a portion of a tangible pyramidal surface. FIGS. 23a, 23b, and 23c depict a through hole—pyramidal through hole 2300—that is defined by a portion of a tangible pyramidal surface.

In accordance with the illustrative embodiment, each pyramidal blind hole and each pyramidal through hole is characterized by two metrics:
  (i) the "pyramidal-surface area," and
  (ii) the "pyramidal-surface volume."
The pyramidal-surface area and the pyramidal-surface volume can be, but are not necessarily, related to:
  (i) the amount of material removed to create the hole, or
  (ii) the contour of the superior surface before or after the hole is created, or
  (iii) the contour of the inferior surface (if any) before or after the hole is created.

For the purposes of this specification, the term "pyramidal-surface area" is defined as the area of the portion of the tangible pyramidal surface in the hole. For example, when the superior surface is planar and the pyramidal axis is normal to the superior surface, the pyramidal-surface area S of a pyramidal blind hole equals:

$$S = \sqrt{3}a^2 \qquad \text{(Eq. 9)}$$

where a is the base edge length of one pyramidal face at the plane containing the superior surface. As another example, when the superior and inferior surfaces are planar and parallel and the pyramidal axis is normal to the superior surface, the pyramidal-surface area S of a pyramidal through hole equals:

$$S = \sqrt{3}(a^2 - b^2) \qquad \text{(Eq. 10)}$$

where a is the base edge length of one pyramidal face at the plane containing the superior surface, and where b is the base edge length of one pyramidal face at the plane containing the inferior surface. It will be clear to those skilled in the art how to calculate (analytically or numerically) and measure empirically the pyramidal-surface area of any pyramidal blind hole and any pyramidal through hole.

For the purposes of this specification, the term "pyramidal-surface volume" is defined as the volume of three-dimensional space that is surrounded by the portion of the tangible pyramidal surface in the hole. For example, when the superior surface is planar, the pyramid is a regular triangular pyramid, and the axis of the pyramid is normal to the superior surface, the pyramidal-surface volume V of a pyramidal blind hole equals:

$$V = \frac{a^3}{6\sqrt{2}} \quad \text{(Eq. 11)}$$

where a is the distance from the apex to the superior surface along the lateral edge of a face of the pyramid. As another example, when the superior and inferior surfaces are planar and parallel, the pyramid is a regular triangular pyramid, and the axis of the pyramid is normal to the superior surface, the pyramidal-surface volume V of a pyramidal through hole equals:

$$V = \frac{a^3 - b^3}{6\sqrt{2}} \quad \text{(Eq. 12)}$$

where a is the distance from the apex to the superior surface along the lateral edge of a face of the pyramid and b is the distance from the apex to the inferior surface along the lateral edge of a face of the pyramid. It will be clear to those skilled in the art how to calculate (analytically or numerically) and measure empirically the volume of any pyramidal blind hole and any pyramidal through hole regardless of the contour of the superior and inferior surfaces, regardless of the relationship of the superior and inferior surfaces, and regardless of the relationship of the pyramidal axis to the superior surface.

In accordance with the illustrative embodiment it is expected that variations in manufacturing will cause variations in the mass, volume, and dimensions of fabricated articles of manufacture that, in turn, will lead to:
  (i) variations in the pyramidal-surface volumes of the pyramidal holes (blind and through) in a single article of manufacture, and
  (ii) variations in the pyramidal-surface volumes of corresponding pyramidal holes (blind and through) in corresponding articles of manufacture, and
  (iii) variations in the pyramidal-surface areas of the pyramidal holes (blind and through) in a single article of manufacture, and
  (ii) variations in the pyramidal-surface areas of corresponding pyramidal holes (blind and through) in corresponding articles of manufacture.

In accordance with the illustrative embodiment, the material composing an article of manufacture comprises:
  (i) one, two, three, four, or more pyramidal blind holes, or
  (ii) one, two, three, four, or more pyramidal through holes, or
  (iii) any combination of i and ii.

It will be clear to those skilled in the art, after reading this disclosure, how to make and use pyramidal melting tip 255.

FIGS. 8a, 8b, and 8c depict the orthogonal front, side, and bottom views, respectively, of conic probe 256 in accordance with the illustrative embodiment of the present invention. Conic probe 256 is used by the illustrative embodiment to locate the conical apex (i.e., the fiducial reference point) that is associated with a hole in the material composing an article of manufacture, which hole is defined, at least in part, by a portion of a tangible conical surface (e.g., a hole made by conic drill bit 251, a hole made by conic melting tip 253, etc). In accordance with the illustrative embodiment, the mating surface of conic probe 256 is the complement of part of the conic cutting surface on conic drill bit 251 and the conic melting surface on conic melting tip 253, and, therefore, the mating surface fits into the tangible conical surface when the axis of the probe is collinear with the axis of the portion of the tangible conical surface. When the mating surface of conic probe 256 fits into the portion of the tangible conical surface, then the spatial parameters of the tangible conical surface can be easily determined. Conic probe 256 works with both blind holes and with through holes.

Referring to FIGS. 8a, 8b, and 8c, conic probe 256 comprises a shank, a body, and a mating surface.

In accordance with the illustrative embodiment, conic probe 256 is fabricated out of steel, but it will be clear to those skilled in the art how to make and use alternative embodiments of the present invention in which a conic probe is fabricated out of one or more other materials.

In accordance with the illustrative embodiment, the shank of conic probe 256 has a length of 2 cm and a diameter of 1 cm. It will be clear to those skilled in the art, after reading this disclosure, how to make and use alternative embodiments of the present invention in which the shank has different dimensions.

In accordance with the illustrative embodiment, the body of conic probe 256 has a length of 4 cm and a diameter of 3 cm. It will be clear to those skilled in the art, after reading this disclosure, how to make and use alternative embodiments of the present invention in which the body has different dimensions.

In accordance with the illustrative embodiment, the mating surface of conic probe 256 is the frustum of a 1 cm high right circular cone whose apex angle corresponds to the apex angle of conic drill bit 251 and conic melting tip 253. The frustum of the cone is bounded by the lower frustum base and the upper frustum base. The mating surface of conic probe 256 is the frustum of a cone rather than a cone so that small amounts of dirt and debris that accumulate in the hole do not hamper the fitting of conic probe 256 into the hole. It will, however, be clear to those skilled in the art, after reading this disclosure, how to make and use alternative embodiments of the present invention in which the conic probe is a full cone.

It will be clear to those skilled in the art, after reading this disclosure, how to make and use conic probe 256.

Figures 9A, 9B, 9C:
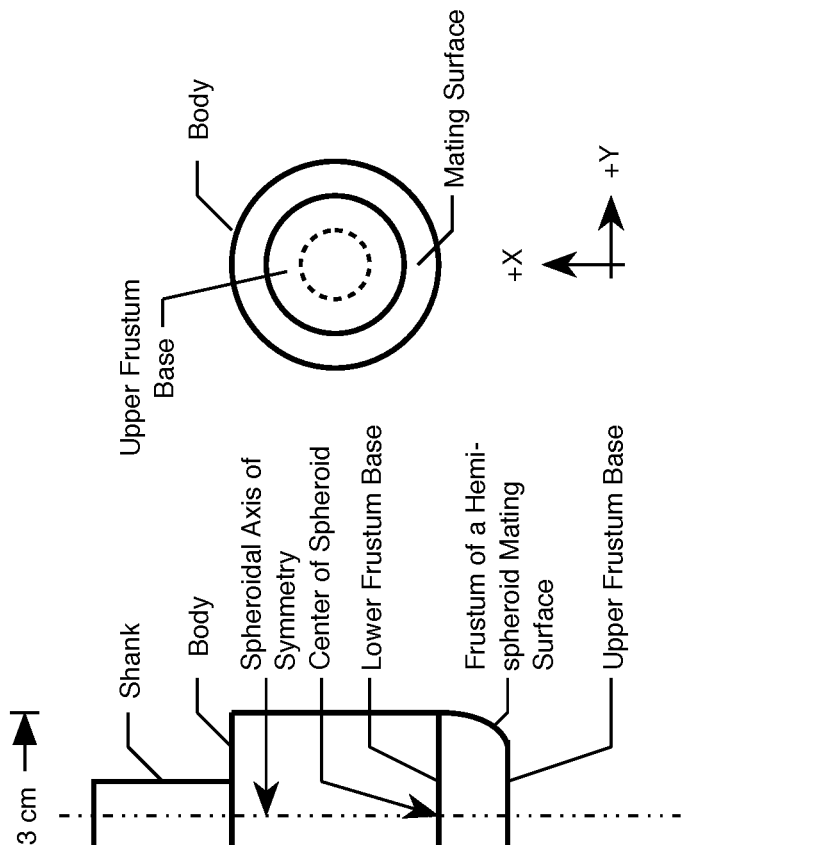
FIG. 9a depicts an orthogonal front view of spheroidal probe 257 in accordance with the illustrative embodiment of the present invention.
FIG. 9b depicts an orthogonal side view of spheroidal probe 257 in accordance with the illustrative embodiment of the present invention.
FIG. 9c depicts an orthogonal bottom view of spheroidal probe 257 in accordance with the illustrative embodiment of the present invention.

FIGS. 9a, 9b, and 9c depict the orthogonal front, side, and bottom views, respectively, of spheroidal probe 257 in accordance with the illustrative embodiment of the present invention. Spheroidal probe 257 is used by the illustrative embodiment to locate the center of a spheroid (i.e., the fiducial reference point) that is associated with a hole in the material composing an article of manufacture, which hole is defined at least in part, by a portion of a tangible spheroidal surface. In accordance with the illustrative embodiment, the mating surface of spheroidal probe 257 has the same radius as the cutting surface on spheroidal drill bit 252 and the spheroidal melting surface on melting tip 254. When the mating surface of spheroidal probe 257 fits into the portion of the melting surface, then the center of the spheroid (i.e., the fiducial reference point) can be easily determined. Spheroidal probe 257 works with both blind holes and with through holes.

Referring to FIGS. 9a, 9b, and 9c, spheroidal probe 257 comprises a shank, a body, and a mating surface.

In accordance with the illustrative embodiment, spheroidal probe 257 is fabricated out of steel, but it will be clear to those skilled in the art how to make and use alternative embodiments of the present invention in which a spheroidal probe is fabricated out of one or more other materials.

In accordance with the illustrative embodiment, the shank of spheroidal probe 257 has a length of 2 cm and a diameter of 1 cm. It will be clear to those skilled in the art, after reading this disclosure, how to make and use alternative embodiments of the present invention in which the shank has different dimensions.

In accordance with the illustrative embodiment, the body of spheroidal probe 257 has a length of 4 cm and a diameter of 3 cm. It will be clear to those skilled in the art, after reading this disclosure, how to make and use alternative embodiments of the present invention in which the body has different dimensions.

In accordance with the illustrative embodiment, the mating surface of spheroidal probe 257 is a 1 cm high frustum of a hemisphere whose radius corresponds to the radius of spheroidal drill bit 252 and spheroidal melting tip 254. The frustum of the hemisphere is bounded by the lower frustum base and the upper frustum base. The mating surface of spheroidal probe 257 is the frustum of a hemisphere rather than a hemisphere so that small amounts of dirt and debris that accumulate in the hole do not hamper the fitting of spheroidal probe 257. It will, however, be clear to those skilled in the art, after reading this disclosure, how to make and use alternative embodiments of the present invention in which the spheroidal probe has the shape of a spheroidal cap.

It will be clear to those skilled in the art, after reading this disclosure, how to make and use spheroidal probe 257.

Figure 10C:
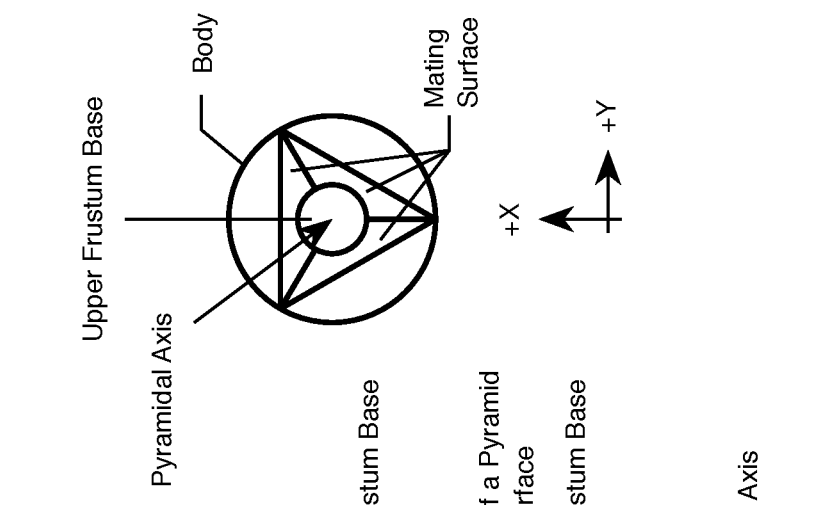
FIG. 10c depicts an orthogonal bottom view of pyramidal probe 258 in accordance with the illustrative embodiment of the present invention.
Figure 10B:
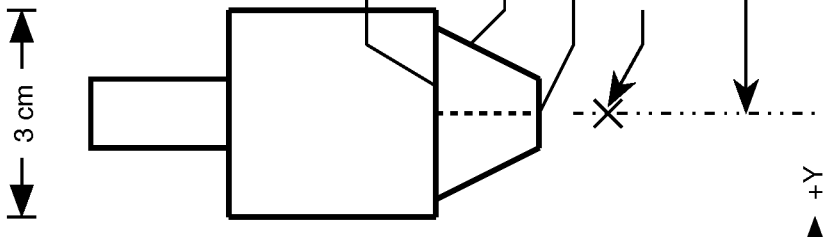
FIG. 10b depicts an orthogonal side view of pyramidal probe 258 in accordance with the illustrative embodiment of the present invention.
Figure 10A:
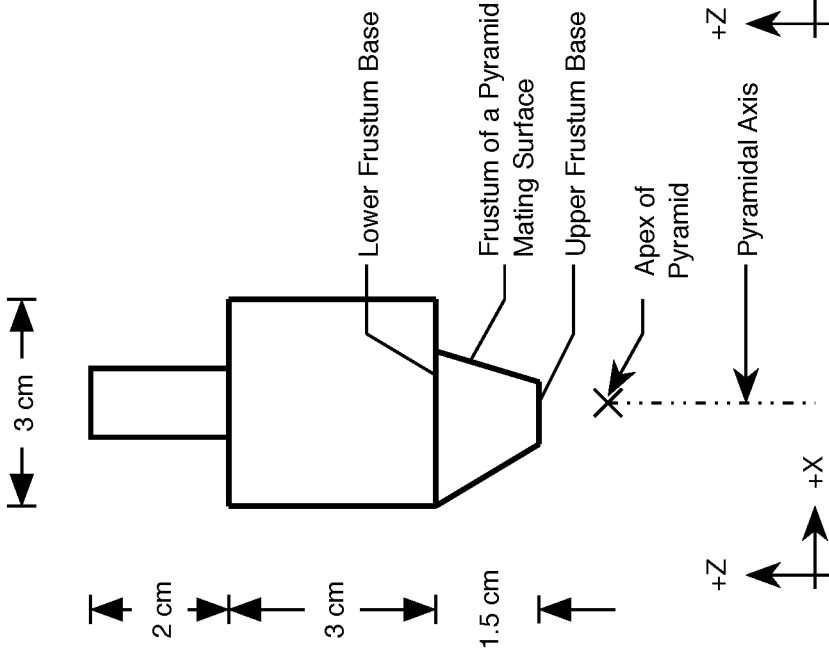
FIG. 10a depicts an orthogonal front view of pyramidal probe 258 in accordance with the illustrative embodiment of the present invention.

FIGS. 10a, 10b, and 10c depict the orthogonal front, side, and bottom views, respectively, of pyramidal probe 258 in accordance with the illustrative embodiment of the present invention. Pyramidal probe 258 is used by the illustrative embodiment to locate the apex of a pyramid (i.e., the fiducial reference point) that is associated with a hole in the material composing an article of manufacture, which hole is defined, at least in part, by a portion of three pyramidal faces (e.g., a hole made by pyramidal melting tip 255, etc.). In accordance with the illustrative embodiment, the mating surface of pyramidal probe 258 is the complement of the pyramidal melting surface on pyramidal melting tip 255 (i.e., the three faces of a regular triangular pyramid). When the mating surface of pyramidal probe 258 fits into the portions of the three faces, the spatial parameters of the plane containing each face can be determined. After the spatial parameters of each plane are determined, the location of the apex of the pyramid (i.e., the fiducial reference point) can be determined (because it is where the planes intersect). Pyramidal probe 258 works with both blind holes and with through holes.

In accordance with the illustrative embodiment, pyramidal probe 258 comprises a shank, a body, and a mating surface.

Pyramidal probe 258 is fabricated out of steel, but it will be clear to those skilled in the art how to make and use alternative embodiments of the present invention in which a pyramids probe is fabricated out of one or more other materials.

In accordance with the illustrative embodiment, the shank of pyramidal probe 258 has a length of 2 cm and a diameter of 1 cm. It will be clear to those skilled in the art, after reading this disclosure, how to make and use alternative embodiments of the present invention in which the shank has different dimensions.

In accordance with the illustrative embodiment, the body of pyramidal probe 258 has a length of 3 cm and a diameter of 3 cm. It will be clear to those skilled in the art, after reading this disclosure, how to make and use alternative embodiments of the present invention in which the body has different dimensions.

In accordance with the illustrative embodiment, the mating surface of pyramidal probe 258 is a 1.5 cm high frustum of a regular triangular pyramid (i.e., a tetrahedron) whose faces and angles correspond to the faces and angles of pyramidal melting tip 255. The frustum of the pyramid is bounded by the lower frustum base and the upper frustum base. The mating surface of pyramidal probe 258 is the frustum of a pyramid rather than a full pyramid so that small amounts of dirt and debris that accumulate in the hole do not hamper the fitting of pyramidal probe 258.

Figure 11:
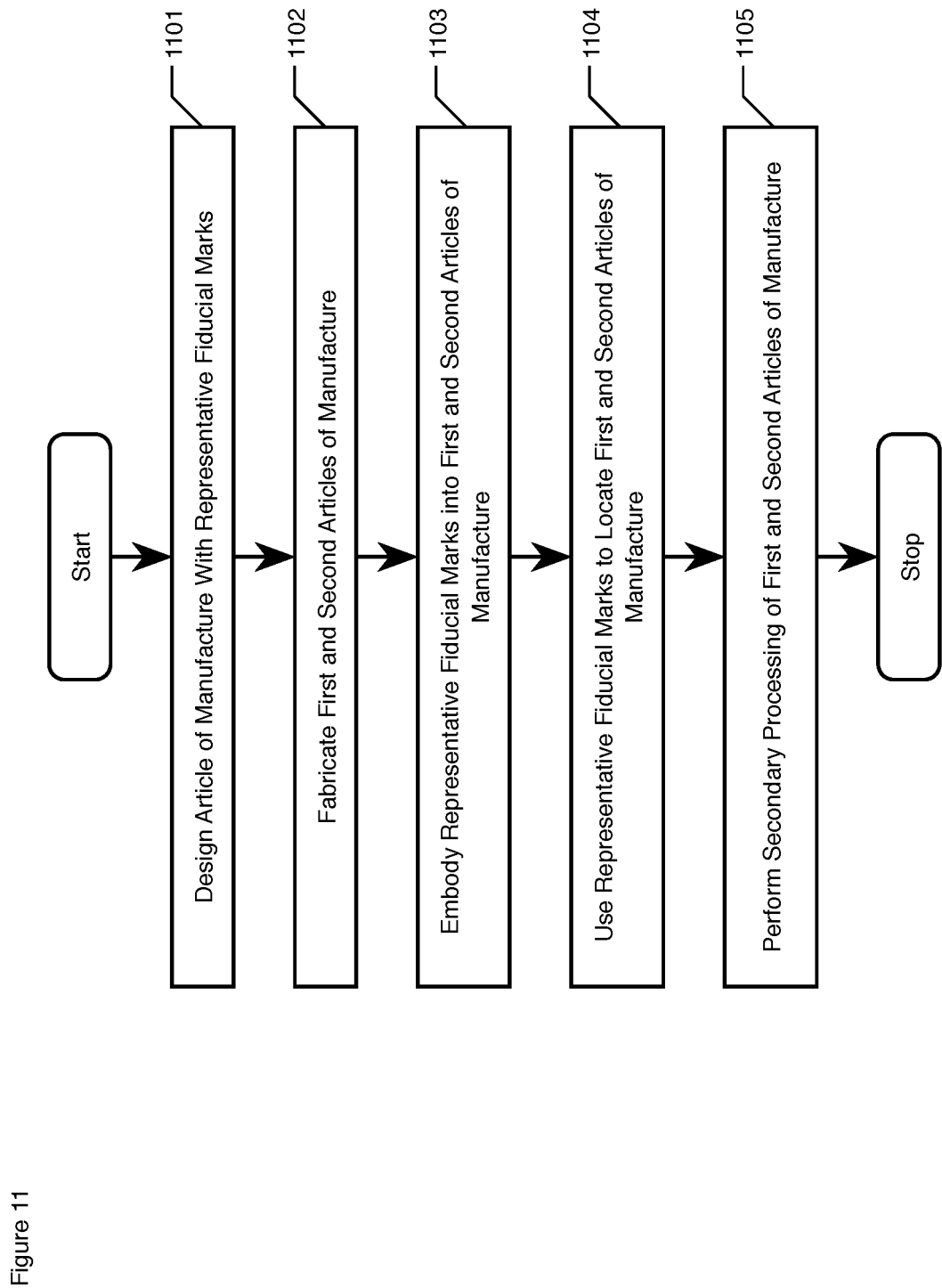
FIG. 11 depicts a flowchart of the operation of the illustrative embodiment of the present invention.

FIG. 11 depicts a flowchart of the operation of the illustrative embodiment of the present invention.

At task 1101, a natural person, in conjunction with a computer-aided design system, designs:
 (i) an article of manufacture to be fabricated by additive manufacturing system 100, and
 (ii) the set of fiducial reference points to be embodied into the article, after it is fabricated, by registration system 200.

In accordance with the illustrative embodiment, there are no constraints on the size, shape, contour, or materials of the article of manufacture. The article can be complex or relatively simple.

Figure 12A:
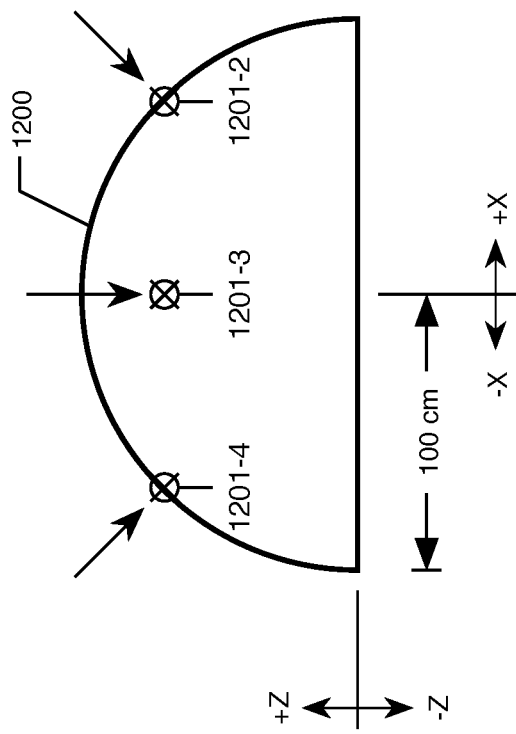
FIG. 12a depicts the orthogonal front view of the engineering specification for a first illustrative article of manufacture—solid hemisphere 1200.
Figure 12B:
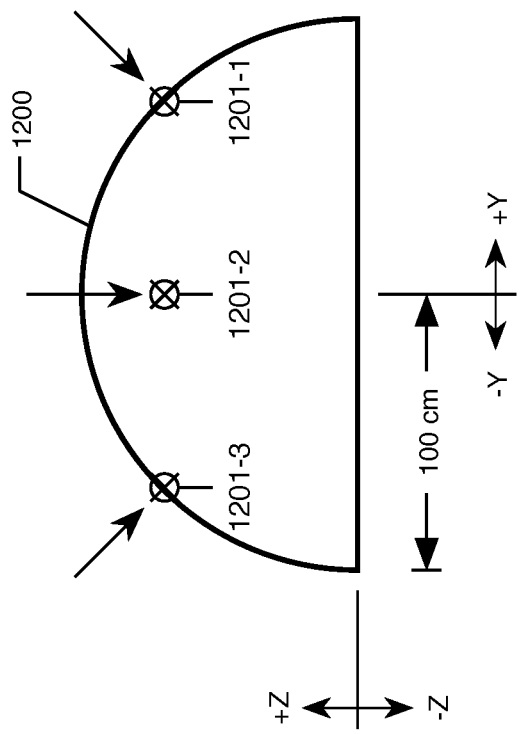
FIG. 12b depicts the orthogonal side view of the engineering specification for a first illustrative article of manufacture—solid hemisphere 1200.
Figure 12C:
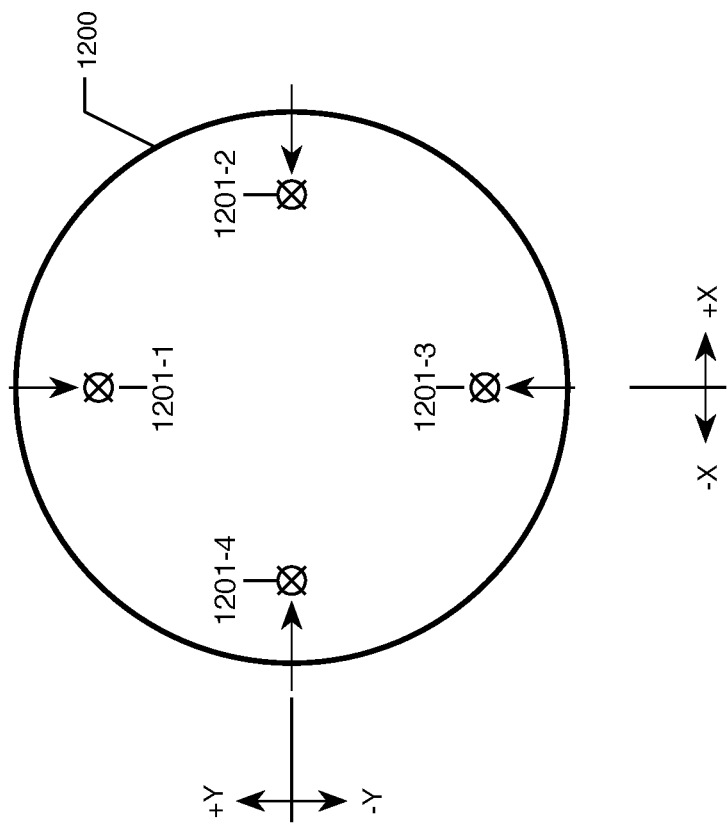
FIG. 12c depicts the orthogonal top view of the engineering specification for a first illustrative article of manufacture—solid hemisphere 1200.

For example, FIGS. 12a, 12b, and 12c depict the orthogonal front, side, and top views of the design for a first illustrative article of manufacture—solid hemisphere 1200, which is to be made of a carbon-fiber reinforced thermoplastic that has a density of 1.3 grams/cm$^3$. Solid hemisphere 1200 is specified to have a radius of 100 cm, a volume of ≈20,944 cm$^3$, and a mass of ≈27,227 grams (before the representative fiducial marks are embedded). The coordinate system for solid hemisphere 1200 has its origin at the center of the sphere from which solid hemisphere 1200 is formed.

Figure 13A:
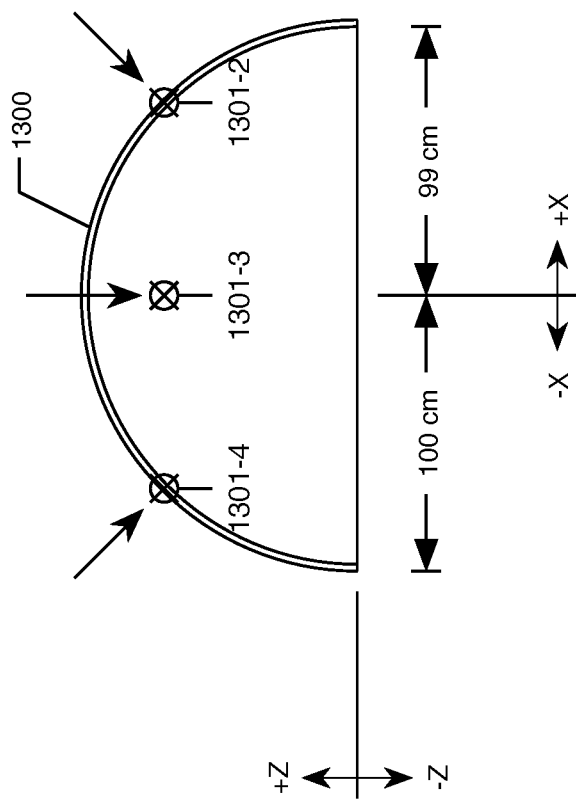
FIG. 13a depicts the orthogonal front view of the engineering specification for a second illustrative article of manufacture—hemispherical shell 1300.
Figure 13B:
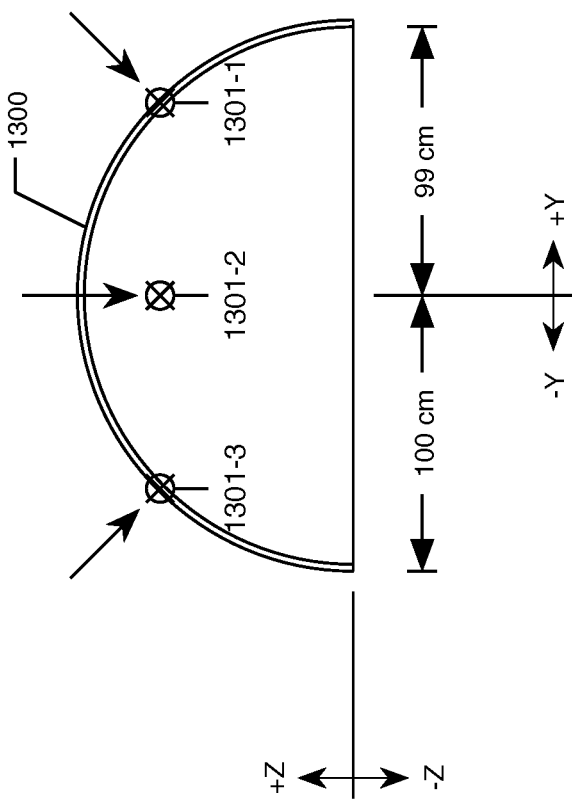
FIG. 13b depicts the orthogonal side view of the engineering specification for a second illustrative article of manufacture—hemispherical shell 1300.
Figure 13C:
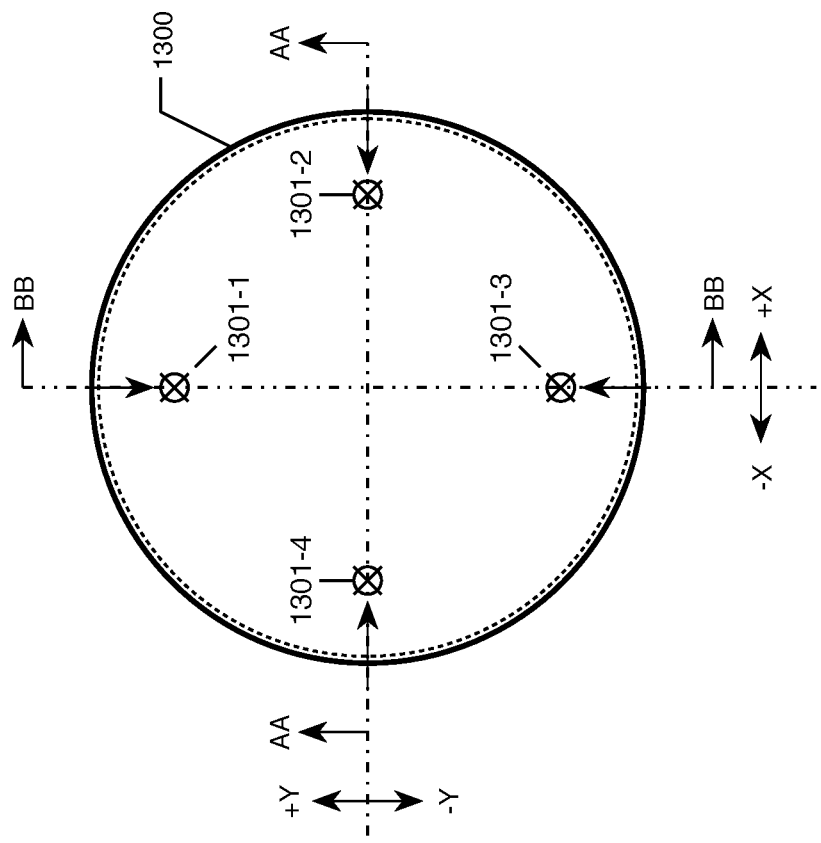
FIG. 13c depicts the orthogonal top view of the engineering specification for a second illustrative article of manufacture—hemispherical shell 1300.

As another example, FIGS. 13a, 13b, and 13c depict the orthogonal front, side, and top views of the design for a second illustrative article of manufacture—hemispherical shell 1300, which is to be made of a carbon-fiber reinforced thermoplastic that has a density of 1.3 grams/cm$^3$. Hemispherical shell 1300 is specified to have an outer radius of 100 cm and an inner radius of 99 cm (i.e., the thickness of the shell is 1 cm), a volume of ≈417 cm$^3$, and a mass of ≈542 grams (before the representative fiducial marks are embedded). The coordinate system for hemispherical shell 1300 has its origin at the center of the sphere from which hemispherical shell 1300 is formed.

As part of task 1101, the natural person, in conjunction with the computer-aided design system, decides how many fiducial reference points are to be associated with the article of manufacture. It is well known to those skilled in the art that a "rigid body" requires three non-collinear fiducial reference points to establish (1) linear position, and (2) angular position (which is also known as 'orientation' or 'attitude'). It is well known to those skilled in the art, that there are situations and conditions and contests when it is necessary or advantageous to associated more that three (e.g., four, five, six, eight, ten, etc.) fiducial reference points with an article of manufacture.

In accordance with the first illustrative article of manufacture, solid hemisphere 1200 is to be associated with four (4) fiducial reference points.

In accordance with the second illustrative article of manufacture, hemispherical shell 1300 is to be associated with four (4) fiducial reference points.

It will be clear to those skilled in the art, after reading this disclosure, how to decide how many fiducial reference points are to be associated with any article of manufacture.

As part of task 1101, the natural person, in conjunction with the computer-aided design system, decides where the fiducial reference points should be with regard to article of manufacture. It is well known to those skilled in the art that, in general, three fiducial reference points should not be collinear and that, in general, four fiducial reference points should not be coplanar. Furthermore, it is generally advantageous to have greater distances between fiducial reference points because it facilitates greater accuracy in lateral and angular position.

In accordance with the first illustrative article of manufacture, the coordinates of the four fiducial reference points associated with solid hemisphere 1200 are presented in Table 1.

TABLE 1

Coordinates of the Fiducial Reference Points in Solid Hemisphere 1200

| Fiducial Reference Point | Coordinates | Distance from Origin |
|---|---|---|
| 1201-1 | (0 cm, 69.6 cm, 69.6 cm) | 98.4 cm |
| 1201-2 | (70 cm, 0 cm, 70 cm) | 99.0 cm |
| 1201-3 | (0 cm, −69.6 cm, 69.6 cm) | 98.4 cm |
| 1201-4 | (−70 cm, 0 cm, 70 cm) | 99.0 cm |

From Table 1, it can be seen that no three fiducial reference points are collinear, the four fiducial reference points are non-coplanar, and all four fiducial reference points are within solid hemisphere 1200.

In accordance with the second illustrative article of manufacture, the coordinates of the four fiducial reference points associated with hemispherical shell 1300 are presented in Table 2.

TABLE 2

Coordinates of the Fiducial Reference Points in Hemispherical Shell 1300

| Fiducial Reference Point | Coordinates | Distance from Origin |
|---|---|---|
| 1301-1 | (0 cm, 69.6 cm, 69.6 cm) | 98.4 cm |
| 1301-2 | (70.3 cm, 0 cm, 70.3 cm) | 99.4 cm |
| 1301-3 | (0 cm, −69.6 cm, 69.6 cm) | 98.4 cm |
| 1301-4 | (−70.3 cm, 0 cm, 70.3 cm) | 99.4 cm |

From Table 2, it can be seen that no three fiducial reference points are collinear, the four fiducial reference points are non-coplanar. Furthermore, two fiducial reference points—1301-1 and 1301-3 are not within hemispherical shell 1300 (i.e., will be memorialized with conical through holes), and two fiducial reference points—1301-2 and 1301-4 are within hemispherical shell 1300 (i.e., will be memorialized with conical blind holes).

It will be clear to those skilled in the art, after reading this disclosure, how to decide where the fiducial reference points should be.

As part of task 1101, the natural person, in conjunction with the computer-aided design system, decides what kind of representative fiducial mark is to be incorporated into the article of manufacture to memorialize each fiducial reference point.

In accordance with the first illustrative article of manufacture, the four fiducial reference points are to be memorialized by conical blind holes created with conic drill bit 251. For each hole, the approach angle of the hole is normal to the surface of solid hemisphere 1200 (as shown by the arrows in FIGS. 12*a*, 12*b*, and 12*c*).

A conic fiducial mark comprises a conical axis. In accordance with the illustrative embodiment, the conic axes associated with the fiducial reference points 1201-1 and 1201-3, respectively, are planar and intersect (i.e., the two axes are non-parallel and not skew), and the conic axes associated with the fiducial reference points 1201-2 and 1201-4, respectively, are planar and intersect (i.e., the two axes are non-parallel and not skew). Furthermore, the conic axes associated with the fiducial reference points 1201-1 and 1201-2, respectively, are skew, and the conic axes associated with the fiducial reference points 1201-3 and 1201-4, respectively, are skew.

In accordance with the second illustrative article of manufacture, the fiducial reference points 1301-1, 1301-2, 1301-3, and 1301-4 are to be memorialized by spheroidal blind holes created with spheroidal drill bit 252. For each hole, the approach angle of the hole is normal to the surface of hemispherical shell 1300 (as shown by the arrows in FIGS. 13*a*, 13*b*, and 13*c*).

It will be clear to those skilled in the art, after reading this disclosure, how to make and use alternative embodiments of the present invention in which each of the fiducial reference points is memorialized by a different kind of representative fiducial mark, and any combination of representative fiducial marks. For example, an article of manufacture can comprise:

(i) one, two, three, or four conical blind holes, or
(ii) one, two, three, or four conical through holes, or
(iii) one, two, three, or four spheroidal blind holes, or
(iv) one, two, three, or four spheroidal through holes, or
(v) one, two, three, or four pyramidal blind holes, or
(vi) one, two, three, or four pyramidal through holes, or
(vii) any combination of i, ii, iii, iv, v, and vi.

Conical fiducial marks and (non-spherical) spheroidal fiducial marks comprise an axis of symmetry and pyramidal fiducial marks comprise a pyramidal axis. It will be clear to those skilled in the art, after reading this disclosure, how to make and use alternative embodiments of the present invention in which each pair of axes is collinear, non-collinear, parallel, not parallel, planar, non-planar, or skew. For example, an article of manufacture can comprise:

(i) two, three, or four representative fiducial marks whose axes are collinear, or
(ii) two, three, or four representative fiducial marks whose axes are non-collinear, or
(iii) two, three, or four representative fiducial marks whose axes are parallel, or
(iv) two, three, or four representative fiducial marks whose axes are non-parallel, or
(v) two, three, or four representative fiducial marks whose axes are planar, or
(vi) two, three, or four representative fiducial marks whose axes are non-planar, or
(vii) two, three, or four representative fiducial marks whose axes are skew, or
(viii) two, three, or four representative fiducial marks whose axes are not skew, or
(ix) any combination of i, ii, iii, iv, v, vi, vii, and viii.

It will be clear to those skilled in the art, however, after reading this disclosure, how to make and use alternative embodiments of solid hemisphere 1200—or any article of manufacture—that use any non-empty set of representative fiducial marks.

It will be clear to those skilled in the art, after reading this disclosure, how to accomplish task 1101.

At task 1102, a first article of manufacture and a second article of manufacture are fabricated by additive manufacturing system 100, in well-known fashion.

Figure 14A:
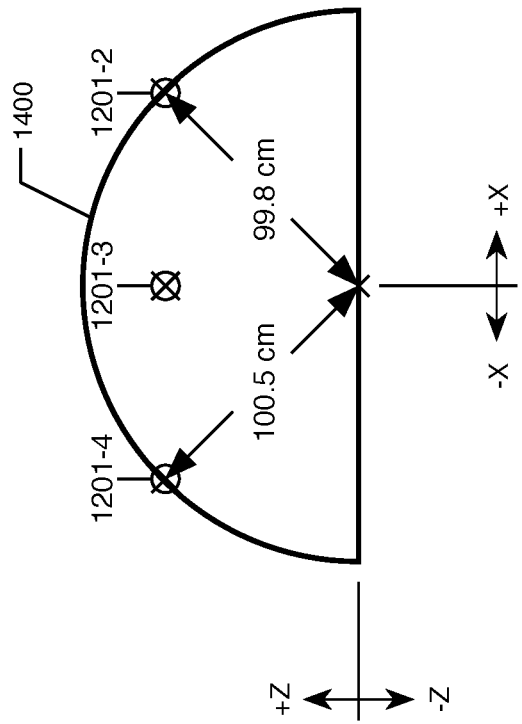
FIG. 14a depicts the orthogonal front view of solid hemisphere 1400, which was fabricated in accordance with the engineering specifications depicted in FIGS. 12a, 12b, and 12c.
Figure 14B:
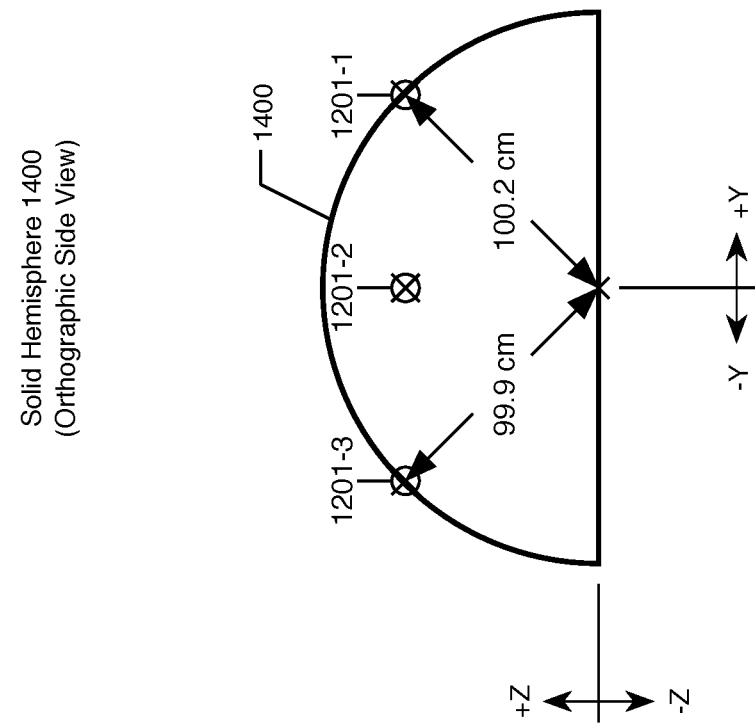
FIG. 14b depicts the orthogonal side view of solid hemisphere 1400, which was fabricated in accordance with the engineering specifications depicted in FIGS. 12a, 12b, and 12c.
Figure 14C:
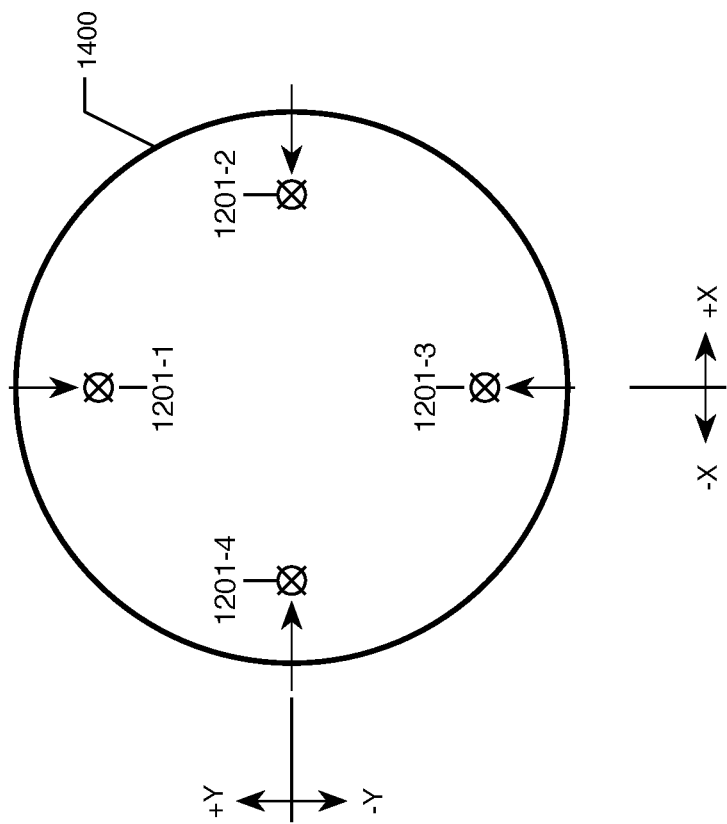
FIG. 14c depicts the orthogonal top view of solid hemisphere 1400, which was fabricated in accordance with the engineering specifications depicted in FIGS. 12a, 12b, and 12c.

FIGS. 14*a*, 14*b*, and 14*c* depict the orthogonal front, side, and top views, respectively, of solid hemisphere 1400 as it was actually fabricated. Whereas solid hemisphere 1400 was designed to have a uniform radius of 100 cm, it was, in fact, fabricated with non-trivial dimensional variations. For example, the outer radius through fiducial reference mark 1201-1 is 100.2 cm, the outer radius through fiducial reference mark 1201-2 is 99.8 cm, the outer radius through fiducial reference mark 1201-3 is 99.9 cm, and the outer radius through fiducial reference mark 1201-4 is 100.5 cm. This summarized in Table 3.

TABLE 3

Outer Radius, as Fabricated, of Solid Hemisphere 1400

| Fiducial Reference Point | Outer Radius as Fabricated | Conical-Surface Volume of Hole | Conical-Surface Area of Hole |
|---|---|---|---|
| 1201-1 | 100.2 cm | ≈2.04 cm$^3$ | ≈10.18 cm$^2$ |
| 1201-2 | 99.8 cm | ≈0.18 cm$^3$ | ≈2.01 cm$^2$ |
| 1201-3 | 99.9 cm | ≈1.18 cm$^3$ | ≈7.07 cm$^2$ |
| 1201-4 | 100.5 cm | ≈1.18 cm$^3$ | ≈7.07 cm$^2$ |

Furthermore, the actual volume of solid hemisphere 1400 as fabricated is ≈20,877 cm$^3$ and the actual mass is ≈27,140 gr (before the representative fiducial marks are embedded).

Figure 15A:
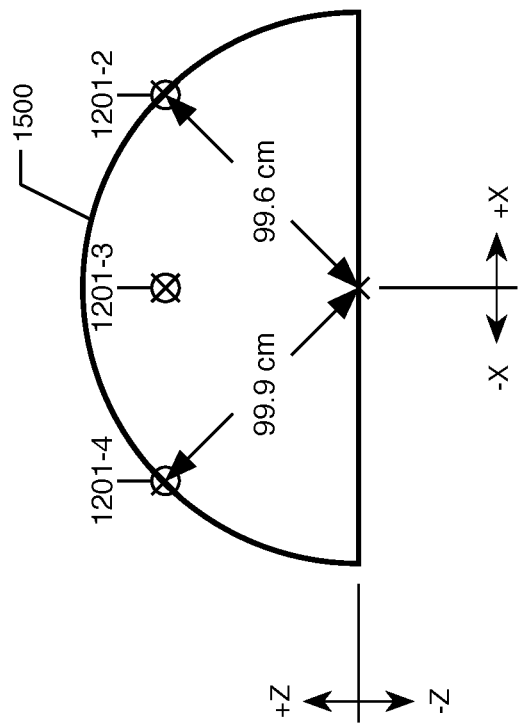
FIG. 15a depicts the orthogonal front view of solid hemisphere 1500, which was fabricated in accordance with the engineering specifications depicted in FIGS. 12a, 12b, and 12c.
Figure 15B:
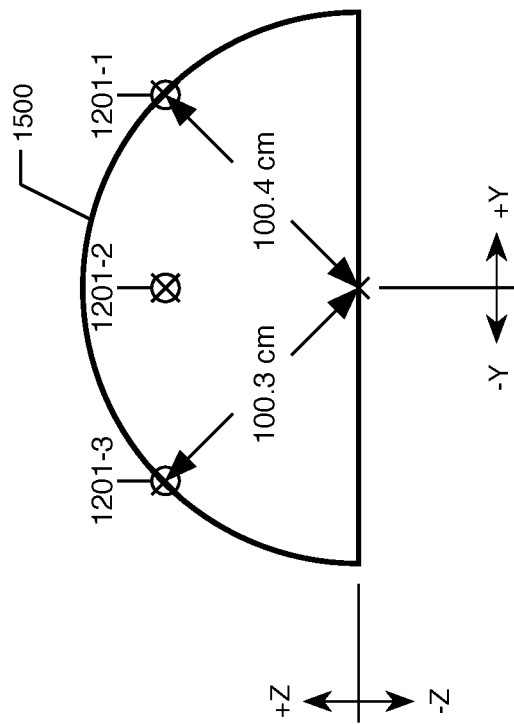
FIG. 15b depicts the orthogonal side view of solid hemisphere 1500, which was fabricated in accordance with the engineering specifications depicted in FIGS. 12a, 12b, and 12c.

FIGS. 15*a*, 15*b*, and 15*c* depict the orthogonal front, side, and top views, respectively, of solid hemisphere 1500 as it was actually fabricated. Whereas solid hemisphere 1500 was designed to have a uniform radius of 100 cm, it was, in fact, fabricated with non-trivial dimensional variations. For example, the outer radius through fiducial reference mark 1201-1 is 100.4 cm, the outer radius through fiducial reference mark 1201-2 is 99.6 cm, the outer radius through fiducial reference mark 1201-3 is 100.3 cm, and the outer radius through fiducial reference mark 1201-4 is 99.9 cm. This summarized in Table 4.

TABLE 4

Outer Radius, as Fabricated, of Solid Hemisphere 1500

| Fiducial Reference Point | Outer Radius as Fabricated | Conical-Surface Volume of Hole | Conical-Surface Area of Hole |
|---|---|---|---|
| 1201-1 | 100.4 cm | ≈2.79 cm$^3$ | ≈12.57 cm$^2$ |
| 1201-2 | 99.6 cm | ≈0.08 cm$^3$ | ≈1.13 cm$^2$ |
| 1201-3 | 100.3 cm | ≈2.39 cm$^3$ | ≈11.34 cm$^2$ |
| 1201-4 | 99.9 cm | ≈0.25 cm$^3$ | ≈2.54 cm$^2$ |

Furthermore, the actual volume of solid hemisphere 1500 as fabricated is ≈20,756 cm$^3$ and the actual mass is ≈26,983 gr (before the representative fiducial marks are embedded).

Figure 16A:
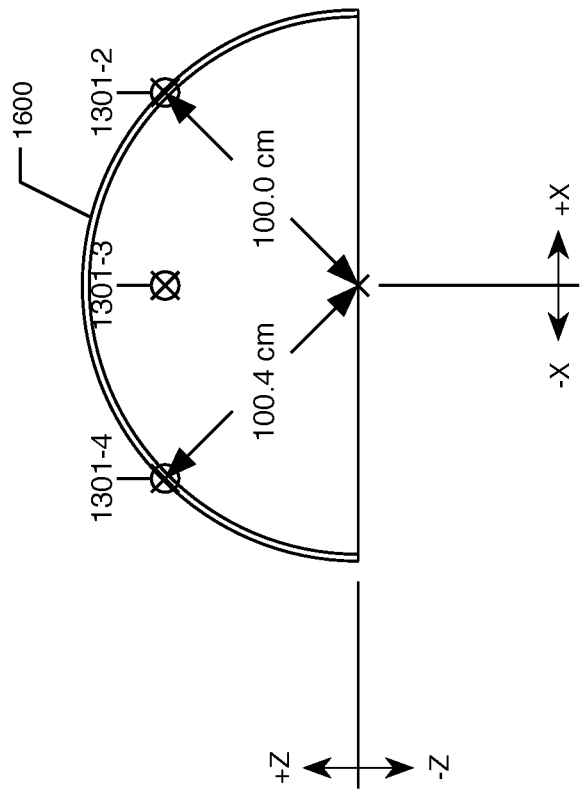
FIG. 16a depicts the orthogonal front view of hemispherical shell 1600, which was fabricated in accordance with the engineering specifications depicted in FIGS. 13a, 13b, and 13c.
Figure 16B:
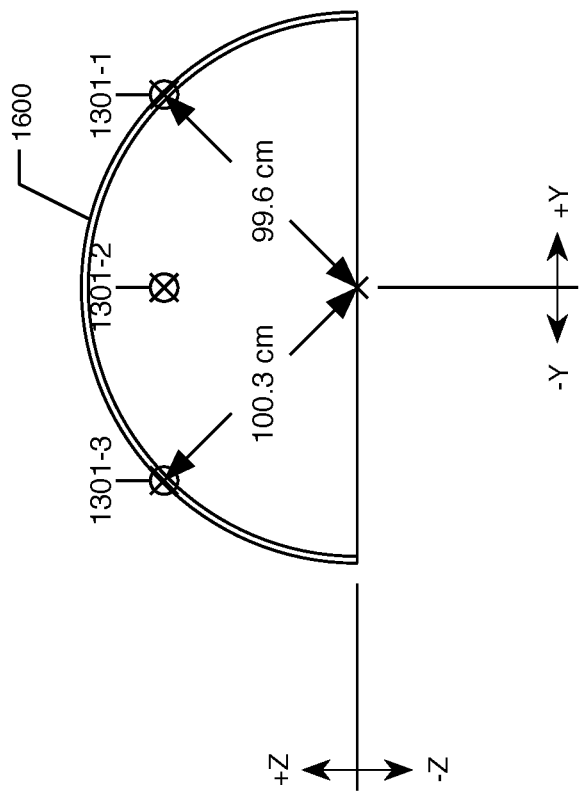
FIG. 16b depicts the orthogonal side view of hemispherical shell 1600, which was fabricated in accordance with the engineering specifications depicted in FIGS. 13a, 13b, and 13c.
Figure 16C:
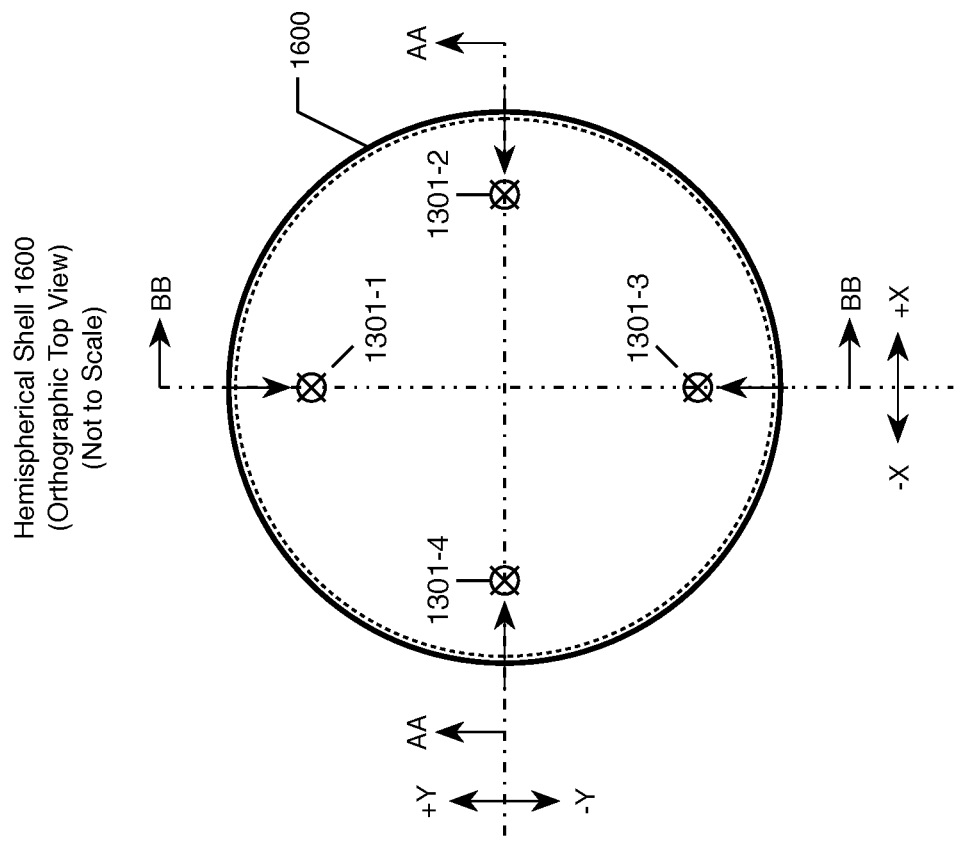
FIG. 16c depicts the orthogonal top view of hemispherical shell 1600, which was fabricated in accordance with the engineering specifications depicted in FIGS. 13a, 13b, and 13c.

FIGS. 16*a*, 16*b*, and 16*c* depict the orthogonal front, side, and top views, respectively, of hemispherical shell 1600 as it was actually fabricated. Whereas hemispherical shell 1600 was designed to have a uniform outer radius of 100 cm and a uniform inner radius of 99 cm, the outer radius was, in fact, fabricated with non-trivial dimensional variations. The inner radius was fabricated exactly as designed at 99 cm. For example, the outer radius through fiducial reference mark 1301-1 is 99.6 cm, the outer radius through fiducial reference mark 1301-2 is 100.0 cm, the outer radius through fiducial reference mark 1301-3 is 100.3 cm, and the outer radius through fiducial reference mark 1301-4 is 100.4 cm. This summarized in Table 5.

TABLE 5

Outer Radius, as Fabricated, of Hemispherical Shell 1600

| Fiducial Reference Point | Outer Radius as Fabricated | Conical-Surface Volume of Hole | Conical-Surface Area of Hole |
|---|---|---|---|
| 1301-1 | 99.6 cm | ≈0.53 cm$^3$ | ≈3.39 cm$^2$ |
| 1301-2 | 100.0 cm | ≈0.08 cm$^3$ | ≈1.13 cm$^2$ |
| 1301-3 | 100.3 cm | ≈2.32 cm$^3$ | ≈10.21 cm$^2$ |
| 1301-4 | 100.4 cm | ≈0.35 cm$^3$ | ≈3.14 cm$^2$ |

Furthermore, the actual volume of hemispherical shell 1600 as fabricated is ≈425 cm$^3$ and the actual mass is ≈553 gr (before the representative fiducial marks are embedded).

Figure 17A:
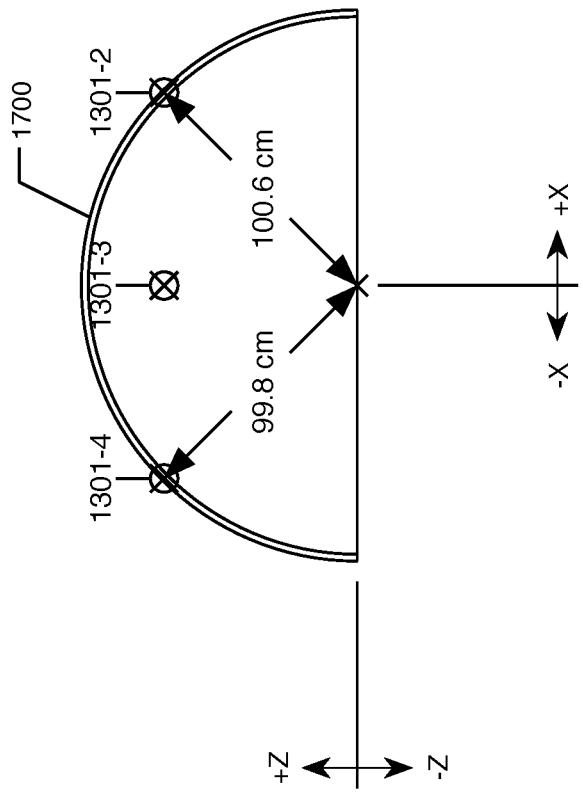
FIG. 17a depicts the orthogonal front view of hemispherical shell 1700, which was fabricated in accordance with the engineering specifications depicted in FIGS. 13a, 13b, and 13c.
Figure 17B:
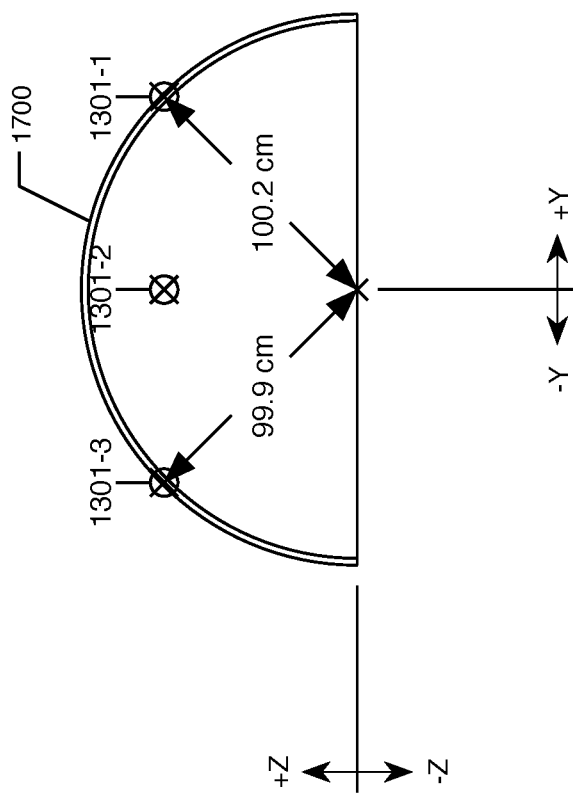
FIG. 17b depicts the orthogonal side view of hemispherical shell 1700, which was fabricated in accordance with the engineering specifications depicted in FIGS. 13a, 13b, and 13c.
Figure 17C:
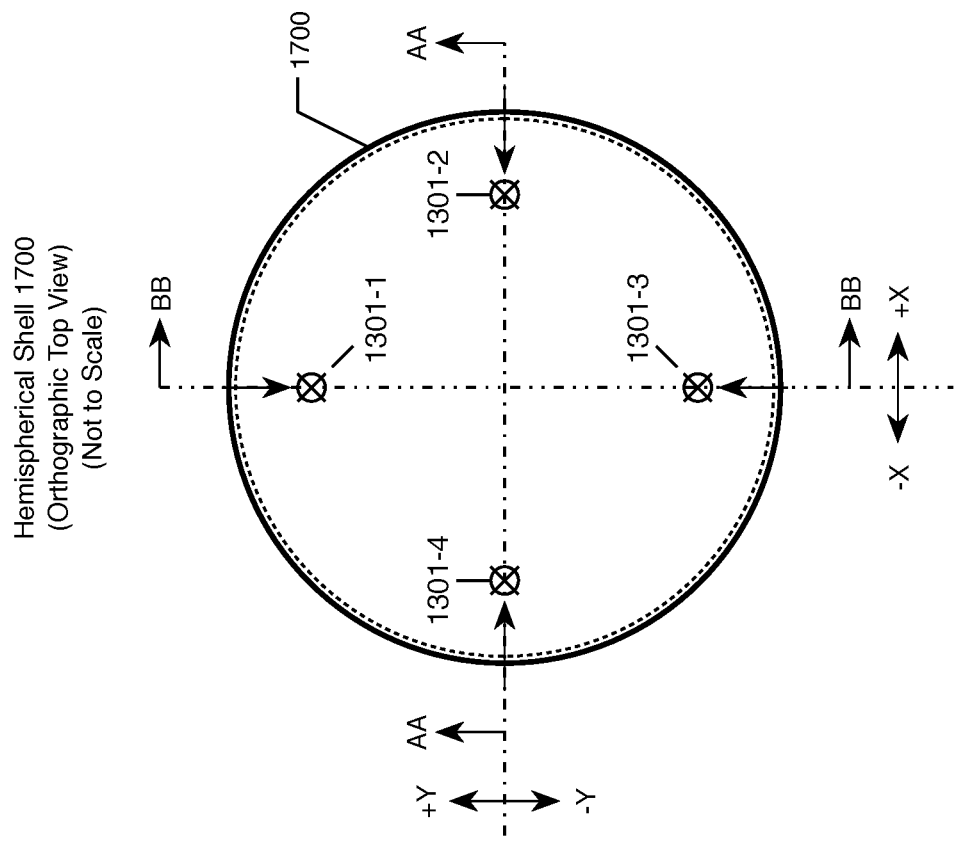
FIG. 17c depicts the orthogonal top view of hemispherical shell 1700, which was fabricated in accordance with the engineering specifications depicted in FIGS. 13a, 13b, and 13c.

FIGS. 17*a*, 17*b*, and 17*c* depict the orthogonal front, side, and top views, respectively, of hemispherical shell 1700 as it was actually fabricated. Whereas hemispherical shell 1700 was designed to have a uniform outer radius of 100 cm and a uniform inner radius of 99 cm, the outer radius was, in fact, fabricated with non-trivial dimensional variations. The inner radius was fabricated exactly as designed at 99 cm. For example, the outer radius through fiducial reference mark 1301-1 is 100.2 cm, the outer radius through fiducial reference mark 1301-2 is 100.6 cm, the outer radius through fiducial reference mark 1301-3 is 99.9 cm, and the outer radius through fiducial reference mark 1301-4 is 99.8 cm. This summarized in Table 6.

TABLE 6

Outer Radius, as Fabricated, of Hemispherical Shell 1700

| Fiducial Reference Point | Outer Radius as Fabricated | Conical-Surface Volume of Hole | Conical-Surface Area of Hole |
|---|---|---|---|
| 1301-1 | 100.2 cm | ≈1.96 cm$^3$ | ≈9.05 cm$^2$ |
| 1301-2 | 100.6 cm | ≈0.60 cm$^3$ | ≈4.52 cm$^2$ |
| 1301-3 | 99.9 cm | ≈1.10 cm$^3$ | ≈5.94 cm$^2$ |
| 1301-4 | 99.8 cm | ≈0.02 cm$^3$ | ≈0.50 cm$^2$ |

Furthermore, the actual volume of hemispherical shell 1700 as fabricated is ≈421 cm$^3$ and the actual mass is ≈547 gr (before the representative fiducial marks are embedded).

It will be clear to those skilled in the art, after reading this disclosure, how to accomplish task 1102.

At task 1103, registration system 100 imparts the representative fiducial marks into the first article of manufacture and into the second fabricated art, as specified in task 1101. Task 1103 is described in detail below and in the accompanying figures. It will be clear to those skilled in the art, after reading this disclosure, how to accomplish task 1103.

At task 1104, registration system 100 locates the first article of manufacture and the second article of manufacture based on their representative fiducial marks. Task 1104 is described in detail below and in the accompanying figures. It will be clear to those skilled in the art, after reading this disclosure, how to accomplish task 1104.

At task 1105, the first article of manufacture and the second article of manufacture are subject to secondary processing that is possible because their respective lateral and angular locations were determined in task 1104.

The location of solid hemisphere 1400 and the location of solid hemisphere 1500 are used to position them, respectively, so that they can be glued—in well-known fashion—into a solid sphere. In particular, solid hemisphere 1400 and solid hemisphere 1500 are positioned so that their origins coincide. Afterwards, the solid sphere is sanded and painted in well-known fashion.

The location of hemispherical shell 1600 and the location of hemispherical shell 1700 are used to position them, respectively, so that they can be glued—in well-known fashion—into a spherical shell. In particular, hemispherical shell 1600 and hemispherical shell 1700 are positioned so that their origins coincide. Afterwards, the spherical shell is sanded and painted in well-known fashion.

It will be clear to those skilled in the art, after reading this disclosure, how to accomplish task 1104.

Figure 24:
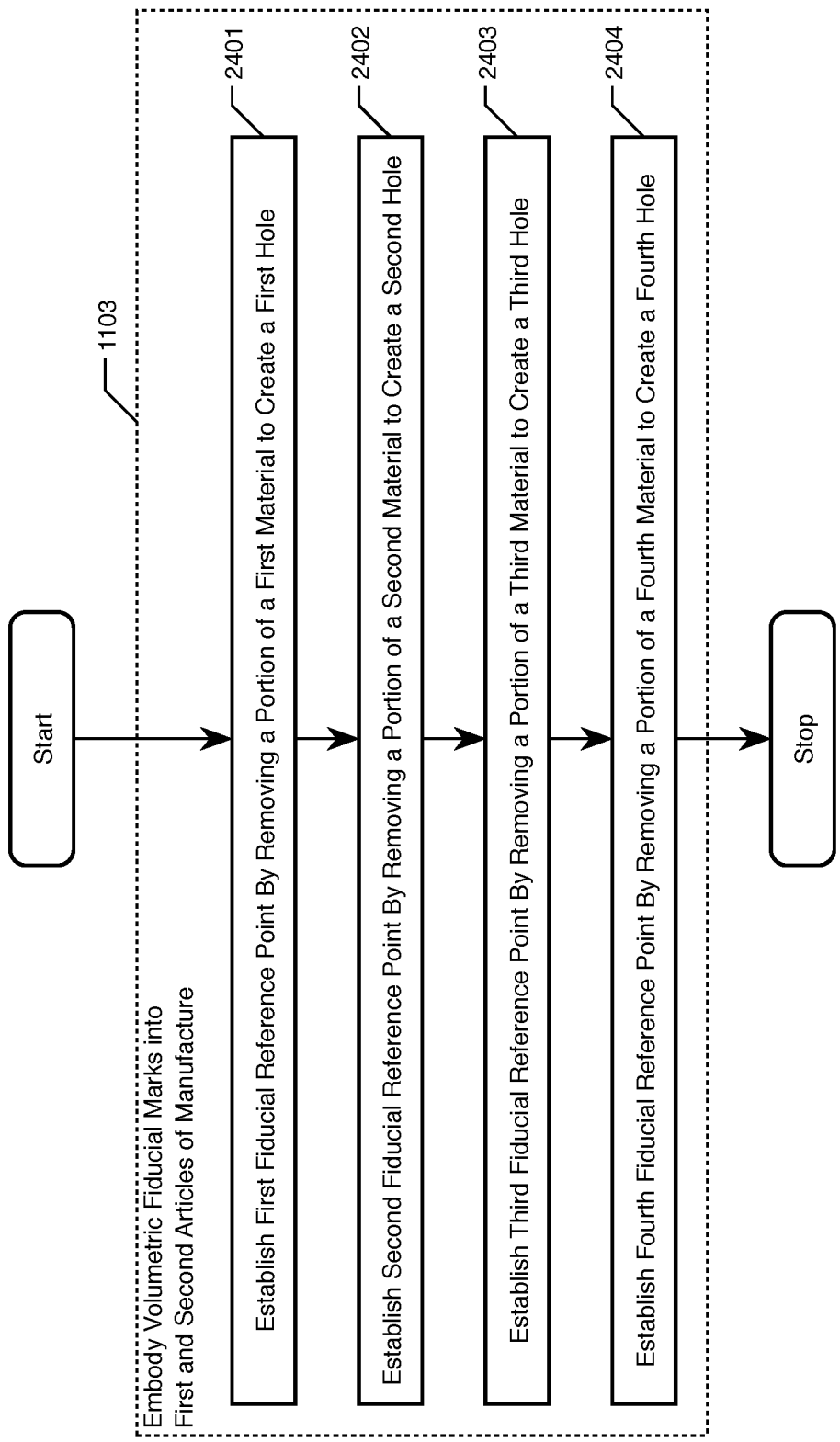
FIG. 24 depicts a flowchart of the salient tasks associated with the performance of task 1103—imparting the representative fiducial marks into the fabricated articles of manufacture.

FIG. 24 depicts a flowchart of the salient tasks associated with the performance of task 1103—embodying the representative fiducial marks into the fabricated articles of manufacture.

At task 2401, registration system 200 establishes the first fiducial reference point with the article of manufacture by removing a first portion of the material composing the article of manufacture to create a first hole, wherein the first hole is defined, at least in part, by a portion of the surface of a representative fiducial mark.

Registration system 200 establishes fiducial reference point 1201-1 with solid hemisphere 1400 by using conical drill bit 251 to drill a conical blind hole 1.8 cm into the superior surface with a conical axis that is normal to the superior surface. The volume and tangible conical-surface area of the resulting tangible conical surface is given in Table 3.

Registration system 200 establishes fiducial reference point 1201-1 with solid hemisphere 1500 by using conical drill bit 251 to drill a conical blind hole 2.0 cm into the superior surface with a conical axis that is normal to the superior surface. The volume and tangible conical-surface area of the resulting tangible conical surface is given in Table 4.

Registration system 200 establishes fiducial reference point 1301-1 with hemispherical shell 1600 by using conical drill bit 251 to drill a conical through hole 1.2 cm into the superior surface with a conical axis that is normal to the superior surface. The volume and tangible conical-surface area of the resulting tangible conical surface is given in Table 5.

Registration system 200 establishes fiducial reference point 1301-1 with hemispherical shell 1700 by using conical drill bit 251 to drill a conical through hole 1.8 cm into the superior surface with a conical axis that is normal to the superior surface. The volume and tangible conical-surface area of the resulting tangible conical surface is given in Table 6.

At task 2402, registration system 200 establishes the second fiducial reference point with the article of manufacture by removing a second portion of the material composing the article of manufacture to create a second hole, wherein the second hole is defined, at least in part, by a portion of the surface of a representative fiducial mark.

Registration system 200 establishes fiducial reference point 1201-2 with solid hemisphere 1400 by using conical drill bit 251 to drill a conical blind hole 0.8 cm into the superior surface with a conical axis that is normal to the superior surface. The volume and tangible conical-surface area of the resulting tangible conical surface is given in Table 3.

Registration system 200 establishes fiducial reference point 1201-2 with solid hemisphere 1500 by using conical drill bit 251 to drill a conical blind hole 0.6 cm into the superior surface with a conical axis that is normal to the superior surface. The volume and tangible conical-surface area of the resulting tangible conical surface is given in Table 4.

Registration system 200 establishes fiducial reference point 1301-2 with hemispherical shell 1600 by using conical drill bit 251 to drill a conical blind hole 0.6 cm into the superior surface with a conical axis that is normal to the superior surface. The volume and tangible conical-surface area of the resulting tangible conical surface is given in Table 5.

Registration system 200 establishes fiducial reference point 1301-2 with hemispherical shell 1700 by using conical drill bit 251 to drill a conical blind hole 1.2 cm into the superior surface with a conical axis that is normal to the superior surface. The volume and tangible conical-surface area of the resulting tangible conical surface is given in Table 6.

At task 2403, registration system 200 establishes the third fiducial reference point with the article of manufacture by removing a third portion of the material composing the article of manufacture to create a third hole, wherein the third hole is defined, at least in part, by a portion of the surface of a representative fiducial mark.

Registration system 200 establishes fiducial reference point 1201-3 with solid hemisphere 1400 by using conical drill bit 251 to drill a conical blind hole 1.5 cm into the superior surface with a conical axis that is normal to the superior surface. The volume and tangible conical-surface area of the resulting tangible conical surface is given in Table 3.

Registration system 200 establishes fiducial reference point 1201-3 with solid hemisphere 1500 by using conical drill bit 251 to drill a conical blind hole 1.9 cm into the superior surface with a conical axis that is normal to the superior surface. The volume and tangible conical-surface area of the resulting tangible conical surface is given in Table 4.

Registration system 200 establishes fiducial reference point 1301-3 with hemispherical shell 1600 by using conical drill bit 251 to drill a conical through hole 1.9 cm into the superior surface with a conical axis that is normal to the superior surface. The volume and tangible conical-surface area of the resulting tangible conical surface is given in Table 5.

Registration system 200 establishes fiducial reference point 1301-3 with hemispherical shell 1700 by using conical drill bit 251 to drill a conical through hole 1.5 cm into the superior surface with a conical axis that is normal to the superior surface. The volume and tangible conical-surface area of the resulting tangible conical surface is given in Table 6.

At task 2404, registration system 200 establishes the fourth fiducial reference point with the article of manufacture by removing a fourth portion of the material composing the article of manufacture to create a fourth hole, wherein the fourth hole is defined, at least in part, by a portion of the surface of a representative fiducial mark.

Registration system 200 establishes fiducial reference point 1201-4 with solid hemisphere 1400 by using conical drill bit 251 to drill a conical blind hole 1.5 cm into the superior surface with a conical axis that is normal to the superior surface. The volume and tangible conical-surface area of the resulting tangible conical surface is given in Table 3.

Registration system 200 establishes fiducial reference point 1201-4 with solid hemisphere 1500 by using conical drill bit 251 to drill a conical blind hole 0.9 cm into the superior surface with a conical axis that is normal to the superior surface. The volume and tangible conical-surface area of the resulting tangible conical surface is given in Table 4.

Registration system 200 establishes fiducial reference point 1301-4 with hemispherical shell 1600 by using conical drill bit 251 to drill a conical blind hole 1.0 cm into the superior surface with a conical axis that is normal to the superior surface. The volume and tangible conical-surface area of the resulting tangible conical surface is given in Table 5.

Registration system 200 establishes fiducial reference point 1301-4 with hemispherical shell 1700 by using conical drill bit 251 to drill a conical blind hole 0.4 cm into the superior surface with a conical axis that is normal to the superior surface. The volume and tangible conical-surface area of the resulting tangible conical surface is given in Table 6.

At the end of task 1103 (after material has been removed as part of the process of embedding the representative fiducial marks) solid hemisphere 1400 and solid hemisphere 1500 have similar (but different) volumes, similar (but different) masses, and similar (but different) shapes. Regardless of their differences, the relative location of the fiducial reference points is identical. In fact, each triplet of corresponding fiducial reference points is a congruent triangle—regardless of the fact that the two articles have different volumes, masses, and shapes.

The volume, mass, and shape similarity of solid hemisphere 1400 and solid hemisphere 1500 are presented in Table 7.

TABLE 7

Volume, Mass, and Shape Similarity of Solid Hemisphere 1400 and Solid Hemisphere 1500

| Article of Manufacture | Volume | Mass | Unilateral Shape Similarity | Bilateral Shape Similarity |
|---|---|---|---|---|
| Solid Hemisphere 1400 | ≈20,873 cm³ | ≈27,134 gr | ≈0.985 | ≈0.989 |
| Solid Hemisphere 1500 | ≈20,750 cm³ | ≈26,975 gr | ≈0.993 | |

For the purposes of this specification, the similarity of the volume of space occupied by two articles of manufacture is characterized by two metrics:

(i) the "unilateral shape similarity," and (ii) the "bilateral shape similarity."

The unilateral shape similarity of volume a with respect to volume b (notated as a#b) equals the maximum percentage of volume a that can be superimposed, without deformation, within volume b. In some cases, there is only one superposition of volume a and volume b that yields the maximum percentage. In other cases, there are two or more superpositions of volume a and volume b that yield the maximum percentage.

The bilateral shape similarity of volume a with respect to volume b (notated as aΔb) equals the harmonic mean of:

(i) the unilateral shape similarity of volume a with respect to volume b, (a#b), and (ii) the unilateral shape similarity of volume b with respect to volume a, (b#a). Mathematically, the bilateral shape similarity of aΔb equals:

$$a\Delta b = \frac{2}{\frac{1}{a\#b} + \frac{1}{b\#a}} \quad \text{(Eq. 13)}$$

For example, a sphere with a radius of 1 cm can be wholly superimposed, without deformation, within a sphere with a radius of 2 cm, and, therefore, the unilateral shape similarity of the smaller sphere with respect to the larger sphere is 100% or 1. In contrast, only a portion of the larger sphere can be superimposed, without deformation, within the smaller sphere, and, therefore, the unilateral shape similarity of the larger sphere with respect to the smaller sphere is 12.5% or 0.125. The bilateral shape similarity of the two spheres is ≈0.2222.

As another example, consider a first block that is 5 cm×2 cm×2 cm and a second block that is 4 cm×3 cm×2 cm. Only a portion of the first block can be superimposed, without deformation, within the second block, and the unilateral shape similarity of the first block with respect to the second block is 80% or 0.80. Only a portion of the second block can be superimposed, without deformation, within the first block, and the unilateral shape similarity of the second block with respect to the first block is 66⅔% or ≈0.6666. The bilateral shape similarity of the two blocks is ≈0.7272.

The unilateral shape similarity operation is not commutative:

$$a\#b \neq b\#a \quad \text{(Eq. 14)}$$

By definition, the unilateral shape similarity of a#a=1 (because the volume of an object fits perfectly within itself), and the unilateral shape similarity of a#b>0 (because one point in object a can always be superimposed with at least one point in object b). Therefore, the range of values of unilateral shape similarity is:

$$0 < a\#b \leq 1 \quad \text{(Eq. 15)}$$

It will be clear to those skilled in the art, after reading this disclosure, how to calculate (analytically or numerically) or determine empirically, the unilateral shape similarity of any two articles of manufacture. In accordance with the illustrative embodiment, the unilateral shape similarity of solid hemisphere 1400 with respect to solid hemisphere 1500 is ≈0.985, and the unilateral shape similarity of solid hemisphere 1500 with respect to solid hemisphere 1400 is ≈0.993.

The bilateral shape similarity operation is commutative:

$$a\Delta b = b\Delta a \quad \text{(Eq. 16)}$$

By definition, the bilateral shape similarity of aΔa=1, and the range of values of bilateral shape similarity is:

$$0 < a\Delta b \leq 1 \quad \text{(Eq. 17)}$$

It will be clear to those skilled in the art, after reading this disclosure, how to calculate (analytically or numerically) or determine empirically, the unilateral shape similarity of any two articles of manufacture. In accordance with the illustrative embodiment, the bilateral shape similarity of solid hemisphere 1400 and solid hemisphere 1500 equals≈0.989, as shown in Table 7.

Embodiments of the present invention are particularly useful for manufacturing operations in which the articles of manufacture are fabricated in large numbers and where the articles, as fabricated, have similar, but not identical, dimensions (e.g., articles of manufacture that have bilateral shape similarity in the range of 0.98≤aΔb<0.995). The reason is that embodiments of the present invention are most useful when the dimensions of the articles are dissimilar.

Also at the end of task 1103 (after material has been removed as part of the process of embedding the representative fiducial marks) hemispherical shell 1600 and hemispherical shell 1700 have similar (but different) volumes, similar (but different) masses, and similar (but different) shapes. The volume, mass, and shape similarity of hemispherical shell 1600 and hemispherical shell 1700 are presented in Table 8.

TABLE 8

Volume, Mass, and Shape Similarity of Hemispherical Shell 1600 and Hemispherical Shell 1700

| Article of Manufacture | Volume | Mass | Unilateral Shape Similarity | Bilateral Shape Similarity |
|---|---|---|---|---|
| Hemispherical Shell 1600 | ≈422 cm³ | ≈549 gr | ≈0.991 | ≈0.990 |
| Hemispherical Shell 1700 | ≈418 cm³ | ≈543 gr | ≈0.989 | |

In accordance with the illustrative embodiment, the unilateral shape similarity of solid hemisphere 1600 with respect to solid hemisphere 1700 is ≈0.991. In accordance with the illustrative embodiment, the unilateral shape similarity of solid hemisphere 1700 with respect to solid hemisphere 1600 is ≈0.989.

It will be clear to those skilled in the art, after reading this disclosure, how to accomplished task 1103.

Figure 25:
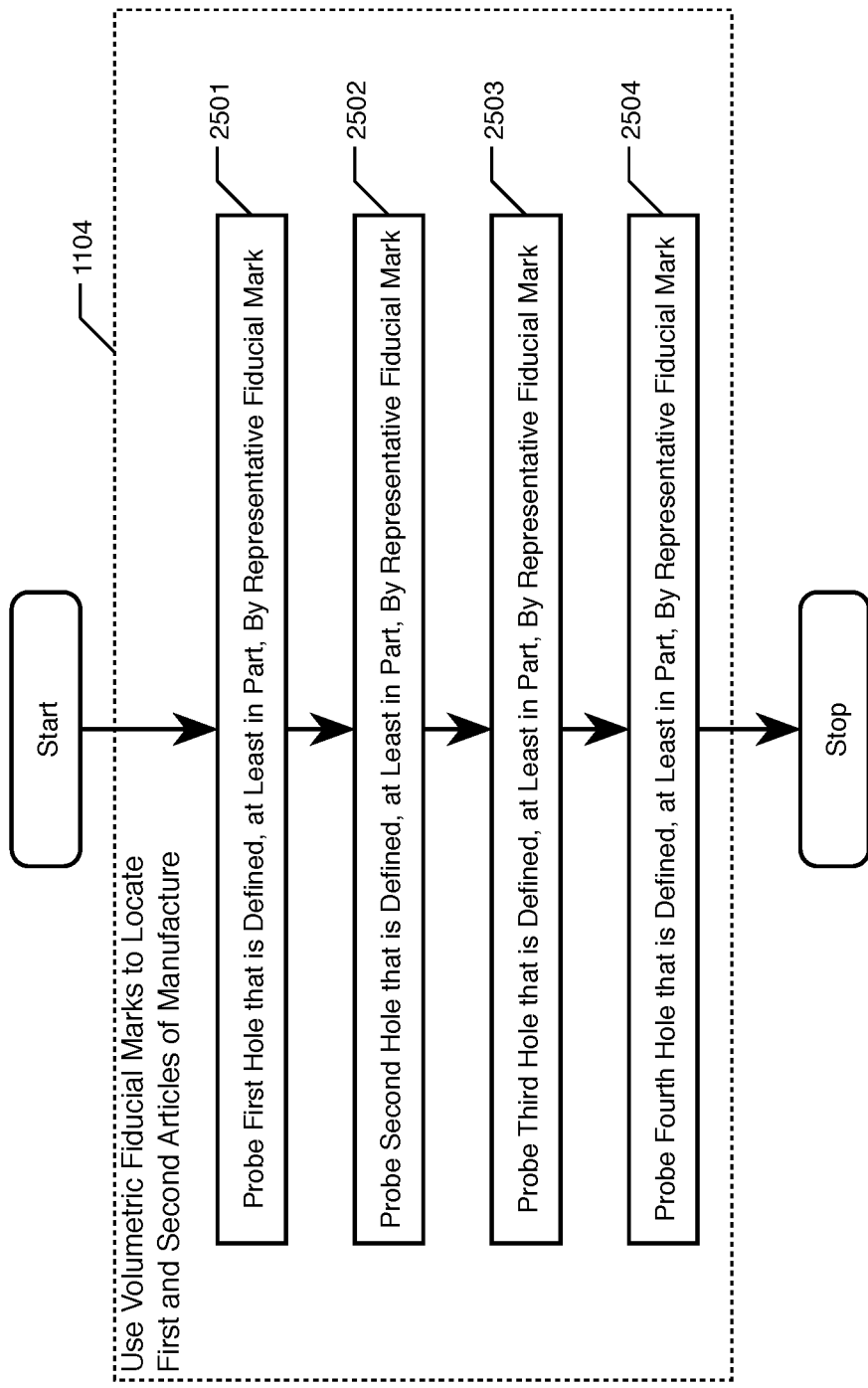
FIG. 25 depicts a flowchart of the salient tasks associated with the performance of task 1104—locating the first article of manufacture and the second article of manufacture based on their representative fiducial marks.

FIG. 25 depicts a flowchart of the salient tasks associated with the performance of task 1104—locating the first article of manufacture and the second article of manufacture based on their representative fiducial marks.

At task 2501, registration system 200 locates the first fiducial reference point in the article of manufacture by probing, with a probe, the hole comprising the representative fiducial mark.

Registration system 200 probes, with conical probe 256, the hole in solid hemisphere 1400 associated with fiducial reference point 1201-1 until conical probe 256 fits—both laterally and angularly—the tangible conical surface created in task 2401. This enables registration system 200 to locate the first conical apex (i.e., the location of fiducial reference point 1201-1).

Registration system 200 probes, with conical probe 256, the hole in solid hemisphere 1500 associated with fiducial reference point 1201-1 until conical probe 256 fits—both laterally and angularly—the tangible conical surface created in task 2401. This enables registration system 200 to locate the first conical apex (i.e., the location of fiducial reference point 1201-1).

Registration system 200 probes, with conical probe 256, the hole in hemispherical shell 1600 associated with fiducial reference point 1301-1 until conical probe 256 fits—both laterally and angularly—the tangible conical surface created in task 2401. This enables registration system 200 to locate the first conical apex (i.e., the location of fiducial reference point 1301-1).

Registration system 200 probes, with conical probe 256, the hole in hemispherical shell 1700 associated with fiducial reference point 1301-1 until conical probe 256 fits—both laterally and angularly—the tangible conical surface created in task 2401. This enables registration system 200 to locate the first conical apex (i.e., the location of fiducial reference point 1301-1).

At task 2502, registration system 200 locates the second fiducial reference point in the article of manufacture by probing, with a probe, the hole comprising the representative fiducial mark.

Registration system 200 probes, with conical probe 256, the hole in solid hemisphere 1400 associated with fiducial reference point 1201-2 until conical probe 256 fits—both laterally and angularly—the tangible conical surface created in task 2402. This enables registration system 200 to locate the second conical apex (i.e., the location of fiducial reference point 1201-2).

Registration system 200 probes, with conical probe 256, the hole in solid hemisphere 1500 associated with fiducial reference point 1201-2 until conical probe 256 fits—both laterally and angularly—the tangible conical surface created in task 2402. This enables registration system 200 to locate the second conical apex (i.e., the location of fiducial reference point 1201-2).

Registration system 200 probes, with conical probe 256, the hole in hemispherical shell 1600 associated with fiducial reference point 1301-2 until conical probe 256 fits—both laterally and angularly—the tangible conical surface created in task 2402. This enables registration system 200 to locate the second conical apex (i.e., the location of fiducial reference point 1301-2).

Registration system 200 probes, with conical probe 256, the hole in hemispherical shell 1700 associated with fiducial reference point 1301-2 until conical probe 256 fits—both laterally and angularly—the tangible conical surface created in task 2402. This enables registration system 200 to locate the second conical apex (i.e., the location of fiducial reference point 1301-2).

At task 2503, registration system 200 locates the third fiducial reference point in the article of manufacture by probing, with a probe, the hole comprising the representative fiducial mark.

Registration system 200 probes, with conical probe 256, the hole in solid hemisphere 1400 associated with fiducial reference point 1201-3 until conical probe 256 fits—both laterally and angularly—the tangible conical surface created in task 2403. This enables registration system 200 to locate the third conical apex (i.e., the location of fiducial reference point 1201-3).

Registration system 200 probes, with conical probe 256, the hole in solid hemisphere 1500 associated with fiducial reference point 1201-3 until conical probe 256 fits—both laterally and angularly—the tangible conical surface created in task 2403. This enables registration system 200 to locate the third conical apex (i.e., the location of fiducial reference point 1201-3).

Registration system 200 probes, with conical probe 256, the hole in hemispherical shell 1600 associated with fiducial reference point 1301-3 until conical probe 256 fits—both laterally and angularly—the tangible conical surface created in task 2403. This enables registration system 200 to locate the third conical apex (i.e., the location of fiducial reference point 1301-3).

Registration system 200 probes, with conical probe 256, the hole in hemispherical shell 1700 associated with fiducial reference point 1301-3 until conical probe 256 fits—both laterally and angularly—the tangible conical surface created in task 2403. This enables registration system 200 to locate the third conical apex (i.e., the location of fiducial reference point 1301-3).

At task 2504, registration system 200 locates the fourth fiducial reference point in the article of manufacture by probing, with a probe, the hole comprising the representative fiducial mark.

Registration system 200 probes, with conical probe 256, the hole in solid hemisphere 1400 associated with fiducial reference point 1201-4 until conical probe 256 fits—both laterally and angularly—the tangible conical surface created in task 2404. This enables registration system 200 to locate the fourth conical apex (i.e., the location of fiducial reference point 1201-4).

Registration system 200 probes, with conical probe 256, the hole in solid hemisphere 1500 associated with fiducial reference point 1201-4 until conical probe 256 fits—both laterally and angularly—the tangible conical surface created in task 2404. This enables registration system 200 to locate the fourth conical apex (i.e., the location of fiducial reference point 1201-4).

Registration system 200 probes, with conical probe 256, the hole in hemispherical shell 1600 associated with fiducial reference point 1301-4 until conical probe 256 fits—both laterally and angularly—the tangible conical surface created in task 2404. This enables registration system 200 to locate the fourth conical apex (i.e., the location of fiducial reference point 1301-4).

Registration system 200 probes, with conical probe 256, the hole in hemispherical shell 1700 associated with fiducial reference point 1301-4 until conical probe 256 fits—both laterally and angularly—the tangible conical surface created in task 2404. This enables registration system 200 to locate the fourth conical apex (i.e., the location of fiducial reference point 1301-4).

It will be clear to those skilled in the art, after reading this disclosure, how to accomplished task 1104.

What is claimed is:

1. A method of fabricating an article of manufacture, the method comprising:
    fabricating the article of manufacture with an additive manufacturing technology;
    establishing a first fiducial reference point with the article of manufacture by removing a first portion of a material composing the article of manufacture to create a first hole in a first portion of a material composing the article of manufacture, wherein the first hole in the first portion of the material is defined, at least in part, by a first portion of a first tangible conical surface, wherein the first tangible conical surface establishes (i) a first conical apex, and (ii) a first conical-surface volume;
    establishing a second fiducial reference point with the article of manufacture by removing a second portion of the material composing the article of manufacture to create a second hole in a second portion of the material composing the article of manufacture, wherein the second hole in the second portion of the material is defined, at least in part, by a second portion of a second tangible conical surface, wherein the second tangible conical surface establishes (i) a second conical apex, and (ii) a second conical-surface volume; and
    establishing a third fiducial reference point with the article of manufacture by removing a third portion of the material composing the article of manufacture to create a third hole in a third portion of the material composing the article of manufacture, wherein the third hole in the third portion of the material is defined, at least in part, by a third portion of a third tangible conical surface,
    wherein the third tangible conical surface establishes (i) a third conical apex, and (ii) a third conical-surface volume;
    wherein the first conical apex, the second conical apex, and the third conical apex are non-collinear;
    wherein the first conical-surface volume does not equal the second conical-surface volume;
    wherein the first hole in the first portion of the material is a through hole;
    wherein the second hole in the second portion of the material is a through hole; and
    wherein the third hole in the third portion of the material is a through hole.

2. The method of claim 1:
    wherein the second conical-surface volume does not equal the third conical-surface volume; and
    wherein the first conical-surface volume does not equal the third conical-surface volume.

3. The method of claim 1:
    wherein the first tangible conical surface also establishes (iii) a first conical axis;
    wherein the second tangible conical surface also establishes (iii) a second conical axis; and
    wherein the first conical axis and the second conical axis are non-parallel.

4. The method of claim 3 wherein the first conical axis and the second conical axis are skew.

5. The method of claim 3:
    wherein the third tangible conical surface also establishes (iii) a third conical axis;
    wherein the first conical axis and the third conical axis are non-parallel; and
    wherein the second conical axis and the third conical axis are non-parallel.

6. The method of claim 1 further comprising:
    establishing a fourth fiducial reference point with the article of manufacture by removing a fourth portion of the material composing the article of manufacture to create a fourth hole in a fourth portion of the material composing the article of manufacture, wherein the fourth hole is defined, at least in part, by a fourth portion of a fourth tangible conical surface, wherein the fourth tangible conical surface defines a fourth conical apex; and
    wherein the first conical apex, the second conical apex, the third conical apex, and the fourth conical apex are non-coplanar.

7. The method of claim 1:
    wherein the first tangible conical surface also establishes (iii) a first conical-surface area;
    wherein the second tangible conical surface also establishes (iii) a second conical-surface area; and
    wherein the first conical-surface area does not equal the second conical-surface area.

8. The method of claim 1:
    wherein the third tangible conical surface also establishes (iii) a third conical-surface area;
    wherein the first conical-surface area does not equal the third conical-surface area; and
    wherein the first conical-surface area does not equal the second conical-surface area.

9. The method of claim 1 wherein the material is fiber-reinforced thermoplastic.

10. A method of fabricating an article of manufacture, the method comprising:
    fabricating the article of manufacture with an additive manufacturing technology;

establishing a first fiducial reference point with the article of manufacture by removing a first portion of a material composing the article of manufacture to create a first hole in a first portion of a material composing the article of manufacture, wherein the first hole in the first portion of the material is defined, at least in part, by a first portion of a first tangible conical surface, wherein the first tangible conical surface establishes (i) a first conical apex, and (ii) a first conical axis;

establishing a second fiducial reference point with the article of manufacture by removing a second portion of the material composing the article of manufacture to create a second hole in a second portion of the material composing the article of manufacture, wherein the second hole in the second portion of the material is defined, at least in part, by a second portion of a second tangible conical surface, wherein the second tangible conical surface establishes (i) a second conical apex, and (ii) a second conical axis; and establishing a third fiducial reference point with the article of manufacture by removing a third portion of the material composing the article of manufacture to create a third hole in a third portion of the material composing the article of manufacture, wherein the third hole in the third portion of the material is defined, at least in part, by a third portion of a third tangible conical surface, wherein the establishes (i) a third conical apex, and (ii) a third conical axis;

wherein the first conical apex, the second conical apex, and the third conical apex are non-collinear;

wherein the first conical axis and the second conical axis are non-parallel;

wherein the first hole in the first portion of the material is a through hole;

wherein the second hole in the second portion of the material is a through hole; and wherein the third hole in the third portion of the material is a through hole.

11. The method of claim 10:
wherein the first conical axis and the third conical axis are non-parallel; and
wherein the second conical axis and the third conical axis are non-parallel.

12. The method of claim 10 wherein the first conical axis and the second conical axis are skew.

13. The method of claim 10 wherein:
wherein the first tangible conical surface also establishes (iii) a first conical-surface volume;
wherein the second tangible conical surface also establishes (iii) a second conical-surface volume; and
wherein the first conical-surface volume does not equal the second conical-surface volume.

14. The method of claim 13:
wherein the third tangible conical surface also establishes (iii) a third conical-surface volume;
wherein the second conical-surface volume does not equal the third conical-surface volume; and
wherein the first conical-surface volume does not equal the third conical-surface volume.

15. The method of claim 10 further comprising:
establishing a fourth fiducial reference point with the article of manufacture by removing a fourth portion of the material composing the article of manufacture to create a fourth hole in a fourth portion of the material composing the article of manufacture, wherein the fourth hole is defined, at least in part, by a fourth portion of a fourth tangible conical surface, wherein the fourth tangible conical surface defines a fourth conical apex; and
wherein the first conical apex, the second conical apex, the third conical apex, and the fourth conical apex are non-coplanar.

16. The method of claim 10:
wherein the first tangible conical surface also establishes (iii) a first conical-surface area;
wherein the second tangible conical surface also establishes (iii) a second conical-surface area; and
wherein the first conical-surface area does not equal the second conical-surface area.

17. The method of claim 10:
wherein the third tangible conical surface also establishes (iii) a third conical-surface area;
wherein the first conical-surface area does not equal the third conical-surface area; and
wherein the first conical-surface area does not equal the second conical-surface area.

18. The method of claim 10 wherein the material is fiber-reinforced thermoplastic.

19. A method of fabricating an article of manufacture, the method comprising:
fabricating the article of manufacture with an additive manufacturing technology;
establishing a first fiducial reference point with the article of manufacture by removing a first portion of a material composing the article of manufacture to create a first hole in a first portion of a material composing the article of manufacture, wherein the first hole in the first portion of the material is defined, at least in part, by a first portion of a first tangible conical surface, wherein the first tangible conical surface establishes (i) a first conical apex, and (ii) a first conical-surface volume;
establishing a second fiducial reference point with the article of manufacture by removing a second portion of the material composing the article of manufacture to create a second hole in a second portion of the material composing the article of manufacture, wherein the second hole in the second portion of the material is defined, at least in part, by a second portion of a second tangible conical surface, wherein the second tangible conical surface establishes (i) a second conical apex, and (ii) a second conical-surface volume; and
establishing a third fiducial reference point with the article of manufacture by removing a third portion of the material composing the article of manufacture to create a third hole in a third portion of the material composing the article of manufacture, wherein the third hole in the third portion of the material is defined, at least in part, by a third portion of a third tangible conical surface, wherein the third tangible conical surface establishes (i) a third conical apex, and (ii) a third conical-surface volume;
wherein the first conical apex, the second conical apex, and the third conical apex are non-collinear;
wherein the first conical-surface volume does not equal the second conical-surface volume;
wherein the first hole in the first portion of the material is a blind hole; and
wherein the second hole in the second portion of the material is a through hole.

20. The method of claim 19:
wherein the second conical-surface volume does not equal the third conical-surface volume; and wherein the first conical-surface volume does not equal the third conical-surface volume.

21. The method of claim 19:
wherein the first tangible conical surface also establishes (iii) a first conical axis;
wherein the second tangible conical surface also establishes (iii) a second conical axis; and
wherein the first conical axis and the second conical axis are non-parallel.

22. A method of fabricating an article of manufacture, the method comprising:
fabricating the article of manufacture with an additive manufacturing technology;
establishing a first fiducial reference point with the article of manufacture by removing a first portion of a material composing the article of manufacture to create a first hole in a first portion of a material composing the article of manufacture, wherein the first hole in the first portion of the material is defined, at least in part, by a first portion of a first tangible conical surface, wherein the first tangible conical surface establishes (i) a first conical apex, and (ii) a first conical axis;
establishing a second fiducial reference point with the article of manufacture by removing a second portion of the material composing the article of manufacture to create a second hole in a second portion of the material composing the article of manufacture, wherein the second hole in the second portion of the material is defined, at least in part, by a second portion of a second tangible conical surface, wherein the second tangible conical surface establishes (i) a second conical apex, and (ii) a second conical axis; and
establishing a third fiducial reference point with the article of manufacture by removing a third portion of the material composing the article of manufacture to create a third hole in a third portion of the material composing the article of manufacture, wherein the third hole in the third portion of the material is defined, at least in part, by a third portion of a third tangible conical surface, wherein the establishes (i) a third conical apex, and (ii) a third conical axis;
wherein the first conical apex, the second conical apex, and the third conical apex are non-collinear;
wherein the first conical axis and the second conical axis are non-parallel;
wherein the first hole in the first portion of the material is a blind hole; and
wherein the second hole in the second portion of the material is a through hole.

23. The method of claim 22:
wherein the first conical axis and the third conical axis are non-parallel; and
wherein the second conical axis and the third conical axis are non-parallel.

24. The method of claim 22 wherein the first conical axis and the second conical axis are skew.

* * * * *